United States Patent [19]

Peterson, Jr. et al.

[11] 4,214,307
[45] Jul. 22, 1980

[54] DECELERATION LEAN OUT FEATURE FOR ELECTRONIC FUEL MANAGEMENT SYSTEMS

[75] Inventors: William A. Peterson, Jr., Rochester; Roman O. Marchak, Northville, both of Mich.

[73] Assignee: The Bendix Corporation, Southfield, Mich.

[21] Appl. No.: 918,307

[22] Filed: Jun. 22, 1978

[51] Int. Cl.$^2$ .................. G06F 15/46; F02M 7/00; F02M 51/00
[52] U.S. Cl. .................................. 364/431; 60/278; 123/480; 123/493
[58] Field of Search .................... 364/431, 442; 123/32 EA, 32 EB, 32 ED, 32 EE, 32 EG, 32 EH, 32 EK, 32 EL, 119 R, 119 EC, 119 A; 60/278

[56] References Cited

U.S. PATENT DOCUMENTS

| | | | |
|---|---|---|---|
| 3,731,659 | 5/1973 | Barr et al. | 123/32 EL |
| 3,809,028 | 5/1974 | Luchaco | 123/32 EL |
| 3,866,584 | 2/1975 | Bigalke et al. | 123/32 EL X |
| 3,969,614 | 7/1976 | Moyer et al. | 364/431 |
| 4,089,313 | 5/1978 | Asano et al. | 123/32 EL X |

*Primary Examiner*—Jerry Smith
*Attorney, Agent, or Firm*—William A. Marvin; Russel C. Wells

[57] ABSTRACT

An electronic control unit for regulating the air/fuel ratio of an internal combustion engine is disclosed. The electronic control unit has an open loop calibration for regulating the air/fuel ratio that is corrected with a closed loop correction signal developed by an integral controller. The open loop calibration is a speed-density based schedule which is combined with corrections for special conditions to account for the operating parameters of the engine at any instant. Included in these special condition corrections are provisions for increasing the air/fuel ratio upon a deceleration sufficient enough to cause a rich air/fuel ratio breakthrough because of the EGR valve lag time. A deceleration detector senses decelerations in excess of this predetermined amount by measuring the rate of change of the pressure in the intake manifold of the engine. A fixed percentage increase in air/fuel ratio is switched into the open loop calibration when the deceleration exceeds the amount required for breakthrough. The feature is additionally inhibited at low engine speeds and when the EGR valve is not operational.

10 Claims, 65 Drawing Figures

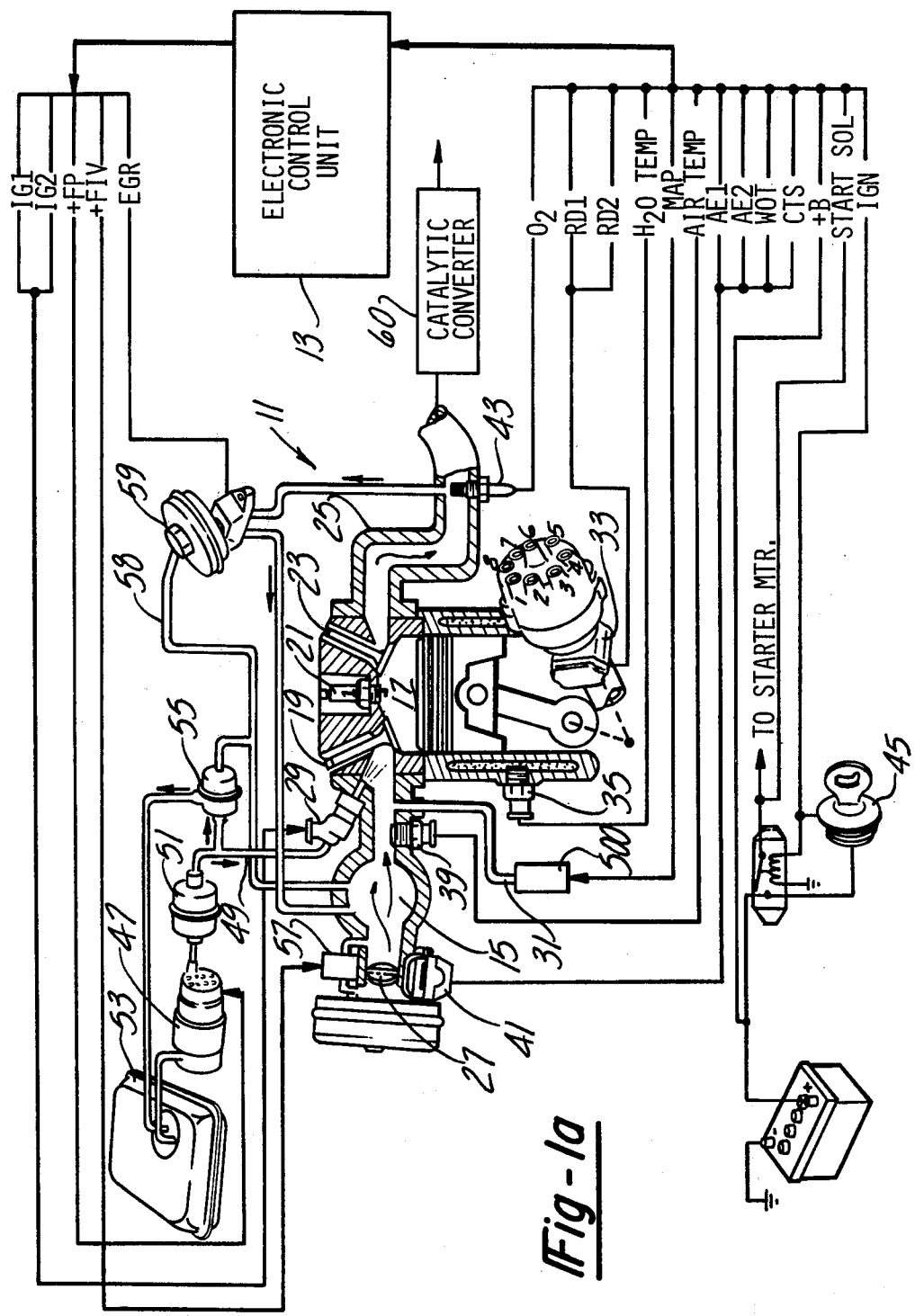

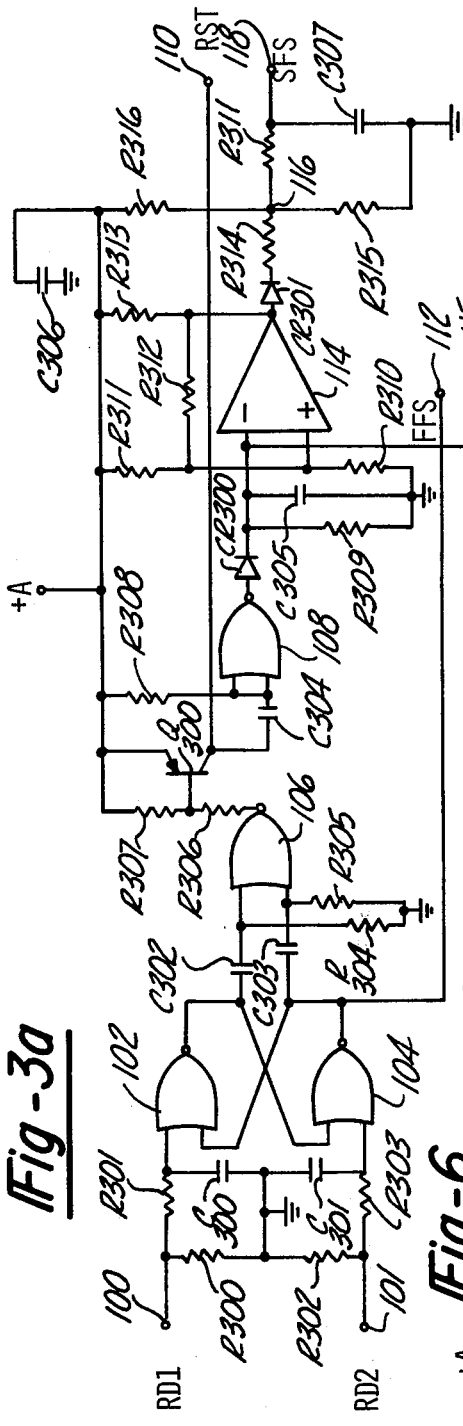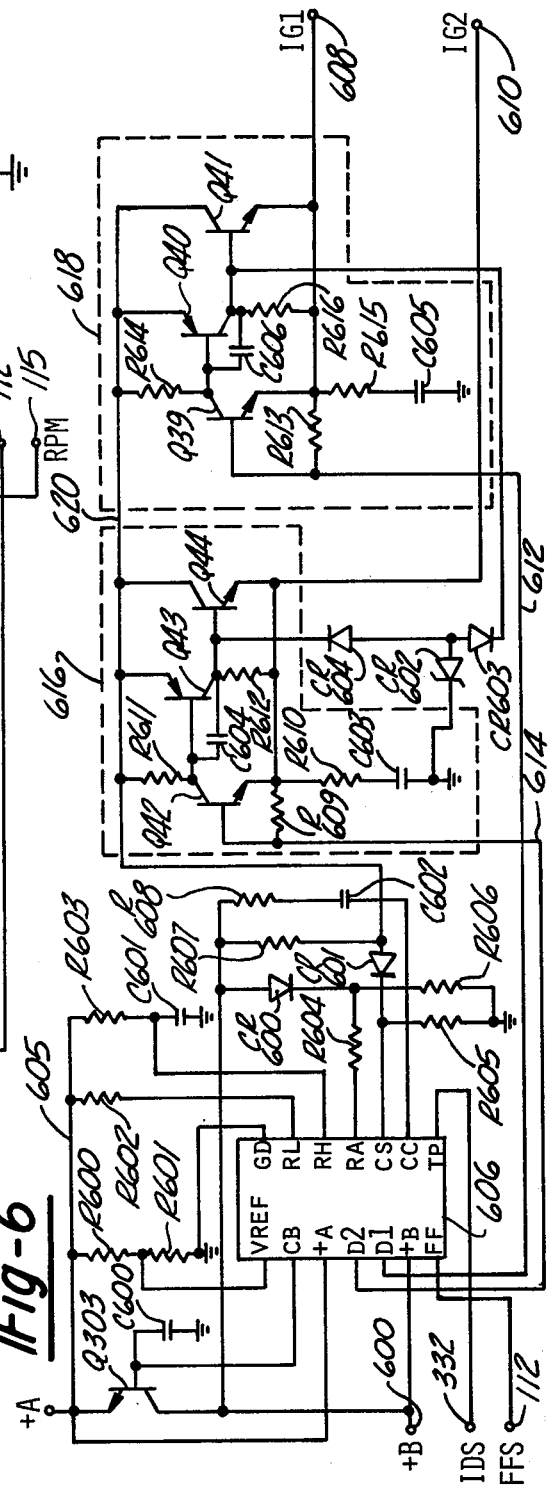
Fig-3a
Fig-6

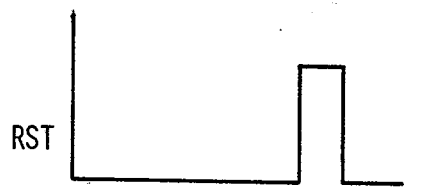
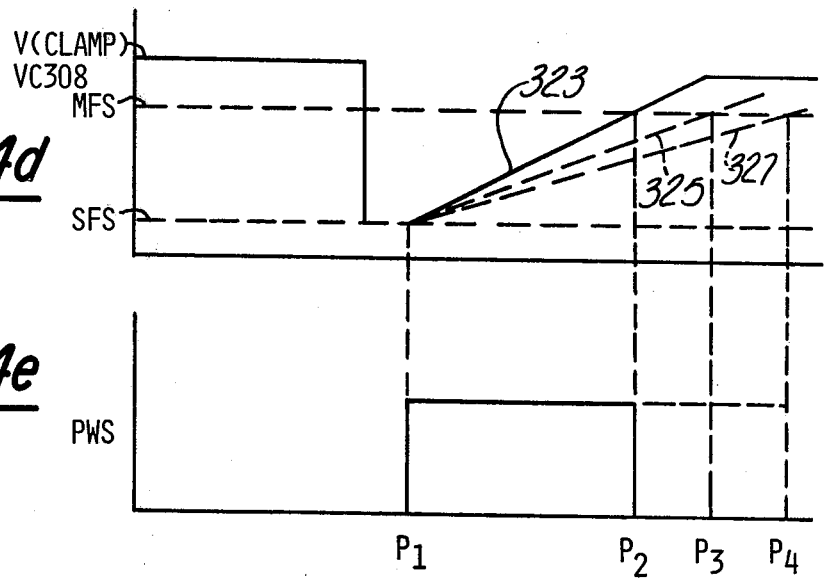

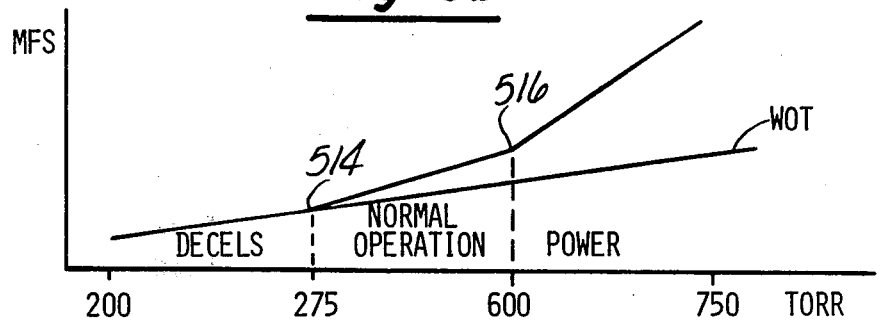
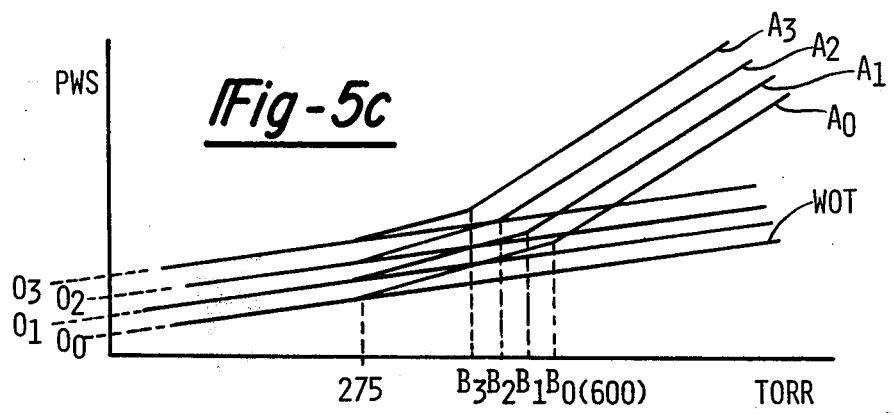
|  | $Q_1$ | $\overline{Q_1}$ | $Q_2$ | $\overline{Q_2}$ |
|---|---|---|---|---|
| $O_0B_0$ | 0 | 1 | 0 | 1 |
| $O_1B_1$ | 1 | 0 | 0 | 1 |
| $O_2B_2$ | 0 | 1 | 1 | 0 |
| $O_3B_3$ | 1 | 0 | 1 | 0 |
*Fig-5d*

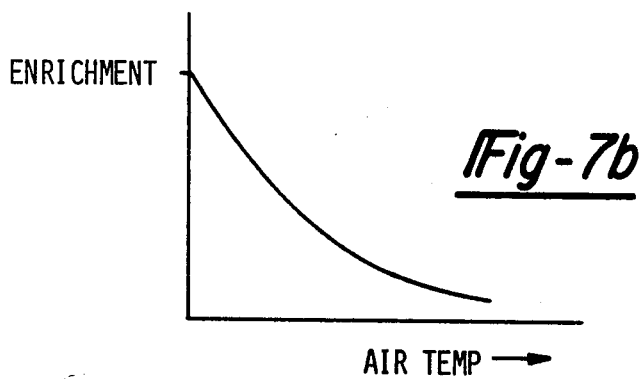
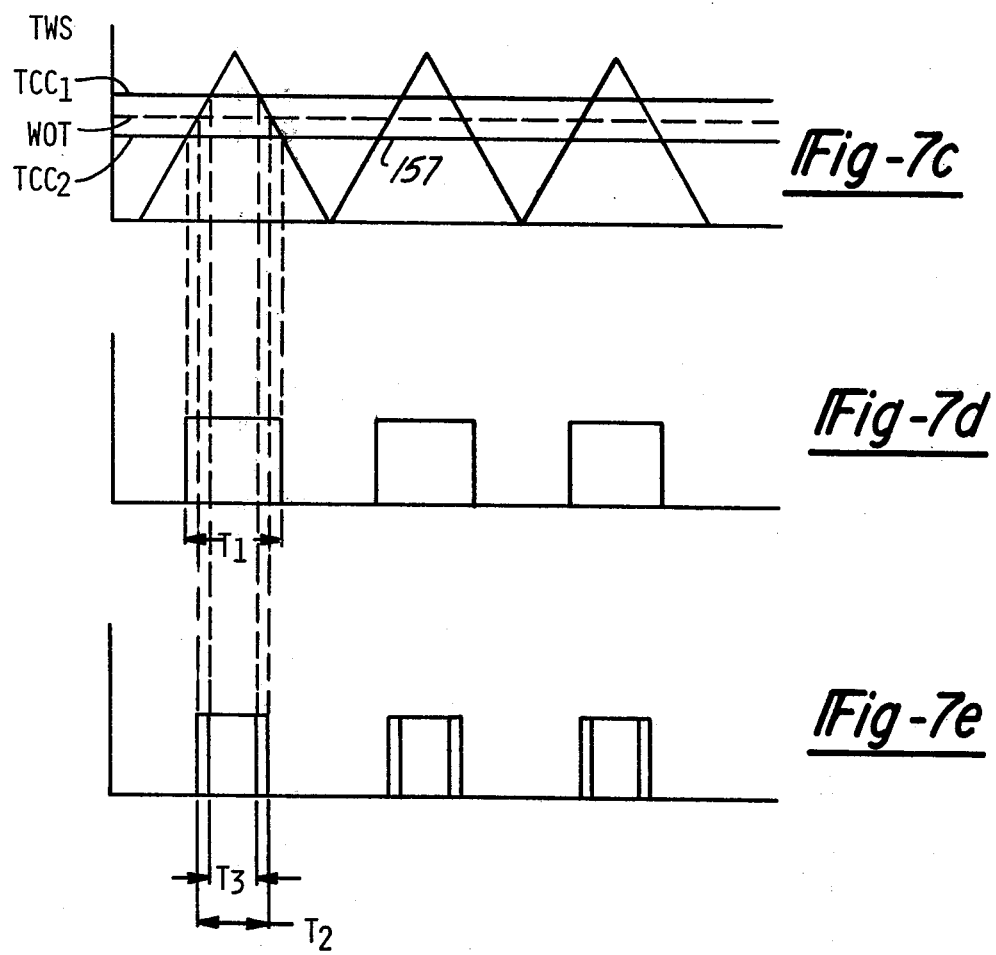

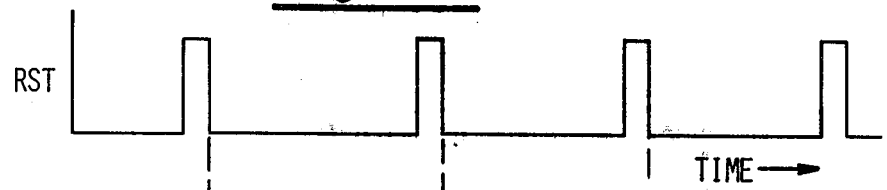
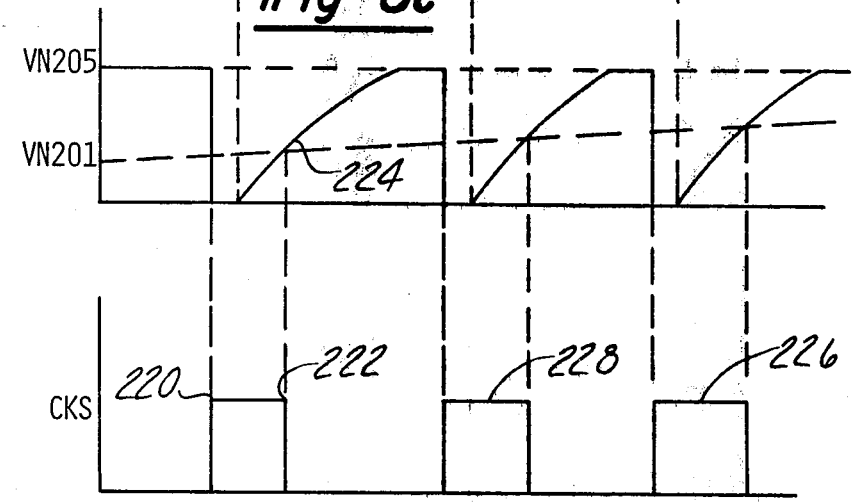
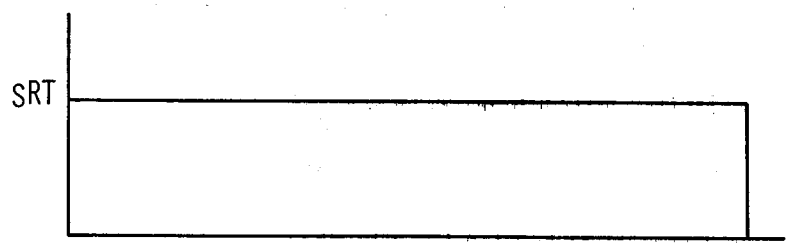

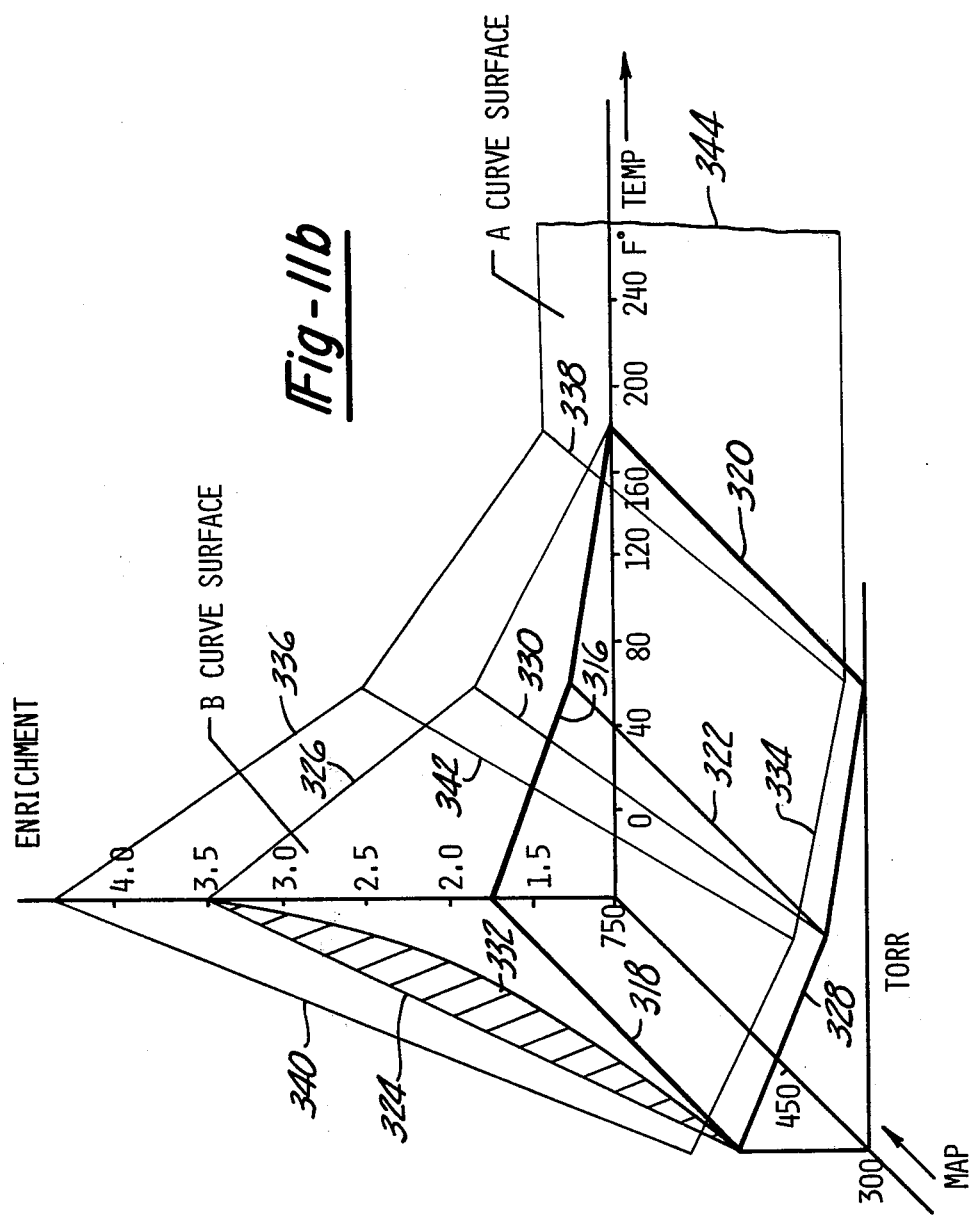

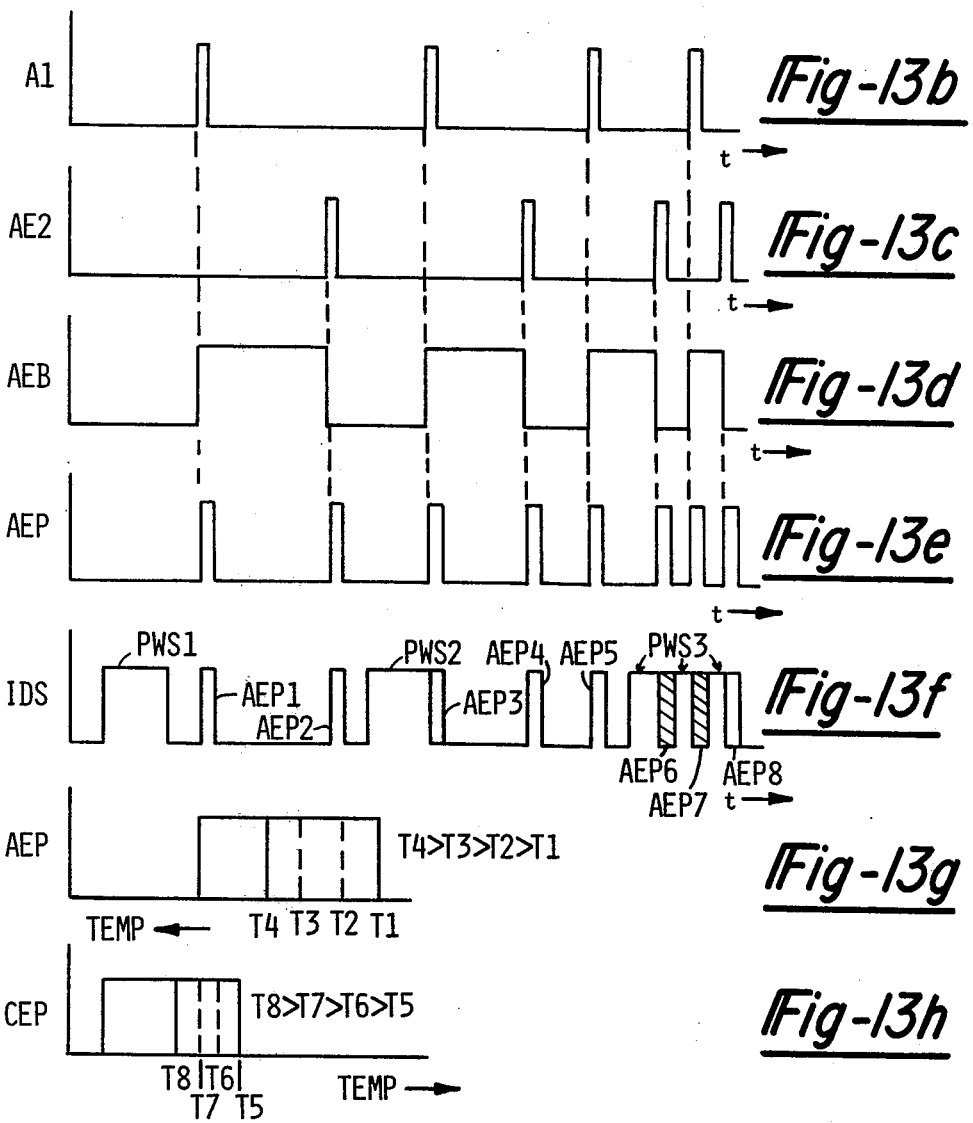

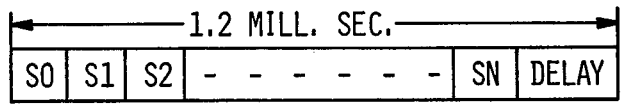
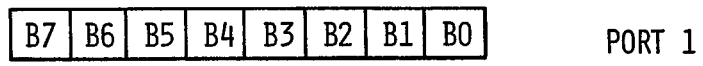 PORT 1
| P10-B0 | ADS |
|---|---|
| P11-B1 | FFS |
| P12-B2 | EGR |
| P13-B3 | WOT |
| P14-B4 | CTS |
| P15-B5 | O2 |
| P16-B6 | PDS |
| P17-B7 | LOS |
CLC
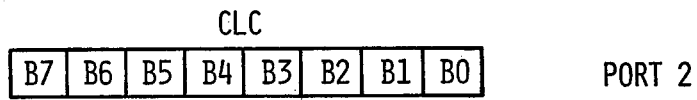 PORT 2
P20 - B0
P21 - B1
P22 - B2
P23 - B3
P24 - B4
P25 - B5
P26 - B6
P27 - B7
 PRIMARY INTEGRATOR
0 - 25
 SECONDARY INTEGRATOR
0 - 230
*Fig-17a*

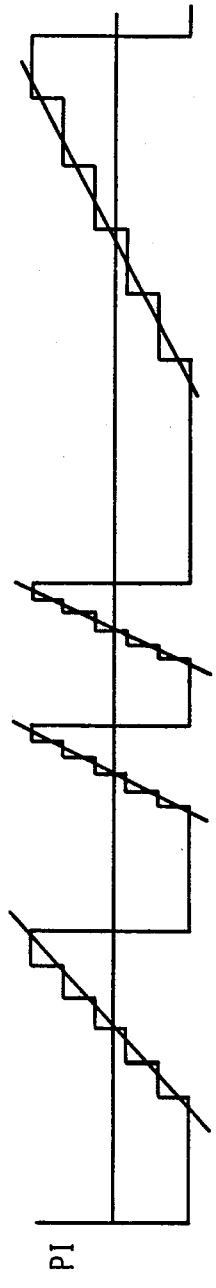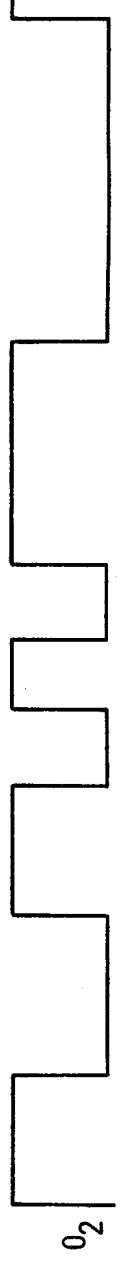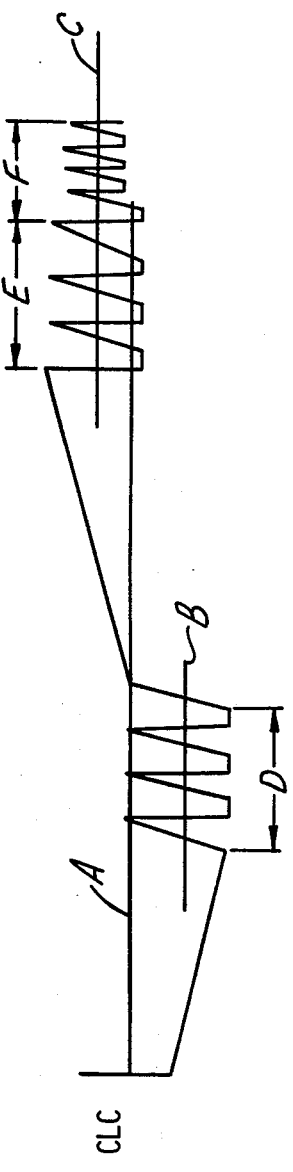
Fig-17b
Fig-17c
Fig-17d
Fig-17e
FFS
PI
O₂
CLC

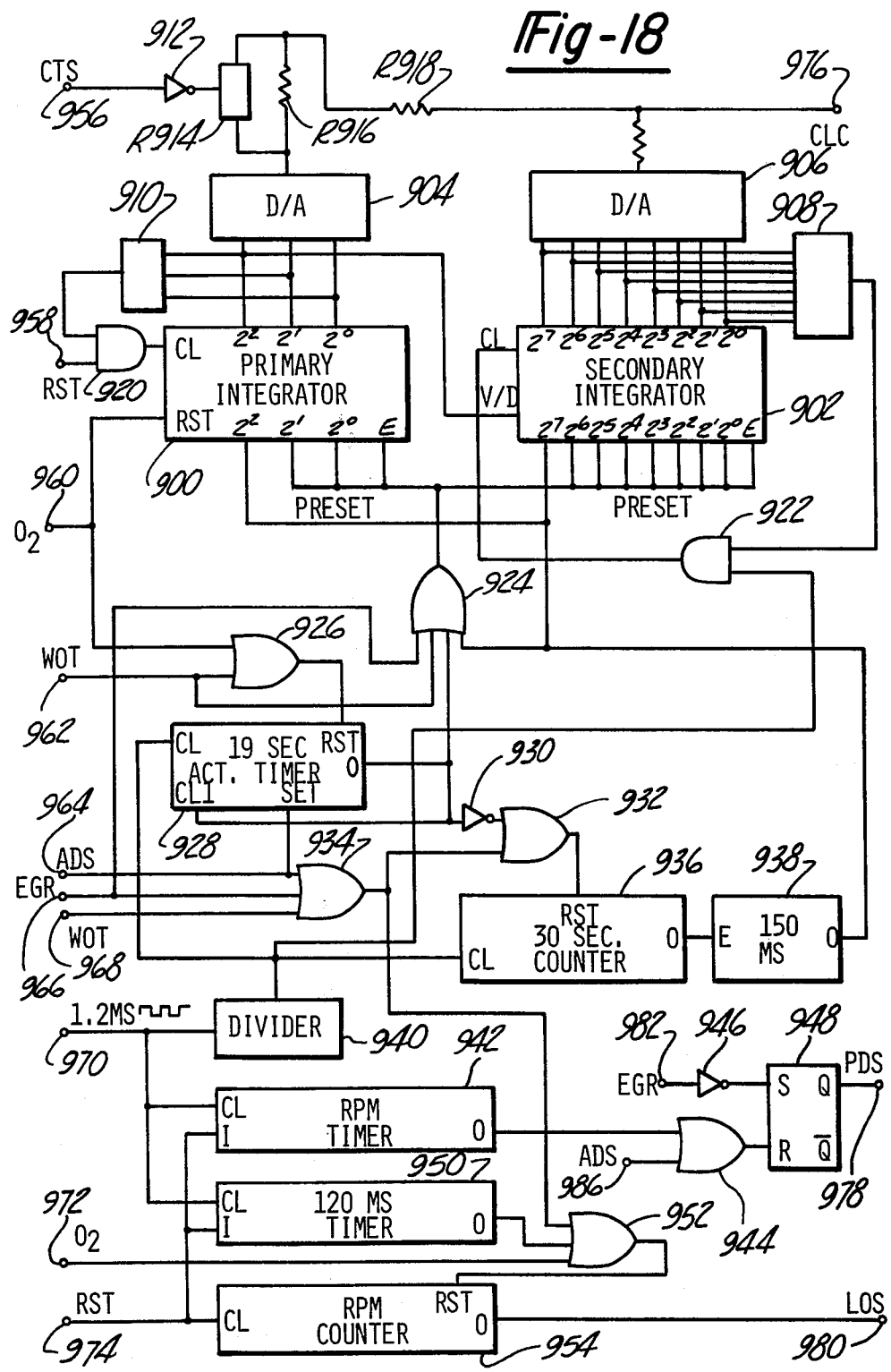

DECELERATION LEAN OUT FEATURE FOR ELECTRONIC FUEL MANAGEMENT SYSTEMS

BACKGROUND OF THE INVENTION

1. Field of the Invention

The invention pertains generally to fuel management systems having an open loop calibration which includes provision for special condition calibrations and is more particularly directed to a special condition calibration for increasing the air/fuel ratio during decelerations.

2. Prior Art

Electronic fuel schedulers or electronic control units for regulating the air/fuel ratio of an internal combustion engine are conventional in the art. These schedulers provide, from a calculation or electronic computation based upon the operating parameters of the engine, an air/fuel ratio that is considered substantially ideal for the instantaneous conditions sensed.

The "best" air/fuel ratio at which the engine will operate under a given set of operational conditions is normally a tradeoff between the competing factors of driveability, emissions, and fuel economy. It is generally understood that richer air/fuel ratios are better for power and driveability, a substantially stoichiometric air/fuel ratio the most desirable for emissions, and lean air/fuel ratios the calibration that gives the best fuel economy. The schedule of desired air/fuel ratios for the electronic control unit can be derived from empirical tests of emissions, driveability, and economy tests and may include areas where the one criterion is more important than the others.

For example, under urban or in city driving, conditions emissions are considered of importance because of the congestion of automobiles present in a small area and the amount of pollutants at these slow speeds while at highway or freeway speeds, economy would be the overriding factor of consideration. In addition, for passing or accelerations and to ease starting and warm up situations, power and driveability must be factored into scheduling.

Any number of the various engine parameters may be sensed to calibrate the schedule of air/fuel ratios, but the most advantageous method is to measure mass air flow or mass fuel flow and calculate the other from the schedule.

An air/fuel controller having a calibration based upon the speed of the engine and the density of the air as a measurement of mass air flow has been successfully provided by a U.S. Pat. No. 3,734,068 issued to J. N. Reddy on May 22, 1973. The disclosure of Reddy is hereby expressly incorporated by reference herein. Reddy discloses a base calibration pulse width that is a function of the RPM of the engine and manifold absolute pressure. The duration of the pulse width is used to regulate fuel flow to the engine based upon a schedule. This base calibration is an open loop control of the air/fuel ratio as the operating parameters of the engine are sensed by the controller and a control signal which is the fuel pulse duration is developed therefrom.

If the air/fuel ratio schedule from which the control signal is calculated or the engine environment to which it is applied is different from the optimum design system, then the controller will not perform as required. The difference in engine environments are generally either because of manufacturing tolerances that change the response of the engine, or, as occurs with all mechanical devices, the ageing factor which is difficult to schedule.

It is known in the art that to solve many of the problems faced by open loop fuel schedulers a closed loop integral controller may be effectively utilized. The controllers are termed "closed loop" because they sense the result of an actual air/fuel ratio change and develop a control signal based therein rather than calculate an air/fuel ratio change from a desired schedule as does the open loop controller. One of the most advantageous of these controller systems is based upon the bi-level output of an exhaust gas composition sensor which indicates whether a rich or lean air/fuel ratio charge has been combusted by the engine. The controller incrementally leans the air/fuel ratio during a rich indication of the sensor and incrementally enriches the air/fuel ratio during a lean indication of the sensors, thereby causing the system to oscillate in a limit cycle about a desired air/fuel ratio. Illustrative of this type of controller is a U.S. Pat. No. 3,815,561 issued to Seitz which is commonly assigned with the present application. The disclosure of Seitz is hereby expressly incorporated by reference herein.

With the closed loop systems, a catalytic converter for reducing the remaining noxious components of exhaust gas is generally provided. The three major emission constituents that are minimized in a catalytic converter are oxides of carbon, hydrocarbons HC, CO, and oxides of nitrogen NOx. The conversion efficiency of the catalyst is, however, a direct function of the air/fuel ratio of the charge inducted into the internal combustion engine. For air/fuel ratios that are lean, the converter efficiency for the reduction of the NOx component is reduced drastically, while for rich air/fuel ratios the conversion of the CO and HC components falls off rapidly.

Only in a very narrow band around a stoichiometric air/fuel ratio where theoretically air and fuel should combine completely, according to their mass proportions, will there occur a substantially total conversion of all three emission components. The precision of the open loop scheduler with its closed loop correction maintains this air/fuel ratio within this operating band to provide the maximum conversion efficiency.

Above certain operating temperatures of the engine more of the NOx component of the exhaust emissions may form than can be processed by the converter even at maximum efficiency. At these temperatures, exhaust gas recirculation (EGR) is used to cool combustion temperatures in the cylinder below that region where high NOx generation will take place.

A common configuration for providing an exhaust gas recirculation path is to establish a conduit between the exhaust manifold and intake manifold which includes a control valve for regulating the amount of exhaust gas recirculated. The amount of exhaust gas recirculated will be a direct function of the difference in pressures between the intake and exhaust manifolds and by positioning the control valve in accordance with the intake manifold pressure, it has been found a relatively constant amount of EGR can be obtained. Usually, the control valve is positioned in this manner by a vacuum plenum which averages intake manifold pressure by expanding and contracting a flexible diaphragm attached to the valve.

This configuration, however, produces an inherent mechanical delay in the response of the EGR valve for changes in intake manifold pressure.

By fixing the exhaust gas recirculation to a constant percentage of the inducted air, its effect on the air/fuel ratio can be scheduled for in the open loop control portion of the electronic control unit. However, during transient conditions and mainly during decelerations when the absolute pressure in the intake manifold of the internal combustion engine drops rapidly, a fixed percentage of EGR is not maintained. Since the difference in pressures between the exhaust and intake manifolds increases, a greater than the scheduled percentage of EGR is inducted into the engine. The extra EGR dilutes the incoming air charge leaving it with less oxygen than the open loop scheduler has calculated there should be from its speed density measurements.

A rich air/fuel ratio is a consequence of the transient deceleration condition and causes a great enough air/fuel ratio shift to unbalance the catalytic converter and reduce its efficiency. This is termed a breakthrough of the air/fuel ratio band in which the catalyst is efficient. The significant loss of oxidation efficiency results primarily in high CO and HC emissions which continue until the EGR valve repositions itself correctly and the near stoichiometric scheduled air/fuel ratio is again produced.

The time required for the EGR system to vary from one operating point to another is a function of the time necessary for the exhaust back pressure to change and the time necessary for the EGR valve to respond to the pressure change. The response time of the EGR valve is the major component of this lag and is much slower than the response of the fuel scheduler. It would be, therefore, advantageous for the scheduler to sense this condition of the rich air/fuel ratio breakthrough and provide a lean out during this time period.

SUMMARY OF THE INVENTION

The invention provides a special condition correction to the open loop calibration of an electronic control unit regulating the air/fuel ratio of an internal combustion engine with EGR. The special calibration prevents the loss of converter efficiency during transient operation of the engine. Specifically, the open loop calibration of the electronic control unit is leaned during decelerations to prevent CO and HC emission breakthrough of the converter air/fuel ratio range that is a result of the lag in the response of the EGR valve.

In a preferred embodiment, the lean out feature is produced by lean out means that include a means for sensing a deceleration and a means for increasing the air/fuel ratio in response to the detection of the deceleration. The deceleration is sensed as a negative derivative of the intake manifold pressure exceeding a predetermined amount which is indicative of where a rich air/fuel ratio breakthrough will begin to affect the emission control of the internal combustion engine.

The lean out means when it senses such a deceleration will provide a fixed percentage increase in air/fuel ratio for the condition to stop the breakthrough. A fixed percentage increase is the most advantageous form of lean out since it is relatively easy to implement into the open loop calibration and will not cause driveabilities or emissions problems. Even if the air/fuel ratio is shifted relatively lean during decelerations driveability will not be affected as the engine is slowing and $NO_x$ emissions will not increase because the lack of engine load during these periods.

The lean out means further includes lean out timer means and EGR means to inhibit the function at low engine speeds and while the EGR valve is not operational respectively.

The lean out timer means is utilized to detect low engine speeds where a fixed increase in air/fuel ratio could cause an excessive deceleration or even a stall in engine operation. This sensitive area is generally in the region of the idle range of the engine where the lean out function does not provide an optimum result and thus may be inhibited.

The EGR means provides an inhibiting operation to the lean out feature when the EGR valve is not operative to prevent excessive increases in air/fuel ratio which are not matched by the decreases caused by EGR valve delay. However, if the fixed percentage air/fuel ratio increase provided by the lean out means is small enough, the inhibiting operation of the EGR means becomes optional to the effect of the lean out means.

Therefore, one of the primary objects of the invention is to provide a lean out means which will increase the air/fuel ratio of the internal combustion engine during decelerations to prevent a rich air/fuel ratio breakthrough.

It is still another object of the invention to provide means to inhibit the lean out means if the engine speed decreases into the idle range of operation.

Yet another object of the invention is to provide means to inhibit the lean out means if the EGR valve is not in operation.

These and other objects, features, and aspects of the invention will be more fully understood and better described if a reading of the following detailed description is undertaken in conjunction with the appended drawings wherein:

BRIEF DESCRIPTION OF THE DRAWINGS

FIG. 1a is a pictorial, partially sectioned block diagram of an electronic fuel management system for an internal combustion engine constructed in accordance with the teaching of the invention;

FIG. 3a is a detailed schematic diagram of the speed sensing circuit illustrated in FIG. 2;

FIGS. 3a through 3g are waveform diagrams of signals at various terminal points of the circuitry illustrated in FIG. 3a;

FIGS. 4b through 4e are detailed waveform diagrams of signals at various terminal points of the circuitry illustrated in FIG. 4a;

FIG. 5b is a waveform diagram of the MFS signal generated in FIG. 5a as a function of pressure;

FIG. 5c–d is a functional illustration of the PWS signal generated in FIG. 4a as a function of pressure;

FIG. 6 is a detailed schematic diagram of the injector driver circuit illustrated in FIG. 2;

FIG. 7b-7e are waveform diagrams of signals at various terminal points throughout the circuitry of FIG. 7a;

FIGS. 8b-8e are waveform diagrams of signals at various terminal points of the circuitry of FIG. 8a;

FIG. 9b is an illustrative pictorial view of an enrichment schedule as a function of the A curve current signal generated in FIG. 9a;

FIG. 9c is an illustrative pictorial view of an enrichment schedule as a function of temperature for the B curve current signal as generated in FIG. 9a;

FIG. 11b is a three-dimensional surface diagram of an enrichment schedule as a function of A curve current, B curve current and linear positive K enrichment;

FIGS. 13b through 13h are waveform diagrams of various signals taken at various terminal points in FIG. 13a;

FIG. 17a are illustrative designations for the connection pins and internal registers of the 8048 microprocessor illustrated in FIG. 15;

FIG. 17b through 17e are illustrative waveforms of the closed loop control circuit illustrated in FIG. 2; and FIG. 18 is a detailed schematic diagram of an alternate implementation of the closed loop control circuit illustrated in FIG. 2;

DETAILED DESCRIPTION OF THE PREFERRED EMBODIMENT

Figure 1B:
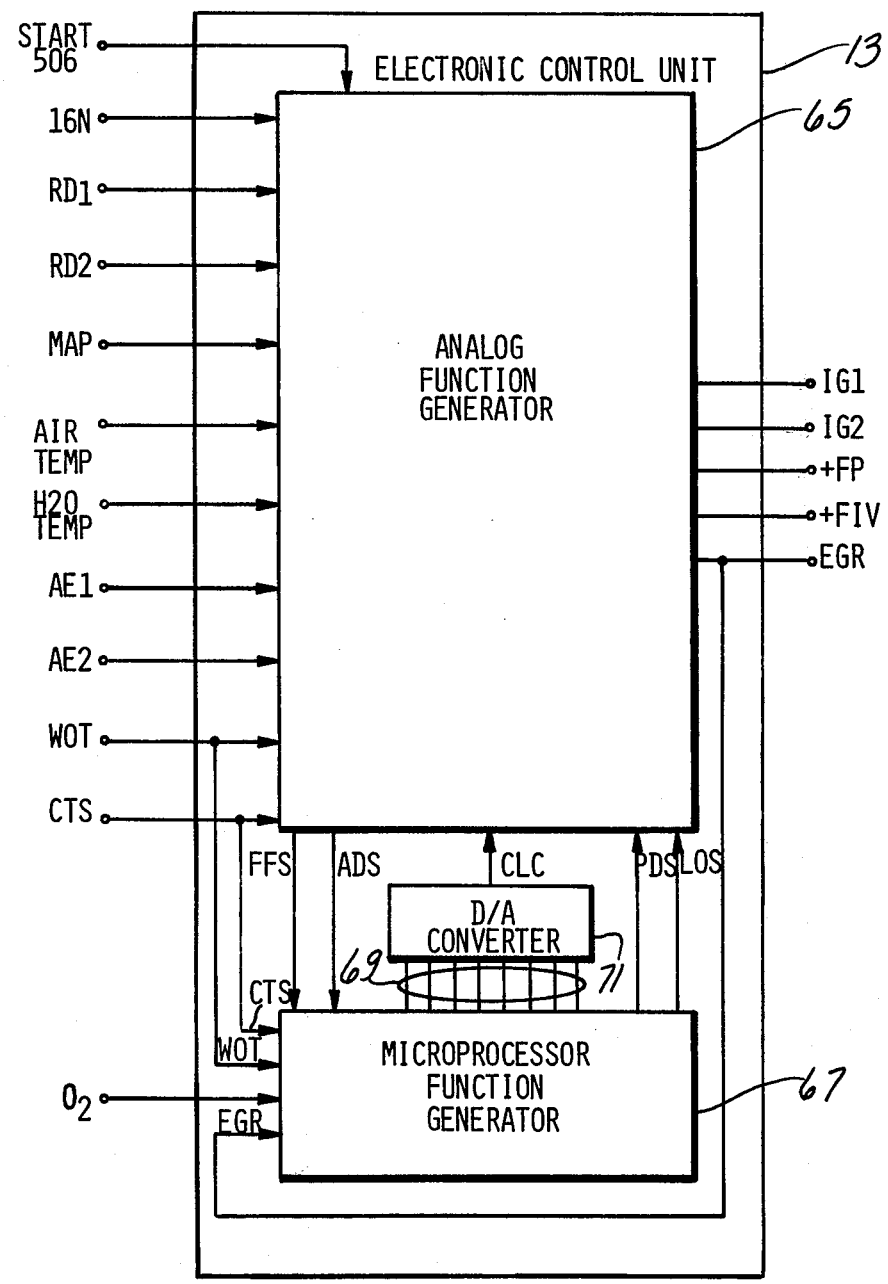
FIG. 1b is a functional block diagram of the electronic control unit for the fuel management system illustrated in FIG.1 1.

FIG. 1 illustrates an engine 11 of the internal combustion type having an air/fuel ratio management system comprising an electronic control unit 13. The engine 11 has numerous sensors that develop electrical signals based upon the operating conditions of the engine and transmit them to the electronic control unit for generating air/fuel ratio control signals based upon the parameters sensed. Electrical control of the air/fuel ratio increases the precision of the regulation for the air/fuel ratio during the constantly changing load, speed, and temperature conditions of the engine. This precise control in combination with presently available catalytic converters that eliminate certain exhaust products is utilized to reduce noxious emissions of the engine while maintaining driveability and good fuel economy.

The system control is based mainly upon an open loop calibration of an air/fuel ratio charge inducted from an intake manifold 15 into the combustion chamber 17 of the various cylinders through an intake valve 19 of the engine during an intake cycle. The air/fuel charge is compressed and ignited by a timed spark device 21 as is known in the art and then exhausted during an exhaust cycle through an exhaust valve 23 into an exhaust manifold 25.

Only one cylinder operation has been shown in FIG. 1 for the purpose of clarity but the preferred embodiment will generally be described as applicable to an eight cylinder automobile as indicated by the designations 1-8 on the distributor cap in the figure. The present system can, however, be easily adapted to any multicylinder internal combustion engine including compression ignited engines.

In the preferred embodiment the amount of air (mass air flow) for the inducted air/fuel charge is varied in accordance with the position setting of a throttle valve 27 controlled by the operator. The ECU 13 senses the amount of air inducted and applies the open loop calibration to that sensed amount to calculate the scheduled amount of fuel. Generally, the calibrated open loop air/fuel ratio is substantially stoichiometric or a ratio of approximately 14.8:1. This air/fuel ratio is considered to be the best all around air/fuel ratio for operating the engine at while factoring in the competing goals of driveability, reduction of noxious emissions and economy. The particular system shown then injects with a plurality of solenoid type injectors 29 (one for each cylinder) the amount of fuel that the electronic control unit 13 has calculated from the engine operating conditions into the incoming air stream of the intake manifold.

From the above discussion it is evident that the ECU 13 could also measure the amount of fuel flow and then calculate the needed amount of air/flow from an air/fuel ratio schedule. Still further, the invention should not be limited to electronically controlled injectors as electronic carburetors or electronically controlled air valves could as easily be regulated.

The air flow is mainly calculated by the ECU 13 from a manifold pressure sensor 500 connected to the intake manifold 15 via a conduit 31. This pressure sensor 500 outputs an analog voltage which is representative of the pressure that is found in the intake manifold 15 and which will vary according to load conditions and the position of the throttle valve 27.

The other parameter needed for indicating the air flow into the engine is a signal developed by an engine speed sensor 33 which provides two pulsed outputs at the RPM of the engine. The engine speed sensor 33 preferably has two normally open reed switches located on opposite sides of the distributor shaft that are operative to sense the passing of a set of permanent magnets fixed on the shaft by closing. The speed sensor 33 will output two signals, one from each reed, RD1 and RD2, respectively that will indicate the passage of the magnets past the pickups and, therefore, the speed and relative crank position of the engine. In this configuration, signals RD1 and RD2 are generated every engine cycle and are 180° out of phase.

From this basic speed density information representing the inducted mass air flow, the electronic control unit 13 will apply the open loop calibration to generate fuel pulse signals IG1 and IG2 to the injectors 29 and thereby generate the particular scheduled air/fuel ratio, such as stoichiometric. For the preferred eight cylinder example signal IG1, IG2 are pulse width signals whose length duration are substantially equivalent to the open times of the fuel injectors 29 and are thus representative of the amount of fuel flow. Signal IG1 is gated to four injectors beginning with a timing pulse related to RD1 and ending when the scheduled amount of fuel has been delivered. Signal IG2 is gated to the other four injectors beginning with a timing pulse related to RD2 and ending when the scheduled amount of fuel has been delivered. The cylinders are thus divided into two groups which receive fuel every engine cycle 180° out of phase with the other group.

To the base fuel calibration, there is added to and subtracted from special correction calibrations calculated from warm up conditions, altitude, air temperature, accelerations, cranking conditions, wide open throttle, closed throttle, exhaust gas recirculation and exhaust gas composition conditions.

The water temperature sensor 35 generates the $H_2O$ temp signal to the ECU 13 to provide the basis for a start and a warm up enrichment calibration. The water temperature sensor is located within the liquid coolant jacket of the engine 11 and provides an excellent indication of the engine operating temperature. During cold starting and initial operation of the engine, enrichment will be necessary for driveability until the engine warms to operating temperature.

The $H_2O$ temp signal is further utilized as an indication of high combustion temperatures in the cylinders. Such high temperatures will produce excess amounts of $NO_x$ which can be reduced by exhaust gas recirculation. From the $H_2O$ temp signal the ECU 13 can sense the necessity of EGR and enable an EGR valve as will be more fully described hereinafter.

Enrichment during cold cranking or starting is further aided by using the RD1, RD2 signals to sense this condition. Smoother and faster starting of the engine will be the result of the inclusion of this function.

Altitude compensation providing an enrichment of the basic calibration for different altitudes is generated as a function of the MAP signal in combination with the wide open throttle signal WOT. At wide open throttle, the MAP indication will be substantially ambient pressure and thus an altitude indication.

Correction to the base calibration of air flow is provided by the air temperature sensor 39 which senses the ambient air temperature coming into the intake manifold 15 and provides an electrical air temp signal to the ECU 13 which is representative thereof. This correction is necessitated because the mass air flow is less at higher temperatures than at lower temperatures for the same speed and MAP indication readings. This air temp signal is thus used to correct the air density indication of the base calibration which is the MAP signal.

Pulses for acceleration and tip-in enrichment are provided from a throttle switch 41 located on the throttle body of the intake manifold 15. The throttle switch 41 senses the position of the throttle valve 23 and provides the pulsed signals AE1, AE2 to indicate the rate of change of the throttle angle or other desire for an acceleration. Further signals from the throttle switch 41 are a wide open throttle indication WOT and a closed throttle indication CTS. These signals are used as indications of these special conditions and modify other corrections as will be more fully explained hereinafter.

An oxygen sensor 43 located in the exhaust manifold and sensing the oxygen content of the combustion products is provided to produce a signal 02 to the electronic control unit 13. Preferably, the oxygen sensor 43 includes a zirconia element which products a low voltage level while sensing exhaust gas compositions with an abundance of oxygen contained therein and a high level voltage signal while sensing exhaust gas compositions with an absence of oxygen contained therein. Zirconia 02 sensors have steep transitions between these levels at the stoichiometric point where the composition of the exhaust gas changes from oxygen rich to oxygen lean. An oxygen rich exhaust gas indicates not enough fuel is supplied for a stoichiometric rate which will be termed a lean air/fuel ratio and an oxygen lean exhaust gas indicates a rich air/fuel ratio where an excess of fuel has been supplied.

Other input signals to the electronic control unit 13 for initialization and power include the +B signal taken from the positive battery terminal of the automobile, the ignition signal IGN from a terminal of the ignition switch 45, and the start sol signal received from the cold power terminal of the starter solenoid.

As output signals, in addition to the pulse width modulated fuel control signals IG1 and IG2, the electronic control unit 13 further provides an energization signal +FP to the fuel pump 47. When the fuel pump 47 is turned on, fuel from a tank 53 flows under pressure through a filter 51 into a fuel rail 49 to which the injectors 29 are connected at one end.

The pulses IG1 and IG2 then cause a solenoid operated valve in each injector to open to allow the pressurized fuel to be metered into the intake manifold 15 just ahead of the intake valve 19. Pressure in the fuel rail 49 is controlled by a fuel pressure regulator 55 which has a vacuum conduit connected to the manifold 15 for changing the regulated pressure in response to the intake manifold vacuum.

The electronic control unit 13 further provides a signal +FIV to a fast idle valve 57 upon start up. The fast idle valve 57 provides an increase in the amount of air inducted into the intake manifold by opening a bypass of the throttle valve 27 during the starting conditions which will decay to a closed position after a certain passage of time.

Further provided by the electronic control unit 13 is an inhibiting EGR signal, an EGR valve 59 which recirculates a portion of the exhaust gases from the exhaust manifold 25 to the intake manifold 15 in order to reduce the $NO_x$ content of the exhaust gases. As is known in the art, the EGR valve 59, when enabled, provides a fixed percentage of exhaust gas through the recirculation loop to the manifold 15 by positioning a valve with respect to the manifold vacuum. The EGR is inhibited until the engine reaches a temperature at which $NO_x$ can form.

FIG. 1B illustrates a functional block diagram of the input of the sensor signals to and output of the control signals from the electronic control unit 13. Internal communication signals of the ECU 13 are further illustrated. The electronic control unit 13 is basically divided into an analog function generator 65 and a digital or microprocessor function generator 67. Analog signals air temp, $H_2O$ temp, MAP, RD1, RD2 are input directly to the analog function generator 65.

The communiciation of signals to the microprocessor function generator 67 include input signals WOT, CTS, and 02 that arrive directly from the engine environment and further include two internally generated signals FFS and ADS, and one of the input signals from the electronic control unit 13, the EGR signal.

The microprocessor function generator 67 communicates with the analog function generator 65 by producing three output signals CLC, PDS, and LOS. The CLC signal is an analog representation of the digital output of eight signal lines via a data port 69. In the preferred embodiment the port data from port 69 is converted into an analog signal via D/A converter 71 and is used as the closed loop correction for the system. The LOS signal is utilized to give a failure indication and the PDS signal to enable to lean out function for deceleration as will be more fully described hereinafter.

The division of the electronic control unit 13 into the analog function generator and microprocessor function generator serves to reduce circuitry and increase control by permitting the main analog sensor functions such as MAP, air temp and water temp to be input to an analog device which may handle them readily without analog-to-digital conversion. Digital or logic inputs that may be handled more readily by a microprocessor function generator 67 such as CTS, WOT, 02 and EGR are input directed over single lines and are either a high or low digital value.

Further, the functions have been divided such that the multiplications and divisions of the electronic control unit calibrations are performed in the analog function generator 65 where they will not waste processing time or expensive memory of the microprocessor function generator. Calculations such as successive additions or subtractions, for example integrations of a closed loop correction, are performed quickly in the microprocessor function generator 67 to permit a saving of analog circuitry.

The output signals IG1, IG2, EGR, +FP, +FIV which interface with analog devices are relegated to the analog function generator 65 for power amplification, and current or voltage level control.

The division of functions between analog and digital sections in this manner provides an optimal system that is neither digitally oriented nor analog oriented but hybrid in nature. The hybrid design of the system substantially reduces circuitry between all digital or all analog systems and uses only one D/A converter for communication between the two function generators 65, 67. Significant cost savings are achieved by eliminating the necessity for any A/D converters.

Figure 2:
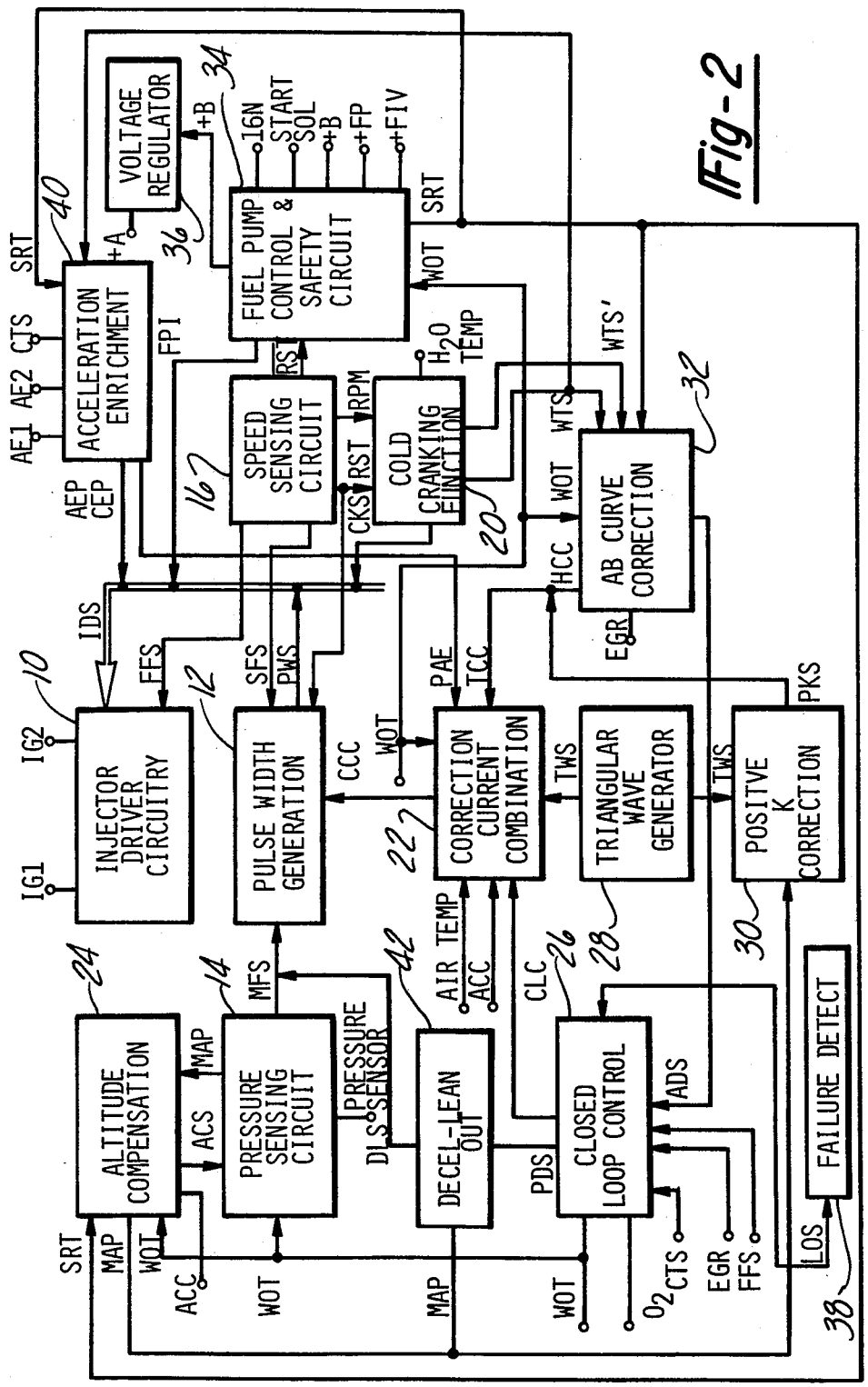
FIG. 2 is a detailed system block diagram of circuitry comprising the electronic control unit of the fuel management system illustrated in FIG. 1.

The detailed functional block diagram in FIG. 2 illustrates the combined functions of the analog function generator 65 and the microprocessor function generator 67. The generation of control signals and their communication between the various functional blocks are illustrated in the figure. The detailed circuitry for generating the described signals will be more fully discussed hereinafter.

The injector control pulses IG1 and IG2 are generated by an injector driver circuit 10 from the injector drive signal IDS and the flip-flop signal FFS. The FFS signal is generated by a speed sensing circuit 16 which outputs a square wave having a positive transition for every pulse from the reed input RD1 and the opposite transition for every input pulse of signal RD2. The FFS signal then is used to time the alternations between the injector groups for injection. The IDS signal is a composite signal determining the pulse width of the enabling pulse signals on the group injector lines.

Usually, the IDS signal is formed by a pulse width signal PWS generated by a pulse width generation circuit 12 from the calibrations of the ECU. To the PWS signal are added an acceleration enrichment pulse signal HEP, and a closed throttle pulse signal CPT generated from an acceleration enrichment circuit. Further, the cold cranking signal CKS from the cold cranking function circuit 20 is combined to form the IDS signal.

The main injector pulse width signal PWS signal is generated by a combination of signals including a speed function signal SFS from the speed sensing circuit 16, a manifold pressure function signal MFS from a pressure sensing circuit 14, and a correction current combination signal CCC from a correction current combination circuit 22. A fourth signal, reset RST, from the speed sensing circuit is provided to time the initial edge of PWS to the injector driver circuit 10. The pulse width generation circuit 12 generally begins the initiation of a pulse at the end of the reset signal at a voltage dependent on the speed function signal SFS and ending when a ramp crosses a voltage developed by the MFS signal. The ramp rate or charging speed is determined by the current signal CCC.

The SFS signal from the speed circuit 16 is developed by applying a functional relationship to the input signals RD1 and RD2. The speed sensing circuit 16 also generates the flip-flop signal FFS and the reset signal RST. A further signal RPM is used internally in the circuit and is generated to other circuitry in the system.

The manifold pressure function signal MFS is developed by the pressure sensing circuit 14 in response to the input of a pressure sensor, the altitude compensation signal ACS from altitude compensation signal circuit 24, and the wide open throttle signal WOT. Basically, the MFS signal is a function of MAP corrected by the ACS signal and the WOT signal.

The correction current combination circuit 22 combines five signals to form the CCC signal or the ramp rate of the PWS signal. The first signal, a temperature correction current signal TCC from an AB curve correction circuitry 32, is generated in response to warm up conditions and is time temperature, and load dependent. The second signal, an altitude correction current signal ACC, from the altitude compensation circuit 24 provides additional altitude enrichment in addition to that provided to the pressure sensing circuit 14 from the altitude correction ACS signal. A third signal combined in the correction current combination circuit 22 is the air temp signal from the air temperature sensor 39 which provides an analog voltage representative ambient air temperature. A further signal received by the correction current combination circuit 22 is the closed loop current signal CLC generated by the closed loop control 26. The final signal combined to yield the CCC signal is the wide open throttle signal WOT.

A triangular waveform signal TWS via triangular wave generator 28 is supplied to the correction current combination circuit 22 is used to facilitate the combination of the above-mentioned five signals. A priority signal, PAE, is provided to the correction current combination 22 from the acceleration enrichment circuit 18 to inhibit the CCC signal during outputs of the acceleration enrichment pulse signal AEP and closed throttle pulse signal CTP, as will be more fully explained hereinafter.

The AB curve correction circuit 32 generates a portion of the temperature correction current TCC from a time and temperature dependent warm up signal HCC developed as a function of a water temperature signal WTS and its analogy a WTS' signal from the cold cranking function circuit 20. The WTS signal and WTS' signal are generated as a function of the engine temperature from the $H_2O$ temp signal input from water temperature sensor 35 to the cold cranking function circuit 20. Further inputs to the AB curve correction circuitry 32 are the wide open throttle signal WOT and the start signal SRT. The signal HCC is time and temperature dependent and has a delay portion generated as a signal ADS to the closed loop control 26.

The HCC signal is combined with positive K correction signal generated from a positive K correction circuit 30. The positive K correction signal PKS is generated as a function of the manifold absolute pressure signal MAP via altitude compensation circuit 24 and the triangular waveform signal TWS from the triangular wave generator 28. The PKS signal and HCC signal are combined to generate the temperature correction current signal TCC. Since the MAP signal is an indication of load, the TCC signal is a warm up enrichment that is load dependent.

The closed loop control circuit 26 takes the digital input signals WOT, $O_2$, CTS, FFS and ADS to provide the closed loop current signal CLC to the correction current combination circuit 22. Further in response to the input of the EGR, ADS and FFS signals, the enabling signal PDS is generated to a deceleration lean out circuit 42. The lean out circuit 42 will generate a deceleration lean signal DLS in response to the input of the MAP signal and PDS signal. A lamp on signal LOS is generated to a failure detect circuitry circuit 38 from the closed loop control 26 in response to the FFS, ADS, WOT, EGR, and $O_2$ signals.

A fuel pump control and safety circuit 34 is provided to generate the +FP signal to the fuel pump and the +F1V signal to the fast idle valve in response to starting conditions sensed by the IGN signal. The battery voltage +B is transferred through circuit 34 to a voltage regulator where the source voltage +A is generated.

A first pulse inhibit signal FPI is generated by the circuit 34 in response to the IGN signal and the start signal SRT is provided when the start solenoid is engaged and generates the incoming signal start sol.

Figure 3B:
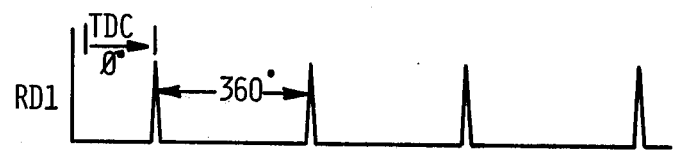
Figure 3C:
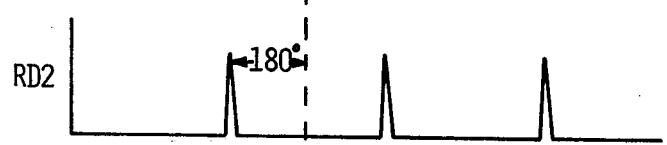

The speed sensing circuit 16 will now be discussed in further detail with reference to FIG. 3. Input signals RD1, RD2 for the circuitry are provided through terminals 100, 101 from the reed pickups of the speed sensor and transmitted via input resistors R301, R303 to inputs of NOR gates 102 and 104 respectively. A resistor R300 is connected between terminal 100 and ground to form a ground return at the input terminal. Likewise, terminal 101 has a resistor R302 connected between the terminal and ground for a ground return of the RD2 signal. A capacitor C300 connected between the input terminal of NOR gate 102 and ground filters high frequency signals from that input and a similar attenuation capacitor C301 is connected between the input of NOR gate 104 and ground. Signals RD1, RD2 are shown in FIG. 3b as alternating pulses 360° of engine rotation apart and offset a set number of degrees from a timing point, for example TDC of cylinder 1.

Figure 3D:
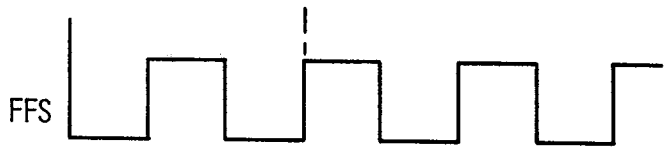
Figure 3E:

NOR gates 102 and 104 are cross-connected as to form an RS flip-flop with their output terminals feeding the input terminals of a NOR gate 106 via capacitors C302 and C303 respectively. The output of NOR gate 102 will go low or be reset when a positive voltage pulse is provided at terminal 100 and will go high or be set upon a reed pulse of signal RD2 entering terminal 101. This action will produce a square wave signal from the output of NOR gate 102 to the NOR gate 106. The output of NOR gate 104 will provide the inverted form of the square signal to the input of NOR gate 106. Thus, a square wave which has a frequency equivalent to the engine speed is generated at the output of NOR gate 104 and becomes the timing signal FFS output from terminal 112. Signal FFS is illustrated in FIG. 3d in timed relationship to RD1, RD2.

The positive going edges of the square wave output of NOR gate 102 are differentiated by the capacitor C302 connected to the input of NOR gate 106 and a resistor R304 connected to ground to provide a negative going pulse to PNP transistor Q300 via an output resistor R306. Likewise, a differentiator comprised of the capacitor C303 connected to the input of NOR gate 106 and a resistor 305 connected to ground supplies a positive pulse upon each positive going edge of the output of NOR gate 104. This pulse is likewise used to turn on transistor Q300 via resistor R306 from the output of NOR gate 106. The differentiator values are chosen such that for each edge from the flip-fop a set duration pulse is generated from gate 106. Transistor Q300 is normally biased off by a resistor R307 connected between its base and voltage source +A, but will conduct when NOR gate 106 sinks current when in a low state.

The output of the collector of transistor Q300, therefore, is a positive pulse of set duration that is developed every time one of the reed signals RD1, RD2 is present. This signal is the reset signal RST illustrated in FIG. 3e and is used as one of the main timing signals for engine speed.

The RST signal is delayed for its duration in NOR gate 108 to provide an RPM signal at terminal 112. NOR gate 108 has its inputs tied together and is further connected to a pull up resistor R308 which keeps the output generally low. When, however, Q300 is pulsed, the inputs are momentarily connected to the collector terminal via a capacitor C304 at the trailing edge of the RST pulse. The resulting positive pulse is transmitted through a diode C300 to a parellel circuit combination comprising resistor R309 and capacitor C305 connected between the cathode of the diode CR300 and ground.

Figure 3F:
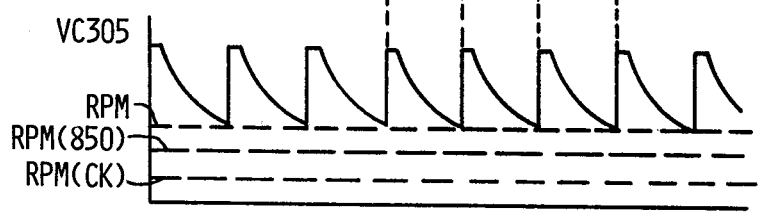

The capacitor C305 charges to the voltage of the delayed reset pulses from the output of the NOR gate 108 during their presence and then decays to provide a voltage proportional to the engine speed at the inverting input of a differential amplifier 114. The decay is at the time constant of capacitor C305 and resistor R310. The voltage to which the capacitor decays is representative of engine speed and is the RPM signal. The RPM signal is output to various other circuits via terminal 115 and is illustrated in FIG. 3f.

The amplifier 114 is configured as a comparator and has a threshold voltage connected to its noninverting input. The threshold voltage is developed at the junction of a divider resistor R311 and a divider resistor R310 connected between a positive source +V and ground. The amplifier 114 further has a positive feedback resistor R312 connected between its output and its noninverting input and includes pull up resistor R313 for the open collector amplifier connected between the positive source +A and its output.

When the RPM signal voltage on capacitor C305 exceeds the threshold value that the divider resistors input to amplifier 114, its output will go low thereby sinking current away from the anode of a diode CR301 and lowering the voltage at a node 116 via an output resistor R314. Generally, node 116 is at a higher voltage which is the junction voltage of a divider resistor R316 and divider resistor R315 connected between the positive supply +A and ground. This voltage is summed with the voltage developed from a current supplied through the series combination of the pull up resistor R313, the diode CR301 and the output resistor R314 when the amplifier is off.

However, the node 116 will be pulled to the lower voltage when the RPM exceeds the threshold of the amplifier 114. This step in voltage is thereafter transmitted to terminal 118 via a resistor 311. A capacitor C307 connected between the terminal 118 and ground provides a decay from the higher voltage level to the lower level when the RPM of the engine changes enough to switch the amplifier.

Figure 3G:
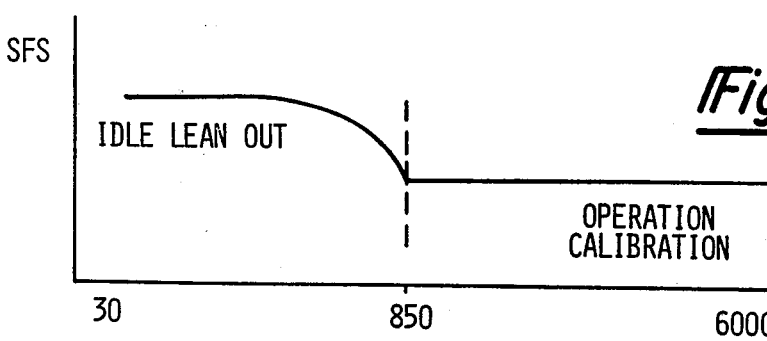

This output from terminal 118 is the speed function signal SFS which is illustrated in FIG. 3g. It is seen that for RPM signal levels below 850 RPM (threshold level) the higher voltage will provide an idle lean out level which will shorten the injector pulse width and for RPM signal above a normal operation calibration level will be provided to lengthen the pulse width. The decay time constant produces a smooth transition between these two levels. It is evident the SFS signal could be a much more complex function of speed than that illustrated but it has been demonstrated that this two step function is quite advantageous and is preferred in the present implementation.

The pulse width generation circuitry will now be more fully described with reference to FIGS. 4a–e. Initially, a main timing capacitor C308 connected between a node 320 and ground charges with a linear ramp toward the supply voltage because of the CCC signal sourcing a calculated amount of current thereto from terminal 322. The rate at which the capacitor charges, and thus the slope of the ramp, is determined by the amount of current supplied by the signal CCC and, as will be more fully explained hereinafter, varies with the parameters supplied to the correction current combination circuit 22. The generation of the CCC signal current and its calculation will be described with reference to the detailed description of that circuit.

The voltage to which the capacitor can charge is limited by a clamp formed with a diode CR104 connected between the node 320 and the junction 321 of a divider formed with a resistor R116 and a resistor R117 connected between the source of positive voltage +A and ground. The capacitor will charge to the divider voltage plus one diode drop and remain there until the pulse width generation cycle begins. In FIG. 4d, where the voltage as a function of time for capacitor C308 is shown, this clamping voltage is illustrated and the level designated V(CLAMP).

The pulse width generation cycle begins with the positive going edge of a reset pulse from signal RST of FIG. 4b turning on a transistor Q301 by energizing the base of the transistor via a resistor 319 through terminal 110. The positive going edge turns on the transistor Q301 to allow the capacitor C308 to discharge through the output terminal of an amplifier 326 to the voltage applied on the noninverting input. The voltage of capacitor 320 is applied to the inverting input of the amplifier 326 and it will equalize the voltages on its inputs during the on time of the transistor Q301. The voltage supplied to terminal 118 which is connected to the noninverting input of amplifier 326 is the speed function signal SFS and this sets the initial voltage point of capacitor 320 to its value. This voltage level is labeled as SFS in FIG. 4d and is held for the duration of the RST pulse.

The positive going edge of the reset pulse RST additionally energizes a transistor Q1 to generate the inverse of the reset signal $\overline{RST}$ as shown in FIG. 4c. The base of transistor Q1 is connected to a junction of a divider comprising a divider resistor R4 and a divider resistor R5 connected between the reset terminal 110 and ground. The $\overline{RST}$ signal developed at the collector of the transistor Q1 inhibits the pulse width signal PWS generated at the output of an amplifier 330 through a diode CR7 and terminal 332 until the RST signal goes low. The $\overline{RST}$ signal is further transmitted to other circuits via terminal 334.

At the falling edge of the reset pulse, the transistor Q1 and transistor Q301 are turned off. The capacitor C308 will now start charging from the CCC signal toward the clamping voltage as seen by ramp 323 in FIG. 4d. A comparator amplifier 330 compares the rising ramp voltage of the capacitor C308 at its inverting input to the MFS signal applied to its noninverting input. The voltage applied to the inverting input of the amplifier 330 as was stated is initially the speed function signal SFS via the capacitor C308. The output of the amplifier 330 is ungrounded when transistor Q1 is turned off and has a positive voltage output to the terminal 332 via a diode CR302. This is shown as point $P_1$ in FIG. 4e as is the rising edge of the PWS signal. The capacitor 308 charges at the rate of the current source CCC and when the ramp voltage 323 exceeds the MFS voltage at the noninverting input of the amplifier 330, the amplifier will switch into nonconduction and terminate the pulse width signal PWS at point $P_2$. Thus, it can be seen that the PWS signal is a pulse whose on time is a function of the speed function signal SFS; the manifold pressure function signal MFS; and the correction combination current signal CCC.

The PWS signal is generated at every reset pulse and will be gated to the injectors by the injector driver circuitry as will be more fully described hereinafter. It is evident that the length of the pulses of the PWS signal can be shortened or extended by changing either one, two, or all three of the variable signals, SFS, MFS, and CCC. For example, raising the SFS signal will shorten the pulse width because the capacitor C308 will begin the cycle at a higher point and will not have as far to charge and lowering the SFS signal will provide the opposite result. Lowering the MFS signal will shorten the pulse width and raising it will lengthen the pulse width. FIGS. 4d, 4e illustrate the effect of lowering the charging current 325, 327 which will extend the PWS pulse to $P_3$, $P_4$ respectively. Therefore, the pulse duration of the PWS signal and hence the amount of fuel delivered from the injectors is directly proportional to the MFS voltage and inversely proportional to the SFS voltage and CCC current.

Figure 5A:
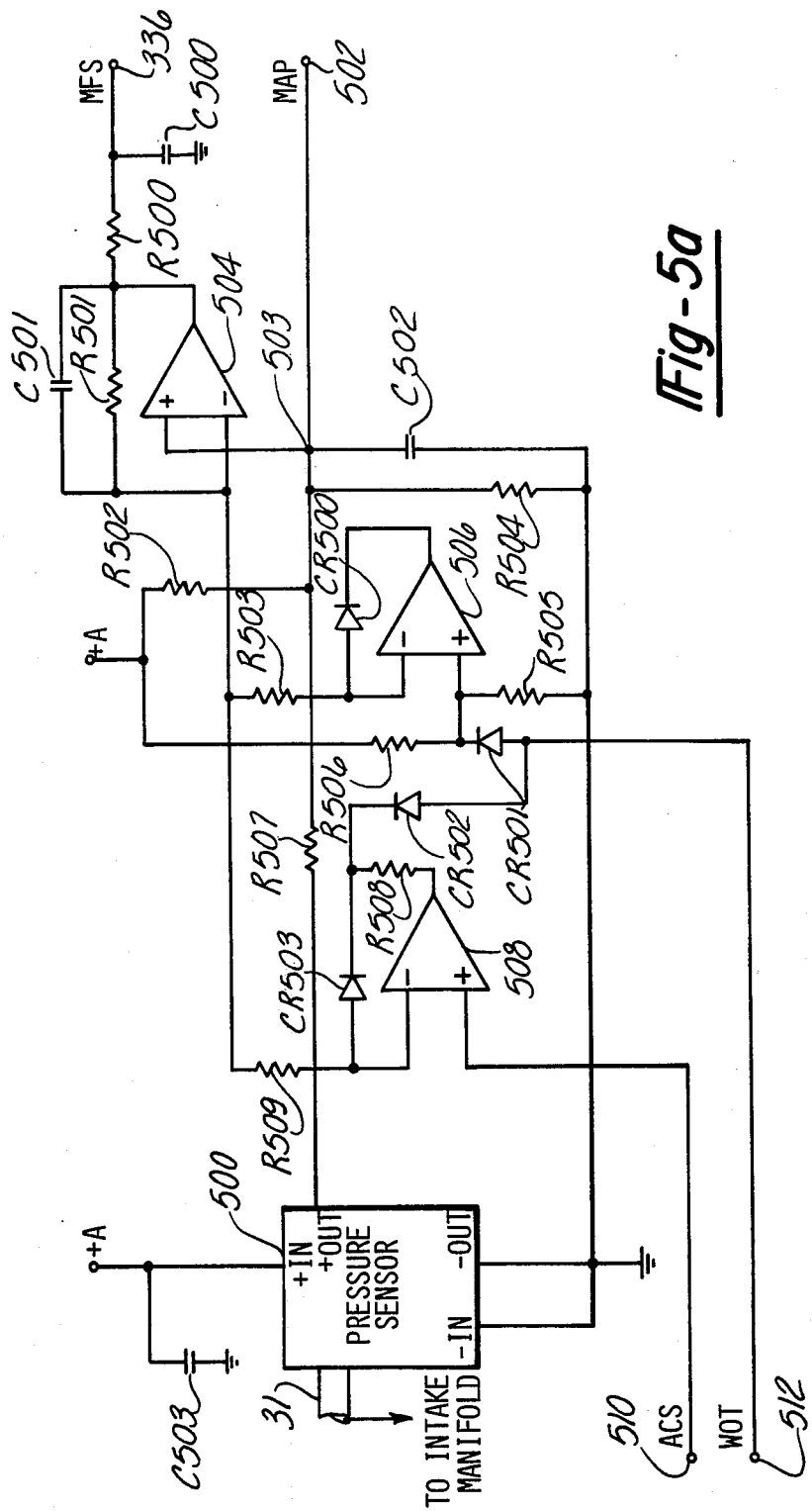
FIG. 5a is a detailed schematic diagram of circuitry for the pressure sensing circuit illustrated in FIG. 2.

FIG. 5 illustrates the connections of the manifold pressure sensor 500 and the pressure sensing circuit 14. The MAP sensor has its differential inputs −1N, +1N, connected to ground and the source of positive voltage, +A, respectively. The +A terminal is provided with a filter capacitor C503 connected between the terminal and ground. The differential output +OUT generates a positive voltage which is an analog representation of the physical pressure detected in the intake manifold 15 of the engine. The differential output −OUT is connected to ground. The sensor may comprise a pressure bellows which changes the magnetic coupling of a differential transformer by moving a core attached thereto. A preferred sensor of this type is a linear differential pressure transducer manufactured by Gulton Industries of a Costa Mesa, Calif.

The output of the sensor is the signal MAP which is provided to other portions of the system via terminal 502. An offset level for the MAP signal, a voltage versus pressure waveform is provided at the junction 503 of a pair of divider resistors R502, R504 connected between the source of positive voltage +A and ground. The junction 503 is connected to the +OUT terminal of the pressure sensor 500 via a trim resistor R507. The offset level and the trim resistor R507 can be adjusted so that different physical sensors of this type may be adjusted in various systems to provide identical MAP signal voltage versus pressure waveform. The offset level provides a zero adjust for an initial pressure setting and the resistor R507 is a slope multiplier. The circuit normalizes the outputs of the different sensors so the remaining system calibration does not have to be changed for each sensor. Filtering and decoupling compensation is provided by a capacitor C502 connected between the node 503 and ground.

The MAP signal from the pressure sensor 500 also feeds the noninverting input of a voltage amplifier 504 having a parallel feedback loop consisting of a filter capacitor C501 and a resistor R501 connected between its output and inverting input. The ampifier 504 is connected as a noninverting voltage amplifier having a gain dependent upon the ratio of the resistance to ground. The capacitor C501 attenuates high frequency noise. The gain of the amplifier 504 is changed by two breakpoint amplifiers 506, 508 that increase the gain of the amplifier 504 by lowering the effective resistance between the inverting input and ground at certain values of the MAP signal.

Initially at low MAP signal values, the amplifiers 506 and 508 are both in the non-conducting condition and block current flow through two current paths to ground. A first current path for amplifier 506 is the series connection of a resistor R503, a diode CR500 and the output of the amplifier to ground. A second current path for amplifier 508 is the series connection of a resistor R509, a diode CR503, a resistor R508, and the output of the amplifier 508 to ground.

Amplifier 504, when both of these current paths are blocked, has only feedback resistance R501 connected between its output and noninverting input and, therefor, has substantially a unity gain. The output of the amplifier 504 will follow the voltage applied to the noninverting input which at these low MAP levels will be the pressure sensor output or MAP signal. This voltage is output via terminal 336 as the manifold absolute pressure function signal, MFS, via an output resistor R500. The resistor R500 further forms a low pass filter with a capacitor C500 connected between the terminal 336 and ground.

The first breakpoint of the amplifier 504 at which the gain will increase occurs at a threshold voltage set on the noninverting input of amplifier 506. The threshold voltage is developed at the junction of a pair of divider resistors R506 and R505 connected between the source of positive voltage +A and ground.

As soon as the voltage on the inverting input of the amplifier 504 exceeds this threshold, the inverting input of amplifier 506 will exceed it because of its connection to that point through a resistor R503. The amplifier 506 will as a consequence begin conducting thereby pulling current through the first current path and increasing the gain of the amplifier 504 by a factor. The amount of increased slope or gain is determined by the value of the resistor R503 and the breakpoint is determined by the threshold voltage.

Moreover and similarly in operation, when the voltage on the inverting input of the amplifier 504 reaches the second breakpoint voltage which is set by the voltage signal ACS input through terminal 510 to the noninverting input of amplifier 508, the amplifier will conduct and pull current through the second current path which is the serial combination R509, CR503 and R508 to ground. The parallel combination of these two current paths will reduce the resistance seen by the feedback loop of the amplifier 504 even more and thereby raise the gain to a higher slope.

The second breakpoint is set by the voltage supplied to the MAP sensing circuit by the altitude compensation signal ACS. This compensation signal provides one of four different voltage levels for operation of the vehicle at differing altitudes. The ACS will thus move the second breakpoint to different positions on the MFS curve as a function of the altitude as will be more fully explained hereinafter with reference to the detailed description of the altitude combination circuitry.

A special condition exists when the wide open throttle signal WOT, input through terminal 512 to the common anode connection of diodes CR501, CR502, goes to a high voltage. The WOT signal is fed to the noninverting input of the amplifier 506 via the diode CR501 to raise the threshold voltage at that terminal significantly above common MAP signal voltages. This will cause the amplifier 506 to be nonconductive at all times when the WOT signal is present.

A high WOT signal further provides a reverse bias voltage to the junction of the diode CR503 and the resistor R508 via the diode CR502. This reverse voltage will block the conduction of current through the second current path. By deenergizing the first current path and blocking the second, the WOT signal will cause the MFS signal to follow the MAP signal as the gain of amplifier 504 will again be one. Enrichment for this condition will be supplied by a different portion of the circuit as will be more fully explained hereinafter with respect to the correction current combination circuit.

FIG. 5b illustrates the graphical representation of the MFS signal voltage versus manifold absolute pressure at a reference altitude such as sea level. The reference altitude will produce the highest ACS signal voltage. The first breakpoint 514, approximately 275 torr begins that portion of the graph which is representative of normal operating conditions where fuel flow is a linearly increasing function of MAP. At the second breakpoint 516, at around 600 torr, the engine will enter a power enrichment portion of the graph where an increased fuel slope is necessitated. These increased slope conditions are preferably a partial throttle response of the engine to an increase in load. At MAP signals below 275 torr, the engine is usually in deceleration and should have the least slope of the curve. At WOT, the breakpoints are negated and the MFS signal will substantially follow the MAP signal as indicated by the linear relation labeled WOT in FIG. 5b.

As was true for the SFS signal, the MFS could be a more complex function of manifold absolute pressure. However, it has been found that the double breakpoint waveform for partial throttle and the linear relation for wide open throttle is preferable and advantageous in the present implementation.

In FIG. 6, detailed circuitry illustrating the voltage regulation circuit 36 and the injection driver circuit 10 is shown. The voltage regulation function is accomplished by one part of an integrated circuit 606 encapsulated in a DIP package. The integrated circuit 606 receives unregulated battery voltage +B via a terminal 600 which is connected to the terminal of the same designated on the IC package. The +B signal is also communicated to the collector of an NPN regulating transistor Q303 whose emitter is connected to a regulated power line 605. By controlling the conductance of the transistor Q303, the unregulated +B signal becomes a regulated source of voltage +A which is input to the terminal of the same designation in the IC.

The IC 606 senses the +A signal and compares it to an internal reference signal to regulate the conductance of the transistor Q303 via connection at its base to the terminal CB. A capacitor C600 is connected between the base of transistor Q303 and ground for filtering purposes of the regulation control signal. The transistor Q303, therefore, acts as a series pass regulator for producing the supply voltage +A for the rest of the system.

The injector drive signal IDS, which is transmitted to the TP input of the integrated circuit 606 from the terminal 332, is used to provide pulse width information to the driver circuitry. The FFS signal input to the FF pin of the integrated circuit 606 via terminal 112 is the injector timing signal used to gate the IDS signal. Driver lines 612 and 614 connected to pins D1 and D2 respectively carry the IDS signals to a set of amplifiers 616 and 618 which drive the groups of injectors via the IG1 and IG2 signals from terminal 608 and 610 respectively.

The driver signals from the terminals D1 and D2 are provided by alternating or gating the IDS signals to the driver lines 612 and 614. For example, on the positive going edge and during the on time of the FFS signal, the IDS signal will be gated via input driver 614 to the driver circuit 616. On the negative edge and during the off time, the IDS signal will gate via input driver line 612 to the driver circuit 618.

Current regulation during the opening and closing portions of the pulses of the IDS signal are controlled with a current driver line 620 connected through a sense resistor R607 to the +B signal. The integrated circuit package controls the current to the driver line 620 by monitoring the voltage drop across the resistor R607 via two shunt paths on either side of the resistor. The first shunt path is through the serial combination of a diode CR600 and a resistor R606 connected from the +B terminal to ground. The second shunt path is through a diode CR601 and a resistor R605 connected between the power line 620 and ground.

The junction voltage of the diode CR600 and resistor R606 is communicated to the RA pin of the integrated circuit via resistor 604 and the junction voltage of the diode CR601 and resistor R605 is communicated to the CS pin of the integrated circuit. Frequency compensation and filtering are provided by a serial combination of a resistor R608 and a capacitor C602 connected between the CC terminal of the IC606 and the +B terminal. The operation and the detailed description of the integrated circuit 606 is more fully described in a copending application Ser. No. 370,140, filed on June 14, 1973 in the name of Junuthula N. Reddy and commonly assigned with the present disclosure. The disclosure of Reddy is hereby expressly incorporated by reference herein.

Since driver amplifier 616 and driver amplifier 618 contain identical circuitry, only the driver amplifier 616 will be explained in more detail. The operation of the amplifier 618 will then be understood by reference to similar circuit members described in the example.

Amplifier 616 is a three-stage emitter follower amplifier having a first drive transistor Q42 which is turned on by the positive going edge of the IDS pulse. The transistor Q42 has its collector terminal connected to the current line 620 via a resistor R611 and its emitter connected to the injector drive terminal 610. The transistor Q42 further has between its base and emitter terminal connected a base resistor R609 and between the emitter terminal and ground a serial combination of a resistor R610 and a capacitor C603.

Turning on Q42 will energize a second stage transistor Q43 which is generally biased off through the resistor R611. The transistor Q43 has its emitter connected to the current drive line 620 and its collector connected to the injector drive terminals 610 via a resistor R612. Further connecting the collector and base is a feedback capacitor C604. The resistor R612 provides base voltage drive to an output transistor Q44 which has its collector connected to the current drive line 620 and its emitter connected to the injector terminal 610. Thus, turning transistor Q42 on will cause transistor Q43 to conduct which in turn will turn transistor Q44 on. Similarly, when the IDS signal goes low, the injector drive line will follow as each stage of the amplifier shuts off.

A serial combination of a diode CR604 and a Zener diode CR602 is connected between the base of the output transistor Q44 and ground to provide a means for dissipating the flyback energy of the coils of the solenoid injectors.

Since there are four injectors in each group connected to a common drive point, significant amounts of energy are stored in the magnetic fields of the coil inductances and when transistor Q44 shuts off, the voltage at terminal 610 begins to rise very quickly in the negative direction. The base of the transistor Q44 being turned off by the transistor 43 will, however, begin to follow this voltage until the base of the transistor Q44 becomes negative enough to turn the Zener diode on through diode CR604 and it thus will clamp at its Zener voltage. The energy may then be dissipated through the emitter-collector junction of the transistor Q44 instead of the base-emitter junction.

The energy can be dissipated very quickly and easily in this manner and provides an advantageous benefit in that the gain of the transistor can be used. By dissipating the energy through the transistor collector to emitter path, the wattage rating of the Zener diode may be reduced by the gain of the transistor. Illustratively, if a 30-watt diode was necessitated to dissipate the energy from the four injector coils before, a transistor with a gain of 30 would now allow a 1-watt Zener diode to be utilized thereby producing a significant cost savings.

Figure 7A:
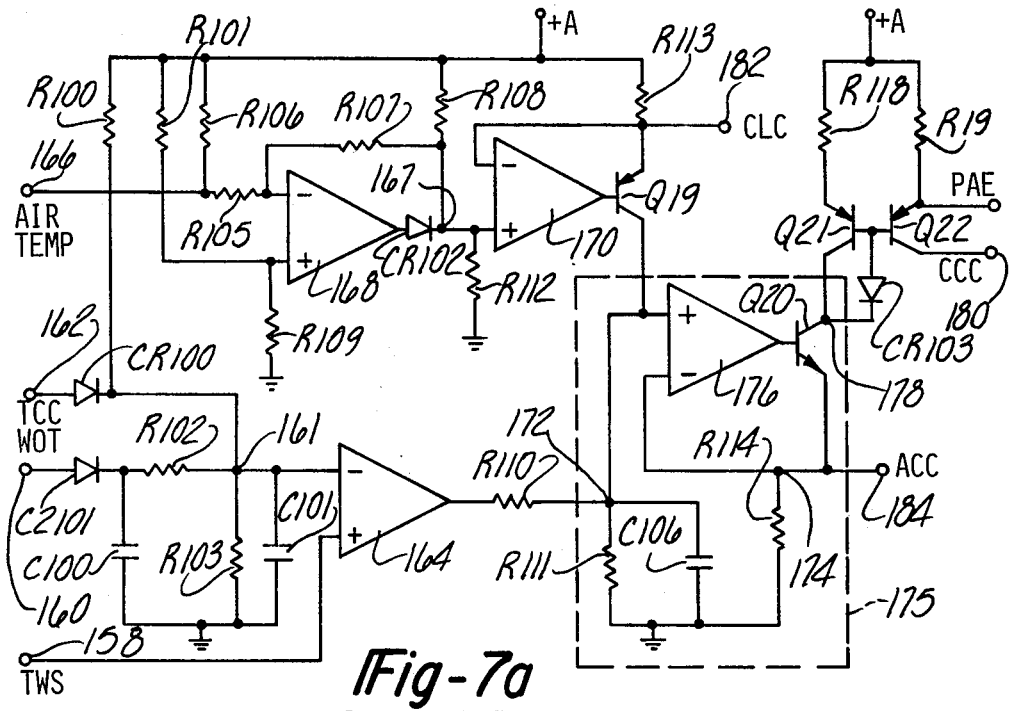
FIG. 7a is a detailed schematic circuit diagram of the correction current combination circuit illustrated in FIG. 2.
Figure 8A:
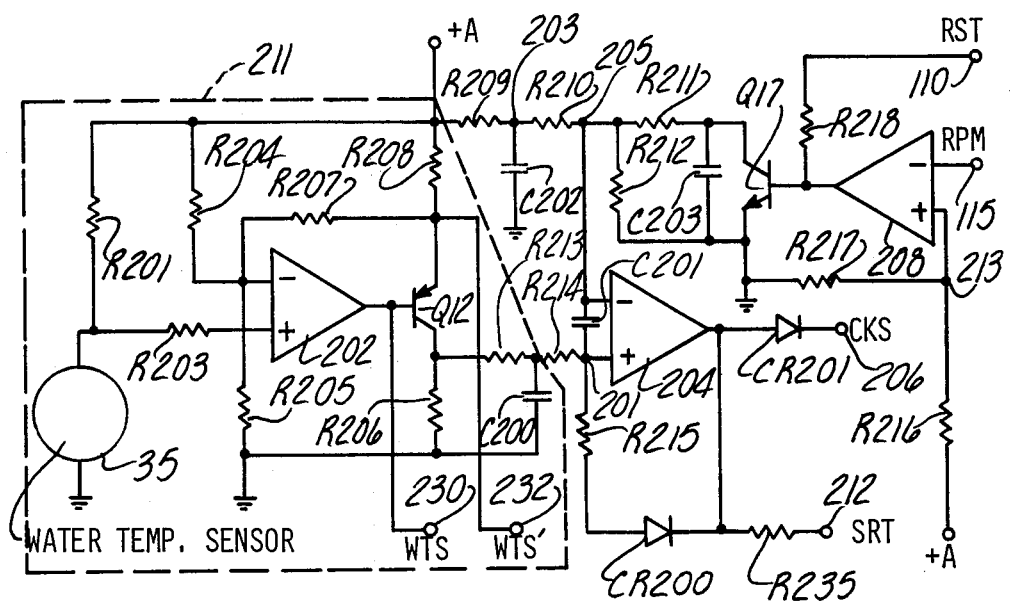
FIG. 8a is a detailed schematic diagram of the cold cranking function circuitry illustrated in FIG. 2.

FIG. 7 illustrates the detailed circuitry of the correction current combination circuit which combines the various correction current signals TCC, ACC, CLC, air temp, and WOT to provide the slope or ramp rate of the charging current to the timing capacitor C308 of the pulse width circuit. The current signal CCC is generated as a charging current at terminal 180 through the serial path of a load resistor R19 and the emitter-collector junction of a current source transistor Q22. The base of the current source transistor Q22 is connected to the base of a mirror transistor Q21 which has its emitter connected to the source of positive voltage +A through a load resistor R118 and its collector connected to the cathode of a diode CR103 at a voltage node 178. The commonly connected bases of both transistors Q21 and Q22 are further connected by the diode CR103 to the voltage node 178.

By controlling current pulled through the mirror transistor Q21 by a control transistor Q20 and hence the voltage at node 178, the current supplied through the transistor Q22 can be accurately controlled to mirror this value. The greater the current supplied through the transistor Q22 to terminal 180 the shorter will be the resulting injector pulse width because of the faster charging of the timing capacitor of the pulse width generation circuit and conversely supplying less current will extend the pulse duration.

The amount of current drawn by the control transistor Q20 and the voltage at node 178 is dependent upon and controlled by a voltage controlled current sink circuit 175. The voltage controlled circuit 175 includes an operational amplifier 176 having its output connected to the base terminal of the control transistor Q20. The transistor Q20 has its collector connected to the voltage node 178 and its emitter connected to one lead of a voltage resistor R114 whose other lead is connected to ground. A voltage node 174 which is the junction of the emitter of the transistor Q20 and the resistor R114 is further connected to the inverting input of the amplifier 176. The noninverting input to the amplifier 176 is connected to a voltage node 172 which controls the voltage at the node 174 by causing the control transistor Q20 to draw enough current through the transistor Q21 to equalize the voltages between the node 172 and 174 or the inputs of the amplifier 176. Thus, the current signal CCC can be controlled by varying the voltage at node 172.

The voltage at the node 172 is developed across a current summing resistor R111 connected between the node and ground. The current supplied to the resistor R111 is generated from combining the output of two devices; the first from a multiplier amplifier 164 and the second from a current source amplifier 170. The current source amplifier 170 supplies current to the node 172 and the multiplier amplifier sinks current away from the node 172. These devices will now be discussed separately with the current source amplifier 170 the initial point of description.

Current that is transmitted by the amplifier 170 to the node 172 is controlled by a driver transistor Q19. The driver transistor Q19 is connected at its emitter to the source of positive voltage +A through a load resistor R113 and further connected at its collector to the node 172. Control is provided to the transistor Q19 by connecting the output of the amplifier 170 to the base of the transistor and feeding back a voltage signal to the inverting input of the amplifier from the emitter of the transistor. The amplifier has a bias voltage connected at its noninverting input which is the junction voltage at node 167 of a pair of divider resistors R108 and R112 connected between the source of positive voltage +A and ground.

The bias voltage then causes the amplifier 170 to try to equalize the voltage at its inputs and thereby controls the current sourced through the transistor Q19 and the voltage at node 172 as a function of the voltage input to the threshold node 167. A quiescent current flows through the summing resistor R111 from the transistor Q19 as a result of the bias voltage at node 172. Along with a quiescent current from the multiplier amplifier 164, this current will set a base calibration voltage on the node 172 and consequently a base calibration current to flow from the terminal 180. At this point, the ramp of the charging capacitor C308 will be set and the system will deliver a pulse width as a function of only the MFS and SFS signals as previously discussed.

By varying the current signal, CCC and thus the slope of the charging ramp as a function of other variables of the engine the pulse width to the injectors can be corrected for a number of physical operating conditions.

The first correction to the base RPM, MAP calibration is for an air temperature calibration and is applied to the node 167. The voltage at the node 167 is increased by an inverting amplifier 168 which receives the air temp signal via terminal 166 and delivers a positive current to the node 167 from its output. The output of the amplifier 168 is proportional to the air temperature and varies the drive of the amplifier 170 at the node 167 in correspondence with this signal. This will cause less current to be supplied to the node 172 thereby lengthening the pulse width and providing greater enrichment for cold air temperatures. This, of course, is needed because the air flow is becoming increasingly denser as the ambient temperature decreases. As the air temperatures become more elevated, a lean out is provided to shorten the pulse widths.

The circuitry comprising the inverting amplifier 168 is formed by providing a positive bias voltage at the noninverting input of amplifier 168 which is the junction voltage of a pair of divider resistors R101 and R109 connected between the source of positive voltage +A and ground. The input to the inverting input of the amplifier 168 via an input resistor R105 is developed at the junction of the combination of a resistor R106 and the air temperature sensor connected between the source of positive voltage +A and ground. A negative gain for the amplifier 168 is generated by connecting a feedback resistor R107 between the output, which is developed through a blocking diode CR102, and the inverting input. The blocking diode CR102 permits the amplifier 168 to source current to the node 167 but not to sink current from it.

In operation, as the air temperature increases and the resistance of the air temperature sensor goes up, the voltage at the inverting input of the amplifier 168 will increase causing the voltage output at the node 167 to decrease. This increasing voltage at the inverting input will shorten the pulse width by increasing the current output from terminal 180 proportionately. At this point, the speed density calibration of the ECU is complete as the SFS and MFS calibration has been corrected for air density variations on account of air temperature.

The effect of the air temperature correction on pulse width is illustrated in FIG. 7b where the enrichment is greater at lower temperatures than at higher temperatures. An incremental change in temperature at the sensor will cause a linear incremental change in the current from transistor source Q19. Since the voltage at node 172 and hence the pulse width will change as 1/R for an incremental changes in current, the enrichment will vary as 1/T as illustrated in the figure.

The closed loop correction signal CLC may also be connected to the emitter of the transistor Q19 to provide a closed loop current correction to the pulse width. The closed loop signal is joined into the circuit at this point to allow the basic correction to be changed by a closed loop correction based upon the signals from an exhaust gas composition sensor. Closed loop circuits for providing an integral control signal based upon the oxygen content of the exhaust gas are conventional in the art. Since a closed loop signal of this type is generally clamped during start and warm up conditions, the signal should not adversely affect those calibrations and, therefore, is isolated from the start and warm up circuitry in this manner.

In the referenced system, closed loop control is provided by regulating a current sink to vary the amount of current applied to the node 172. Normally, when the system is operating under open loop control the current sink is operable to draw a fixed amount of current from the emitter of Q19 to form a midpoint value. The current sink is subsequently regulated under closed loop control to either lengthen the pulse width by drawing more current away from emitter Q19 or to shorten the pulse width by drawing less current away from the emitter of the source transistor. If the closed loop controller is used with the system, the quiescent value of current to the resistor R111 will take into account the midpoint value for open loop system operation.

The output of the multiplier amplifier 164 is connected to the current summing resistor R111 via a resistor R110. The amplifier further has a threshold voltage connected to its inverting input which is the junction voltage of a pair of divider resistors R100 and R103 connected between the source of positive voltage +A and ground. An integrating capacitor C101 is further connected between the inverting input of the amplifier 164 and ground. The noninverting input of the amplifier 164 receives the TWS signal from the triangular waveform generator via terminal 158.

On the upward ramp of the triangular waveform TWS the noninverting input of amplifier 164 will exceed the voltage set at the inverting input and the output of the amplifier will transition to a high level. The triangular waveform will then peak at a voltage of +6V and begin a downward ramp and, as that ramp voltage crosses the inverting input voltage, will cause the output of the amplifier 164 to transition to a low level. In this way, the output of the amplifier 164 will be a squarewave whose duty cycle is dependent upon the voltage at the inverting input of the amplifier 164.

The threshold voltage developed by the resistors R100 and R103 is chosen to form a quiescent duty cycle which, when output through the resistor R110 and summed in the resistor R111 at node 172 will be just below the TWS signal. An integrating capacitor C106 connected between the node 172 and ground produces the voltage component from the multiplier amplifier 164 as a linear function of the duty cycle of the pulses.

The TWS signal is illustrated in FIG. 7c as a triangular waveform that ramps between a positive voltage value and substantially ground level. Any voltage over the threshold will produce positive pulses from the output of the amplifier 164. The duration of the positive pulses may be decreased by increasing the voltage at the node 161 which will thereafter decrease the voltage at the node 172 by sinking more current and thus reduce the charging current from terminal 180 to lengthen the pulse width signal to the injectors and provide enrichment.

The warm up current signal TCC enters node 161 via the terminal 162 and diode CR100 to produce an increase in the voltage on the resistor 103 proportional thereto. The greater the warm up current, the greater the conducting time of the output duty cycle of the amplifier 164 will be and thus the smaller the current that will be delivered from the CCC signal. The result of an increasing warm up signal TCC will be to lengthen the pulse width for warm up enrichment.

The TCC signal is in the preferred embodiment a variable amplitude current with a variable duty cycle. As will be more fully explained hereinafter, the duty cycle of the "on" time of the TCC signal will be increased with the MAP signal to provide increased enrichment for heavy loading of the engine while the amplitude of the signal will be varied with time and temperature. The TCC signal is illustrated in FIG. 7c as a voltage level that varies above the threshold level of amplifier 164 to decrease the pulse width to a value $T_1$ in FIG. 7d and to a value $T_3$ in FIG. 7e.

Further enrichment is provided by providing the WOT signal to be summed at the node 161 via a resistor R102 and a diode CR100 through terminal 160. A capacitor C100 is connected between the resistor and diode junction and ground to provide low pass filtering for the basically digital WOT signal.

Resistor R120 is chosen as a value to provide an increase in enrichment voltage at the node 161 in addition to the threshold voltage or the voltage developed by the TCC current signal. This extra voltage from the WOT signal will cause the shortening of the duty cycle of the amplifier 164 and thus a reduction in the CCC current output and a lengthening of the pulse width. The WOT enrichment is needed for engine power at wide open throttle and overrides the base calibration. Voltage level WOT as illustrated in FIG. 7c causes a shortening of the pulse width from the amplifier 164 to a value $T_2$ as seen in FIG. 7e.

Beyond the speed-density calibration of the ECU 13 and correction currents of FIG. 7, there is an additional correction factor for air/fuel ratio during the special condition of start up. Although the start up period is relatively short in duration, correct air/fuel ratio control during this period is critical for driveablity. The cold cranking function circuitry 20 is utilized for an enrichment of the air/fuel ratio during start up and supplies pulse width information to the injector driver directly via the CKS signal.

The cold cranking function circuitry will now be more fully described with reference to FIGS. 8a–e. The cold cranking function circuit provides extra temperature dependent fuel pulses to enrich the air/fuel ratio during cranking for quick and easy stating of a cold engine. The circuit comprises a comparator 204 which has an output connected to a terminal 206 via a diode CR201. Terminal 206 provides the cold cranking pulses as a signal CKS to be ORed with the main fuel pulses. These pulses will usually be larger than the PWS signals and thus overlap them. When the engine starter solenoid is disengaged, the CKS signal will be inhibited and the PWS signal will then supply the scheduled fuel to produce a smooth transition from the starting condition.

One input to the amplifier 204 via the inverting input is supplied via the junction voltage 205 of a divider combination consisting of a resistor R210 and a resistor R212 connected between a supply voltage node 203 and ground. The supply voltage node 203 is essentially at the positive voltage supply +A and is decoupled and filtered during cranking of the engine starter when the voltage regulation of the vehicle is somewhat irregular by a decoupling resistor R209 and a filter capacitor C202.

The junction of the divider, node 205, is periodically grounded through the collector-emitter of a transistor Q17 and a timing resistor R211. The emitter of the transistor Q17 is connected to ground and its base is connected via a resistor 218 to terminal 110. Further connected at the collector of the transistor Q17 is one terminal of capacitor C203 which has its other terminal connected to ground.

Terminal 110 is a source of the reset signal RST illustrated in FIG. 8b. The RST signal grounds node 205 by causing the transistor Q17 to conduct on the positive going edge of the pulse and subsequently holds the node at ground for the duration of the pulse thereby discharging the capacitor C203. At the termination or the falling edge of the reset pulse, the transistor Q17 will turn off and capacitor C203 will charge exponentially to the divider voltage of node 205 set by the resistors R210 and R212. The charging time for the increasing voltage will be the RC time constant of the capacitor C203 and the resistor R211. The voltage waveform at node 205 is illustrated in FIG. 8c as V(N205).

A variable threshold voltage is supplied to the noninverting input of the amplifier 204 at node 201 via an input resistor R214 from a water temperature sensor circuit 211. This threshold voltage varies with the temperature of the coolant of the engine and is an indication of the operating temperature of the engine. Decreasing voltages at node 201 indicate increasing engine temperature. The amplifier 204 will then switch between conduction and nonconduction to generate the cold cranking pulses by comparing the voltages at nodes 201, 205 that are applied to its inputs. The variable threshold voltage VN201 is illustrated in FIG. 8c.

Cold cranking pulses will begin at 220 in FIG. 8d on the initial edge of the reset pulse when node 205 is grounded and drops the inverting input voltage below the threshold voltage supplied to the noninverting input. The pulse will terminate at 222 when the voltage at node 205 exceeds that of node 201 at 224. The pulse length is dependent upon the level of the threshold voltage and the timing constant of the capacitor C203. Colder temperatures or higher threshold voltages will cause the exponentially increasing voltage on node 205 to cross the threshold later in time than when the engine is warmer and thereby increase the pulse width as seen by pulse 226. Lower threshold voltages developed at higher engine temperatures will cause shorter pulse widths such as pulse 228.

A positive feedback loop for the amplifier 204 is provided by the series combination of a resistor R215 and a diode CR200 connected between the output and noninverting input. The circuit is further provided with an active pull up for the amplifier 204 via the resistor R235 connected between the output of the amplifier 204 and terminal 212. The SRT signal is received at the terminal 212 and enables the CKS signal only during its high voltage state as seen in FIG. 8e. Thus, the CKS signal will be inhibited when the start signal is not present i.e. when the starter solenoid releases.

The operation of the amplifier 204 is additionally inhibited by the amplifier 208 having a threshold voltage at a junction 213 of a pair of divider resistors R217 and R216 connected between the source of positive voltage +A and ground. The inverting input of the amplifier 208 receives the RPM signal, a voltage proportional to the RPM of the engine, via terminal 115 and compares it to the threshold voltage. The amplifier 208 is an open collector type that grounds the base of the transistor Q17 through its output terminal once the RPM signal voltage exceeds the threshold. Preferably the threshold voltage is representative of approximately 325 RPM which minimizes over enrichment during starter overrun. The threshold is illustrated in FIG. 3f as the voltage level labeled RPM(CK) or the RPM cranking threshold.

The temperature dependent threshold voltage at the node 201 is developed by a noninverting voltage amplifier 202. Amplifier 202 is connected at its output terminal to the base of a PNP transistor Q12 that provides current drive from a pull up resistor 208 connected to the source of positive supply +A. The current is used to develop a voltage across a resistor R206 connected between the collector of transistor Q12 and ground.

The gain of the amplifier 202 is determined by a feedback resistor R207 connected between the inverting input and the emitter terminal of transistor Q12, the parallel combination of a resistor R205 and a resistor R204. An offset of approximately one volt is provided to the inverting input by the divider combination of a resistor R204 and the resistor R205 connected between the source of positive voltage +A and ground.

The $H_2O$ signal is input to the amplifier 202 at its noninverting input is via an input resistor R203 which is fed from the junction of a resistor R207 and the water temperature sensor 35 connected between the source of positive voltage +A and ground. The water temperature sensor 35 is a variable resistance which will vary the junction voltage of the sensor and the resistor R202 between approximately 4 and 6 volts in response to changes in the coolant temperature. This voltage is proportionately amplified to provide a swing from approximately 4 to 9 volts at the emitter of transistor Q12 and thereby a proportional voltage at the junction of its collector and resistor R206. This voltage proportional to the coolant temperature is thereafter filtered by a low pass filter consisting of a resistor R213 and a shunt capacitor C200 which transmits the voltage to the input resistor R214 of the amplifier 204.

The water temperature circuit 211 further provides the water temperature signal WTS and its analogy WTS' to various other parts of the system via terminals 230, 232, respectively. Signal WTS is used to sink current into the output terminal of amplifier 202 and provides an increasing conductance for decreases in engine temperature while the WTS' signal is a voltage from the emitter of Q12 which increases with temperature. The WTS, WTS' signals are utilized mainly in the warm up correction circuitry which will now be described in detail.

Figure 9A:
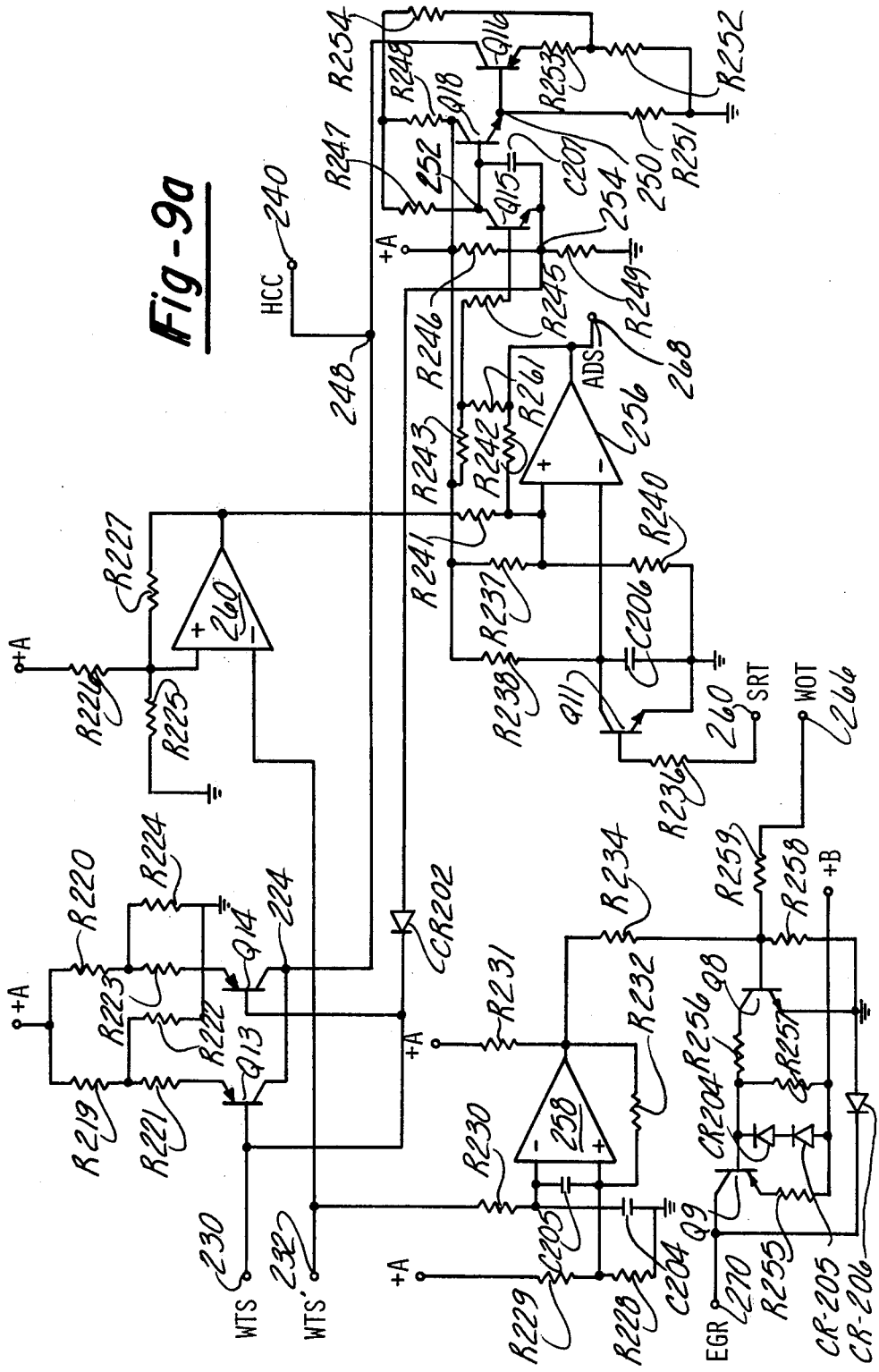
FIG. 9a is a detailed schematic diagram of the AB curve correction circuit illustrated in FIG. 2.

The circuitry comprising the A and B curve warm up correction is shown to advantage in FIG. 9a. The A curve circuitry provides a warm up correction that is time and engine temperature while the B curve circuitry provides a warm up correction based on engine temperature only. Each of these circuits produce an enrichment current which is summed with the other with the total then corrected for engine load as will be more fully explained during the description of the positive K circuit.

The B curve current is supplied by two parallel source transistors Q13 and Q14 to the terminal 240 via their common collector connection at node 224. When combined at node 248 with the A curve current produced via a source transistor Q16, the terminal 240 generates a total temperature current signal HCC.

The transistor Q13 is connected at its base to terminal 230, at its emitter to a load resistor R221, and at its collector to the current summing node 224. The other terminal of the load resistor R221 is connected to the junction of a voltage divider having a divider resistor R219 and a divider resistor 222 connected between the source of positive voltage +A and ground. The transistor Q14 is configured similarly with its base to the terminal 220, its emitter to a load resistor R223 and its collector to the current summing node 224. As was the case for the load resistor 221, the load resistor 223 is connected at its other terminal to the junction of a voltage divider having a divider resistor R220 and a divider resistor R224 connected between the source of positive voltage +A and ground.

In operation, the B curve current generator receives the water temperature signal, WTS, that varies with the engine operating temperature via the terminal 220. At low temperatures, the WTS signal is substantially lower (sinks more current) than at high temperatures and therefore Q13 and Q14 are fully on. Node 224 then receives the full current available from the divider voltages through the load resistors 221 and 223. The divider voltages are different and the lowest voltage will be the first breakpoint 261 of the B curve versus temperature schedule illustrated in FIG. 9c. When the WTS signal becomes greater than the first divider voltage, the reversed biased base will shut the transistor off and provide only one current source to the summing node 224. As the signal WTS continues to rise, the second transistor will thereafter shut off at the second divider voltage shown as point 262 in FIG. 9c forming a fully warmed up schedule. Therefore, at higher engine temperatures the B curve will supply less current than at lower temperatures until the current becomes zero at a temperature equivalent to the second divider voltage.

The divider voltages or breakpoints for the curve can be set at various positions, but preferably the first point 261 is set at approximately 60° F. and the second is set at approximately 150° F. Below 60° F., the increased slope of the curve provides necessary enrichment to operate the cold engine, and above 150° F. the B curve enrichment is no longer required as the full engine operating temperature has been reached.

The A curve current generation and enrichment schedule, illustrated in FIG. 9b, will now be discussed in greater detail. The A curve current source transistor Q16 operates in a similar manner to the B curve source transistors having its base connected to a node 250 which supplies it with a variable voltage that is time and temperature dependent and having its collector connected to the node 248 which sums the A and B current.

The emitter of the transistor Q16 is connected via an emitter resistor R253 to the junction point of a divider consisting of the serial combination of resistors R248, R254 and a divider resistor R252 connected between the source of positive voltage +A and ground. A low voltage applied to the node 250 will produce a maximum current out of the transistor Q16 to the node 248. As the variable voltage which is time dependent begins to rise at the node 250, less and less current will be supplied to the node 248 through the transistor Q16. When the voltage at the node 250 surpasses the breakpoint or the divider voltage supplied to the emitter of Q16, the current source will shut off.

The time dependent voltage at node 250 is generated by controlling voltage at a resistor R251 connected between the node and ground via an emitter follower. The emitter follower is formed by a transistor Q18 having its collector connected to the source of positive voltage +A and its emitter connected to the voltage node 250.

The drive voltage for the emitter follower transistor Q18 is provided by the node 252 which is the collector of a transistor Q15 which is initially in a conducting state. The transistor Q15 has its emitter connected to a voltage node 254 which forms the junction of a pair of divider resistors R246 and R249 connected between the source of positive voltage +A and ground. During the time the transistor Q15 is in conduction the node 252 and node 254 are only slightly different in voltage with a capacitor C207 being fully discharged through the transistor Q15 by being connected to its collector at one terminal and to its emitter at the other.

The voltage at the node 254 is dependent upon the ratio of the divider resistors R246 and R249 and upon the amount of current that is taken through the diode CR202 from the node by the WTS signal via terminal 220. As the temperature rises, less current is drawn through the diode CR202 and therefore the voltage rises on node 254 and 252, respectively, thereby driving the transistor Q18 further into conduction and the current source Q16 further out of conduction.

Figure 9B:
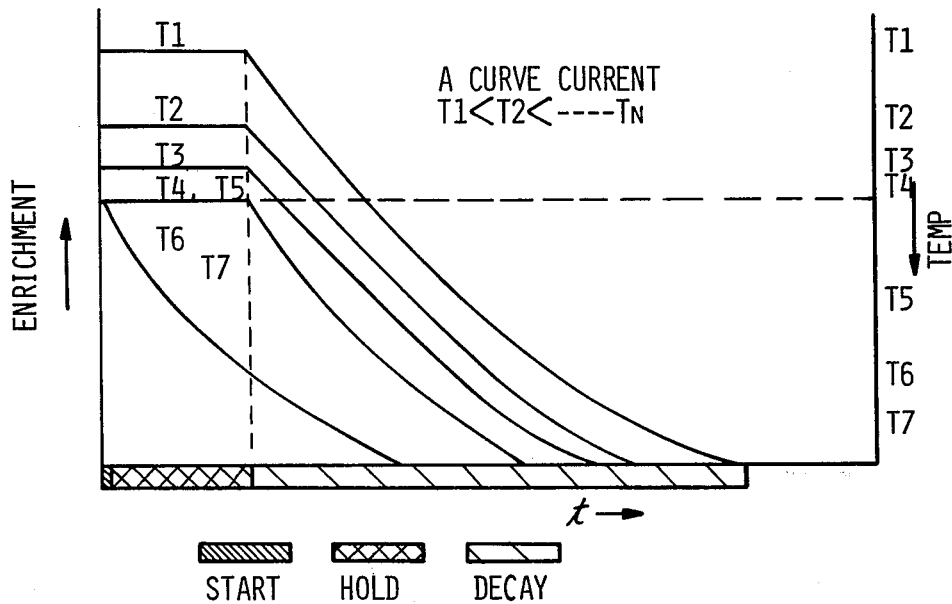
Figure 9C:
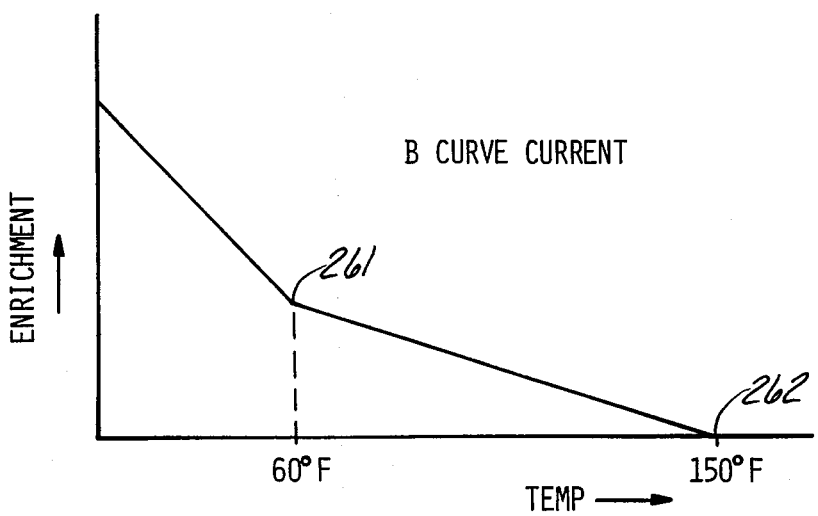

This will supply a temperature dependent starting current for the A curve schedule as shown for the increasing temperatures $T_1$—$T_3$ in FIG. 9b. The graphs illustrate that for increasing temperatures the initial currents for the A curve will decrease. However, at temperatures above $T_4$ the WTS signal will not draw any substantial current away from node 254 and the initial A curve current will be set by the divider voltage for the figure it is seen the initial starting points on the enrichment axis are identical for $T_4$, $T_5$ and $T_6$.

The transistor Q15 is initially in a conducting state via a positive bias consisting of the serial combination of a bias resistor R243 and a bias resistor R245 connected between the source of positive voltage +A and the base of the transistor. Connected to the junction of these bias resistors is a pull-up resistor R261 also connected to the output of a switching amplifier 256.

The amplifier 256 is normally turned off or nonconductive via a positive bias on its noninverting input. This bias voltage is developed by connecting the noninverting input to the junction of a pair of divider resistors R237 and R240 that are connected between the source of positive voltage +A and ground. The noninverting input further has a hysteresis resistor R242 connected between the output of the amplifier and the input.

The inverting input of the amplifier 256 is connected to the junction of a timing resistor R238 and a timing capacitor C206 connected between the source of positive voltage +A and ground. A transistor Q11 having its collector connected to the junction of the capacitor C206, resistor R238 and having its emitter connected to ground forms a means for discharging the capacitor 206 when the transistor is turned on by the start signal SRT provided through terminal 260 via an input resistor 236.

In operation, the SRT signal will cause the transistor Q11 to discharge the capacitor C206 and begin a timing cycle wherein the capacitor starts charging to the supply voltage with a timing constant determined by the resistor 238 and its capacitance. The timing cycle begins after the start signal SRT goes low which indicates the starter solenoid has opened. During the timing cycle of R238, C206 the transistor Q15 is conductive and will hold node 252 substantially at the temperature dependent voltage developed at node 254. This action generates the part of the schedule in FIG. 9b labeled hold. It is seen for different temperatures that different holding levels of enrichment current are generated at $T_1$, $T_2$, and $T_3$. The hold levels are then time dependent extensions of the initial A curve currents set by the voltage at node 254.

As the voltage at the inverting input of amplifier 256 passes through the threshold voltage of the divider R237, R240 the amplifier will ground the base of transistor Q15 through its output turning the transistor off.

After the base of transistor Q15 is grounded, the circuit begins charging the capacitor C207 from the positive supply +A via a charging path consisting of the series combination of the resistor R247 and the resistor R248. The increasing voltage at node 252 because of capacitor C207 causes the current from transistor Q16 to decrease. Since the capacitor voltage at node 252 is exponentially increasing the current supplied at the collector of transistor Q16 will exhibit an exponential decay.

The action of the amplifier 256 therefore holds the transistor Q16 into conduction for a set time period at a current dependent upon the temperature. Once the time period has elapsed, the current will decay to a fully engine fully warm value or in the preferred case decay to zero. This is illustrated to FIG. 9b and the portions of the graph labeled decay.

Another input to the noninverting terminal of the amplifier 256 is from an amplifier 260 via an output pullup resistor 241. The amplifier 260 is connected in a switching mode with a hysteresis resistor R227 connected between its output lead and the noninverting input. The noninverting input further has a threshold level applied to it from the junction of a divider consisting of a divider resistor 226 and a divider resistor 225 connected between the source of positive voltage +A and ground. The inverting input to the amplifier 260 is connected to the terminal 222 which is provided with the WTS' signal.

In operation, the WTS' signal is a measure of the engine operating temperature as was the WTS signal and is an increasing voltage with temperature. Therefore, as the engine temperature increases the inverting input of the amplifier 260 will become closer to the threshold of the divider R225, R226. As it passes through the threshold value, the amplifier 260 will ground the noninverting input of amplifier 256 through the output resistor 241. This essentially defeats the holding time constant of the capacitor C206 and the resistor R238 as the inverting input will almost immediately rise above ground thereby switching the amplifier 256 on and thus turning the transistor Q15 into a nonconductive mode.

The result of this hold defeating feature is illustrated in FIG. 9b at temperature $T_6$ where there is no holding period for the A curve current schedule. The threshold of amplifier 260 corresponds to the temperature $T_6$ and is selected such that the warm up and idle operation of the engine is not affected adversely. The holding time for current levels at any temperature above $T_6$ is also defeated as is shown by the curve for temperature. These hold defeat features permits enrichment when necessitated for driveability during warm up but reduces emissions and improves fuel economy when the holding function can be eliminated at high engine temperatures.

The operation of the EGR signal circuit will now be more fully explained. The EGR valve solenoid which is connected to the collector terminal of a transistor Q9 receives positive power voltage +B via a load resistor R255 when the transistor is turned on. The diode CR206 connected between the terminal of the EGR valve solenoid and ground provides a discharge path for the collapsing field of the solenoid coil when the transistor Q9 turns off. A pair of diodes CR204 and CR205 are serially connected between the base of the transistor Q9 and the +B terminal to limit the current flow through the transistor and hence the solenoid by providing a set voltage drop across the junction.

A signal transistor Q8 will turn on the power transistor Q9 by grounding one terminal of a resistor 256 connected at its other terminal to the base of the transistor Q9. A bias resistor R257 is connected between the +B power terminal and the base of transistor Q9 to provide reverse bias to the base of Q9 when the transistor Q8 is nonconducting.

Usually, the signal transistor Q8 is in a conducting state and therefore Q9 is in a conducting state. The bias for the conducting mode of Q8 is provided by a positive bias to the base terminal of the transistor. The bias is developed at the junction of a divider consisting of the serial combination of resistors R231, R234 and a resistor R258 connected between the source of positive voltage +A and ground.

A switching amplifier 258 is operable to turn transistor Q8 on or off is connected at its output terminal to the junction of the resistor R231 and the resistor R234. The amplifier 258 further has a hysteresis resistor R232 connected between its output terminal and its noninverting input. The amplifier 258 is provided with a threshold voltage at its noninverting input via the junction of a divider consisting of a divider resistor 229 and a divider resistor 228 connected between the source of positive voltage +A and ground. A control input signal for the amplifier 258 is provided by the junction of a filter capacitor C204 and an input resistor R230 the combination being connected between the terminal 222 and ground. The inverting input and the noninverting input of the amplifier 258 further has a delay capacitor C205 connected between them. The WTS' signal is input to the terminal 222 as an engine temperature indication.

In operation, the EGR signal is generally high engaging the EGR solenoid and positioning the EGR valve in order to block EGR flow from the engine. However, when the WTS' signal exceeds the threshold set by the divider 229, 228 at the noninverting input of the amplifier 258, the amplifier grounds the base of the transistor Q8 through its output terminal via the resistor R234.

As the transistor Q8 becomes nonconductive, the transistor Q9 also turns off and the EGR valve solenoid disengages the EGR valve and supplies the engine with exhaust gas recirculation of a certain percentage. This operation provides exhaust gas recirculation only when the engine operating temperature increases to the temperature required to generate substantial quantities of $NO_x$ which is represented by the threshold of amplifier 258. During these elevated temperature conditions control of the position of the valve is a function of manifold absolute pressure (intake manifold vacuum) as has been described previously.

A resistor R259 couples the WOT signal via terminal 266 to the base of the transistor Q8. When the wide open throttle signal goes high, the EGR valve will be closed even if the operating temperature of the engine is sufficient to pull Q8 out of conduction. This is a desirable operation during full power conditions indicated by the WOT signal, where exhaust gas circulation could be detrimental to power generation. This feature can be excluded if a timing adjustment is made for EGR at wide open throttle.

Figure 11A:
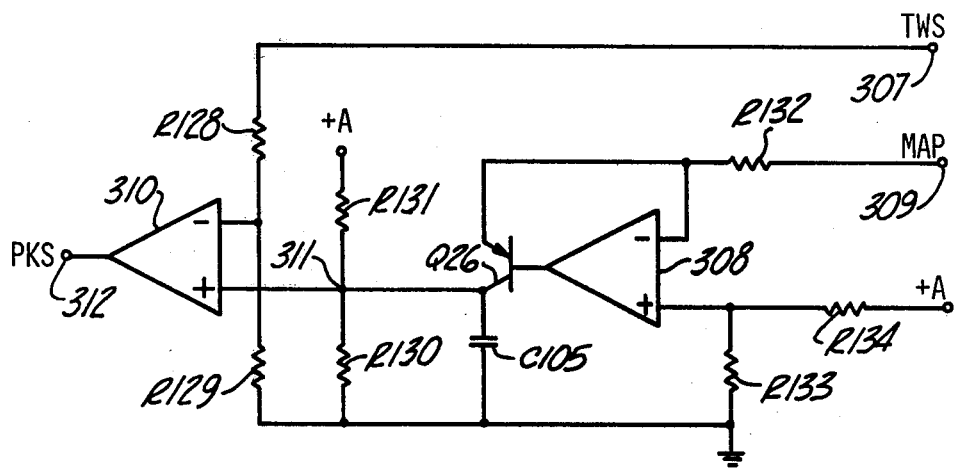
FIG. 11a is a detailed schematic circuit diagram of the positive K correction circuit illustrated in FIG. 2.

The linear positive K circuit which provides a load dependent correction to the warm up calibration of the A and B curve currents will now be more fully described with reference to FIGS. 11a, 11b. The linear positive K circuit comprising a multiplier amplifier 310 and a voltage amplifier 308 receive an input via a terminal 309 which is the MAP signal. The MAP signal is proportional to the load of the engine and is utilized by the circuit to enrichen the air/fuel ratio during high load conditions.

The MAP signal is transmitted to the inverting input of the amplifier 308 via an input resistor R132. The noninverting input of the amplifier 308 is supplied with a threshold voltage via the junction of a voltage divider comprising a divider resistor 134 and a divider resistor R133 connected between a source of positive voltage +A and ground. The output of the amplifier 308 is fed via its base terminal to a PNP transistor Q26 connected at its emitter to the inverting input of the amplifier and to one terminal of a capacitor C105 at its collector. The other terminal of the capacitor C105 is connected to ground.

The transistor Q26 and amplifier 308 configuration provides a thresholding amplifier with a unity gain. The threshold level is provided as representative of an absolute pressure in the intake manifold of approximately 325 torr which is the point at which load begins to be a factor in the warm up enrichment schedule.

The signal on capacitor C105 which is the MAP signal voltage is over the threshold voltage is presented at node 311 of the multiplier amplifier 310 via its noninverting input. A bias voltage supplied to node 311 is added to the capacitor signal before it is input to the amplifier 310. The bias voltage for the multiplier amplifier 310 is provided at the junction of a voltage divider comprising a pair of divider resistors R131 and R130 connected between the source of positive voltage +A and ground. The TWS signal scaled by a pair of divider resistors R128, R129 connected between terminal 307 and ground is input to the inverting input of amplifier 310 at their junction.

The triangular waveform signal TWS via the inverting input of amplifier 310 is mixed proportionately with the voltage formed at node 311 to provide a variable duty cycle signal, PKS, proportional to the pressure signal MAP. The operation of multiplier amplifier 310 is similar to the multiplier in the correction current combination circuit previously described. The bias voltage at node 311 provides a base duty cycle which is varied by the MAP signal in a linear manner. This linear positive K signal PKS which is represented by a square wave with a variable duty cycle is then output via the terminal 312 to be combined with the current from terminal 240 which comprises the HCC signal.

The combination of the PKS signal and the HCC signal is termed the temperature correction signal, TCC, and is input to the correction current combination circuit at terminal 160. The actual combination or linear multiplication in the present implementation is performed by sinking the HCC current into the output terminal of amplifier 310 when the TWS signal is greater than the voltage at node 311 and applying full HCC current to terminal 160 when the TWS signal is lower. Since the voltage at node 311 rises with an increasing MAP signal, greater amounts of the HCC current will be applied to terminal 160 at greater loads thereby providing more enrichment. Thus, by varying the on/off time of the PKS signal, the warm up current from the A and B curve generators can be made to vary linearly with the load of the engine.

The terminal 162 is one input drive terminal for the multiplier amplifier 164 which performs a linear multiplication of its inputs and changes the pulse width to the injectors accordingly as was previously described. Therefore, by inputting the TCC current at the terminal 162, the relationship between the warm up current and MAP will not change except by the scaling factor of mulipler amplifier 164.

With reference now to FIG. 11b, there is shown a three-dimensional representation of the warm up current as a function of MAP and temperature. The percentage of enrichment is the ordinate variable, with temperature represented on the X-axis and decreasing MAP forming the Z-axis variable. The heavy dark line 316 in the X-Y plane is the B curve current schedule of FIG. 9c and can be projected along the Z-axis by lines 318, 320, 322 to form a solid figure that does not vary with the PKS signal. However, if, as in the preferred embodiment, an enrichment factor that increases linearly for a rise in MAP or load is drawn at line 324, an enrichment surface bounded by lines 320, 324, 326, 328, and 330 is formed.

The solid formed in such a manner is the B curve current surface after providing linear positive K to the B curve current schedule. It is evident there is quite a significant change in warm up enrichment between those areas where the need is the greatest (cold engines under high load) and those areas where the enrichment factor is the least significant (warm engines and light loads).

The most enrichment change between the present system and prior systems, however, occurs at light loads and cold temperatures. The parabolic line 332 illustrates prior enrichment schedules where the greatest effect of positive K is at high loads, generally up in power operating region of the MAP schedules. It is evident by comparing the lines 324 and 332 that the shaded area of enrichment between the two has been lost by this method. The normal operating region of the MAP curve (300 torr-600 torr) is then provided with significantly more enrichment by the linear method. This schedule, it has been found, improves the driveability and response of the engine during the warm up period.

Similarly, the A curve of FIG. 9b is represented by a surface bounded by lines 334, 336, 338, 340, 342, 344. Line 334 illustrates the A curve schedule at minimum values of positive K and line 336 illustrates the A curve schedule at maximum values. The A curve surface, as has been noted before, will decay into the B curve surface with respect to time. The time variable has not been illustrated in FIG. 11b for the purpose of clarity.

Figure 10:
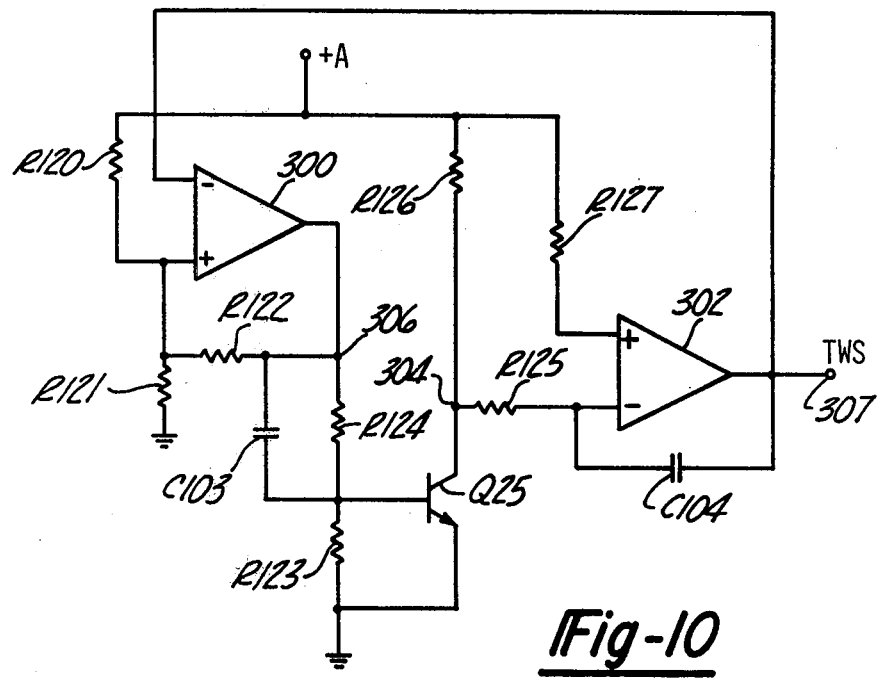
FIG. 10 is a detailed schematic diagram of the triangular wave generator circuit illustrated in FIG. 2.

With reference now to FIG. 10, the detailed circuitry comprising the circuitry for generating the triangular wave signal TWS of FIG. 7b will now be more fully explained. The triangular waveform generator is basically comprised of an integrating amplifier 302 and an inverting amplifier 300. Amplifier 302 has two current inputs, one is provided via a resistor R127 connected between a source of positive voltage +A and its noninverting input and the other current is provided from a series connection of a resistor R126 and a resistor R125 connected between a source of positive voltage +A and its inverting input.

A capacitor C104 is connected between the inverting input and the output of the amplifier 302. Depending upon which current input (to the inverting or noninverting input) is larger, the integrating amplifier 302 will cause the output terminal 307 via the integrating capacitor to be either ramping toward +A or ramping toward ground. The input resistors R125, R126, and R127 are sized such that when node 304 is at a positive potential, the current flow into the inverting input is greater than the current flow into the noninverting input and thus the output of the amplifier 302 ramps from the source voltage +A to ground. When, however, a switching transistor Q25 pulls the node 304 to ground, the current is supplied by R127 to the noninverting input will cause the output of the amplifier 302 to ramp from ground to the source voltage +A. The current supplied by the series combination R126, R125 is twice the current supplied to the input by resistor R127 and therefore the output of the integrating amplifier 302 is symmetric and generates a triangular waveform between ground and the positive supply +A.

The feedback from the output of amplifier 302 to the inverting amplifier 300 makes the oscillation stable at a set frequency. A threshold is provided to the noninverting input of the amplifier 300 via the junction of a divider resistor R120 and a divider resistor R121 connected between the positive supply +A and ground. the threshold voltage is approximately one half of the supply voltage +A. Further connected to this junction point is a resistor R122 which feeds a node 306. Attached to the node 306 is a parallel combination of a capacitor C103 and a resistor R124 generating an input signal to the base of the transistor Q25. The base of the transistor Q25 further has a divider resistor R123 connected between the base terminal and ground.

The output of the amplifier 300 further feeds the node 306. Node 306 is generally held at the output voltage of the amplifier 300 and when the output voltage of integrating capacitor 302 exceeds or falls below the threshold at the noninverting input, transistor Q25 should switch into a nonconducting or conducting mode respectively. This capacitor C103 is a commutating element to minimize the switching time of transistor Q25 and thereby reduce any overshoot of the ramp.

For example, when the inverting amplifier 300 switches to ground potential, the transistor Q25 will then shut off causing the integrating amplifier 302 to ramp toward ground. Node 306 will remain at ground potential until the amplifier 300 switches to a high state when the negative ramp falls below the new threshold to cause the switching to a positive ramp.

Figure 12:
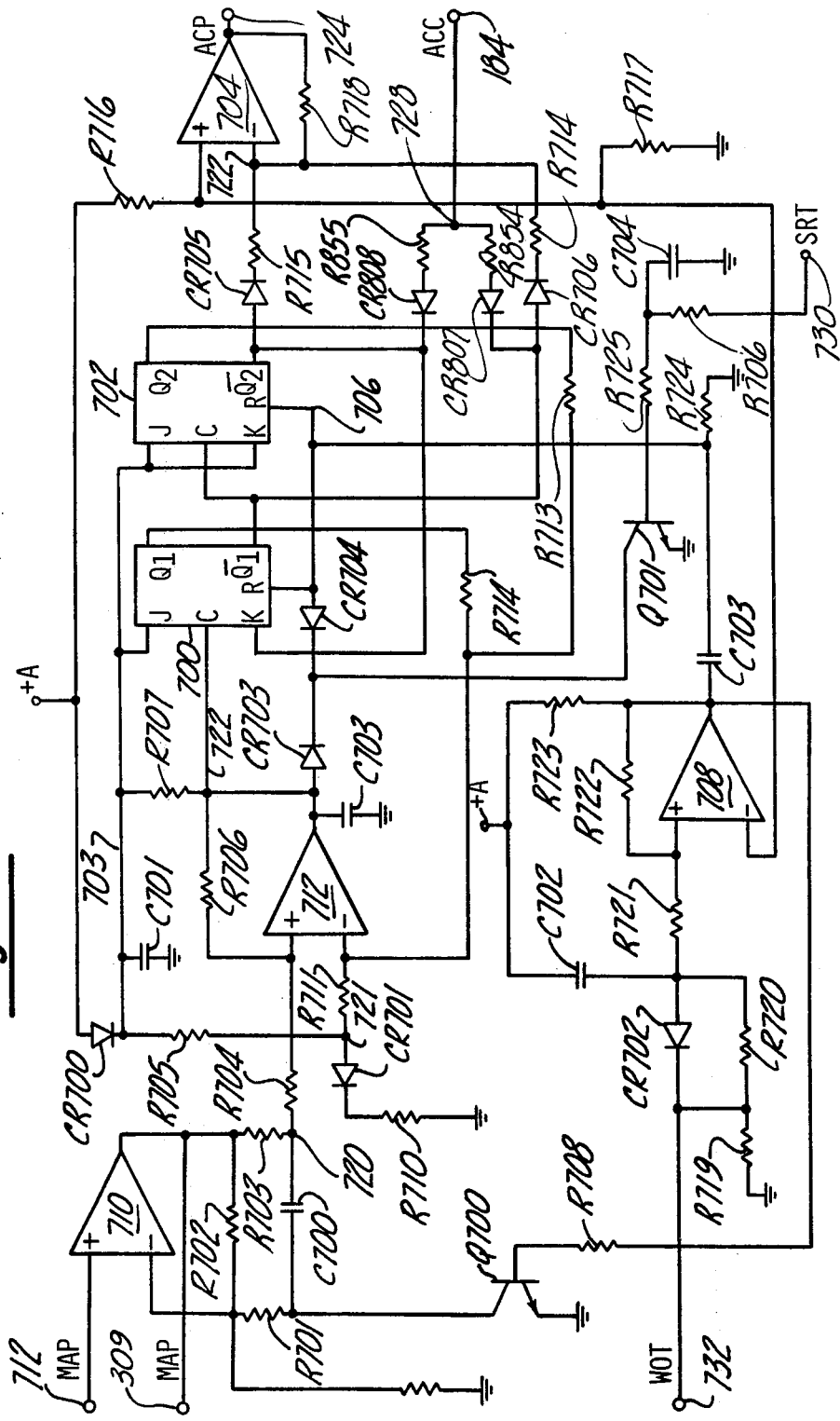
FIG. 12 is a detailed schematic odiagram f the altitude compensation circuit illustrated in FIG. 2.
Figure 13A:
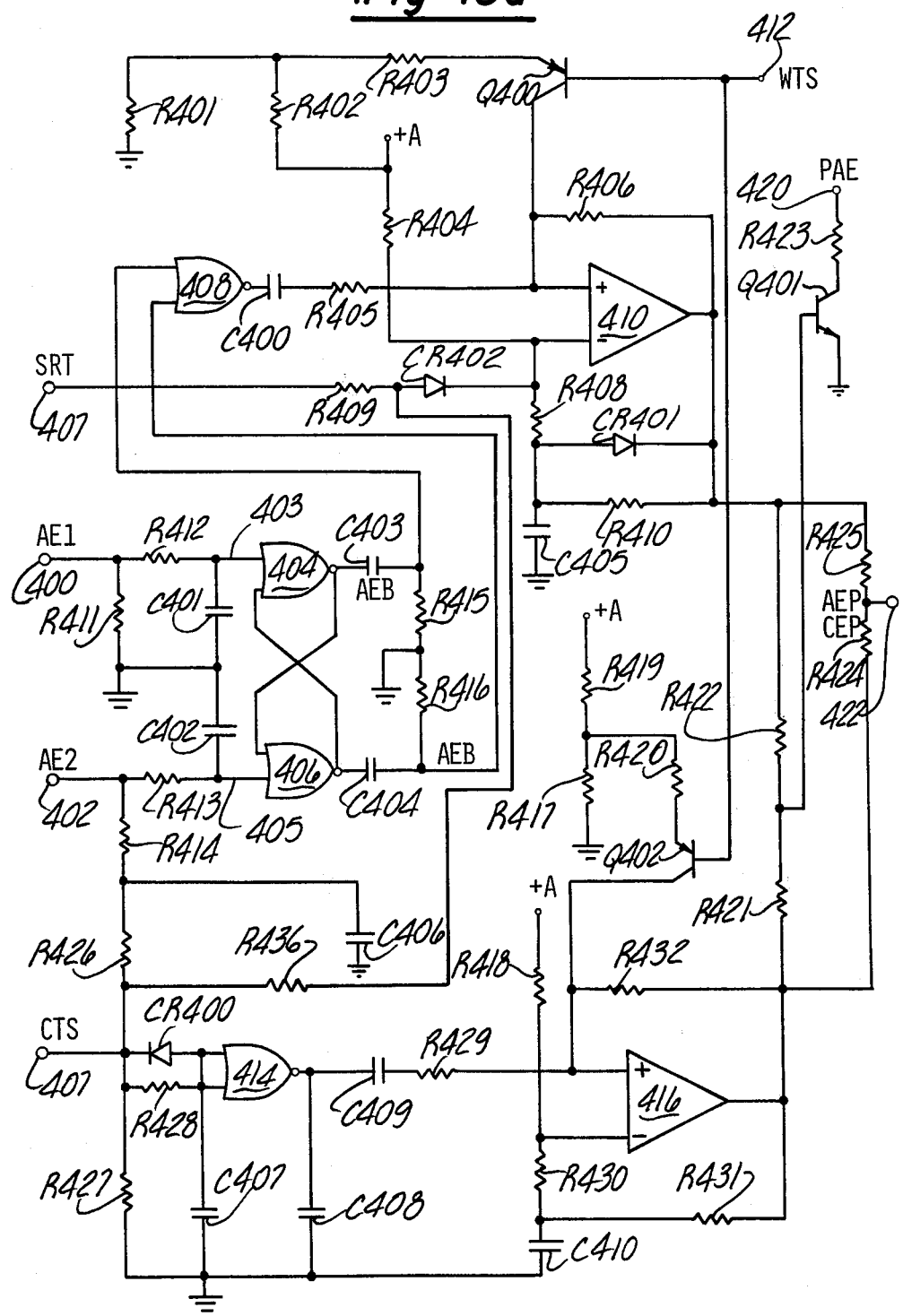
FIG. 13a is a detailed schematic diagram of the acceleration enrichment circuit illustrated in FIG. 2.

If reference will now be directed to FIG. 12, the detailed circuitry for generating the altitude compensation correction of the system will be more fully explained. Basically, altitude compensation circuit includes a two-bit binary counter that is reset to 00 and then counts 10, 01 and 11.

The counter is formed by two J-K bistables 700, 702 connected such that a positive going trigger to the C input of the flip-flop 700 will cause an increment in the count. Thus, as is conventional, the J input of the bistable 700 is tied to a power line 703 and likewise the J and K inputs of the bistable 702. The power line 703 is connected to the positive supply +A through a diode CR700. The C input of bistable 702 is connected to the $\bar{Q}$ output of bistable 700 and the K input of flip-flop 700 is connected to the $\bar{Q}$ output of the bistable 702. The direct resets, R, of both bistables are connected to a reset line 706 which will reset the counter to 00 on a positive going transition on the reset line.

Before the automobile is started, the key in the ignition is switched to the on position and power coming on in the circuit will produce a positive level at the output of an amplifier 708. The amplifier is initially on in a high condition because the noninverting input receives full supply voltage +A via the serial combination of a capacitor C702 and a resistor R721. The output of the amplifier 708 will remain high until the capacitor C702 charges thereby lowering the voltage to the noninverting input to the amplifier 708 below a threshold set at the inverting input. The threshold for the inverting input is supplied by the junction voltage of a divider resistor R716 and a divider resistor R717 being connected between the source of positive voltage +A and ground.

The positive going edge of this initial pulse is used to reset the counter by its transmission to the reset line 706 via the junction of a capacitor C703 and a resistor R724 whose other terminals are connected between the output of the amplifier 708 and ground, respectively. The positive going edge of the pulse output from the amplifier 708 becomes a positive spike after being differentiated by the capacitor and resistor combination to reset the counter so that the Q outputs of the counter will initially read 00. This will begin a sampling process to determine the altitude at which the engine is presently being operated.

Further, the reset pulse from the output of amplifier 708 is used to turn on a transistor Q700 via a resistor R708. The collector of transistor Q700 is connected to the junction of a capacitor C700 and a resistor R701 which are connected between a voltage node 720 and the inverting input of an amplifier 710.

Turning on transistor Q700 will bring the voltage of a node 720 to substantially ground potential during the on time of the amplifier 708. After the reset pulse from amplifier 708 goes low, the capacitor C700 begins to charge to the MAP signal voltage input through terminal 712 to the noninverting input of an amplifier 710.

Amplifier 710 is configured as a buffer amplifier with a gain slightly greater than one having a feedback resistor R702 connected between the output of the amplifier and the inverting input with a resistor R700 connected between the inverting input and ground. The charging rate of the capacitor C700 is dependent upon the resistance R703 connected between the output of the amplifier 710 and the node 720. The MAP voltage signal is further provided to other portions of the circuit such as the positive K circuit via an output terminal 309 connected to the output of the amplifier 710.

The voltage at node 720, which is exponentially increasing toward the MAP voltage is supplied to the noninverting input of a comparator 712 via an input resistor R704. The comparator 712 has a threshold voltage which is applied to the inverting input via a junction 721 of a divider resistor R705 and a divider resistor R710 connected between the power line 703 and ground. A blocking diode CR701 is additionally connected between the junction and the resistor 710. The output of the amplifier 712 is connected to the junction of a pull up resistor R707 and a capacitor C703 connected between the power line 703 and ground.

When the voltage from node 720 input to the noninverting input of the comparator 712 exceeds the threshold set by the resistor R705 and R710, the comparator will switch into a nonconducting state allowing capacitor C703 to begin charging to the positive supply voltage +A through the resistor R707.

This positive going voltage will produce a clock pulse via clock line 722 to the counter and toggle the counter into an 10 state. The logical 1 at the Q output of the bistable 700 is then fed back to the threshold voltage via a resistor R714 to increase the threshold voltage at the inverting input of amplifier 712.

The threshold voltage at the inverting input which is now larger than the voltage on the noninverting input will switch the comparator 712 into a conducting state grounding the clock line 722 and discharging capacitor C703. If the MAP signal is sensing a still higher pressure it will continue to charge capacitor C700 and cause the voltage on the noninverting input to rise. The process will then be repeated when the voltge at the noninverting input of the comparator 712 again exceeds the combined threshold of the initial setting and the feedback of the logical 1. This will toggle the counter to its third state 10 which is fed back via resistor R713 to increase the threshold and overcome the voltage on the noninverting input. A fourth count is possible if the MAP voltage on capacitor C700 exceeds the threshold set by initial voltage and resistors R714, R713. The counter will then be at an 11 state.

Thus, the state or count of the counter after the cpacitor 720 is fully charged to the MAP signal voltage presented at the terminal 712 will be one which is indicative of atmospheric pressure or at what altitude the operation of the engine is being contemplated. This calculation takes place before the automobile begins cranking and the intake manifold pressure changes from atmospheric. Thus, the MAP signal is representative of altitude at this point in time.

The four separate states of the counter are transformed into four different voltage levels by an inverting voltage amplifier 704 having a negative feedback resistor R718 connected between its output and inverting input. The amplifier 704 further having a threshold voltage developed at the noninverting input from the junction of the divider resistors R716 and R717. The amplifier 704 amplifies voltages input to a node 722 via a diode CR705 and a resistor R715 from the $\overline{Q}$ output of the bistable 702 or via a diode CR706 and a resistor R714 from the $\overline{Q}$ output of the flip-flop 700.

It is seen that different combinations of logical ones and zeros on the $\overline{Q}$ outputs will form different voltage levels at a terminal 724. For approximately equivalent increments between the voltage levels, the resistor R714 should be scaled to be approximately twice the resistance of R715. The four voltage levels are output from terminal 724 as the altitude compensation signal, ACP. The lowest voltage of the ACP signal corresponds to the lowest pressure (highest altitude) input or a count of 00, and conversely a count of 11 will produce the highest voltage at the highest pressure (lowest altitude).

By reversing the order of detection of the voltage levels by reversing the decoding diodes an altitude current signal ACC from a terminal 184 and a node 728 may be generated by a diode CR808 and resistor R855 being connected between the node and the $\overline{Q}$ output of the bistable 702 and by a resistor R854 and a diode CR807 being connected between the $\overline{Q}$ output of the bistable 700 and the node 728. The output signal ACC from the terminal 184 is used to sink current from the correction current combination circuit and thereby lengthen the pulse width to provide enrichment for increasing altitudes.

A count of 11 will sink maximum current into the $\overline{Q}$ outputs to give the least enrichment at low altitudes and a count of 00 will sink no current away from terminal 184 to give the most enrichment at high altitudes. Resistors R854, R855 are valued such that a 3% enrichment will occur when one is used and a 6% enrichment when the other is used. Thus, the four counter values or states 00, 10, 01, 11 are decoded into enrichment values of 9%, 6%, 3%, and 0% respectively.

Two special conditions affect the generation of the altitude compensation voltage and current signals. One is the start signal SRT which is applied to terminal 730 and via a low pass filter consisting of a resistor R706 and a capacitor 704 is applied to a bias resistor R725 is connected to the base of a transistor Q701 which has its collector connected to the reset line 706 through a diode CR704 and to the clock line 722 through a diode CR703.

When the start signal goes high, the transistor Q701 is turned on into a conducting state to ground both the reset 706 and the clock line 722 so that a transition in the counter will not take place during the presence of this signal. Cranking of the engine occurs during the start signal and a false indication of altitude may occur if the circuit were permitted to calculate altitude at this time. The start signal inhibits the calculation until cranking of the engine is terminated.

The other special condition for which provision is made is the wide open throttle signal WOT via terminal 732. At wide open throttle, the intake manifold will be substantially at atmospheric pressure. Whenever the wide open throttle signal goes high, the noninverting input of the amplifier 708 receives this information via the serial combination of a resistor R720 and a resistor R721. This will generate a new reset pulse and have the system circuitry check at which altitude level the system should presently be operating.

This advantageously provides a recalculation feature for generating the altitude compensation signals ACS, ACC while the car is being driven rather than just before the starting sequence. Since many times the automobile will be driven from a much lower area to a much higher area or vice versa during operation, it is necessary that the altitude compensation circuit be able to provide more than just one compensation calculation at the starting sequence. Thus, when the operator feels that the mixture is leaning out excessively because of an increase in altitude and he attempts to attain more power by closing the throttle completely. The wide open throttle signal will cause recalculation of the compensation needed and enrichen the fuel pulse accordingly.

In FIG. 5c, the result of the altitude compensation signals ACC, ACS are illustrated. Curve A0 represents the MFS signal shown in FIG. 5b at an initial altitude or basically a sea level calculation. Curves A1–A3 illustrate enrichment for increases in altitude. The signal ACS is used to move the second MAP breakpoint (usually around 600 torr) to lower MAP values B0–B3 for each count of the counter. The signal ACC is used to provide enrichment factor values 00–03 for increases in altitude. FIG. 5d presents a representative table of the offset and breakpoint values for each count of the altitude compensation counter. Each offset is an increase in the basic slope of the pressure schedule as viewed from the origin of the curve. The present circuit provides altitude enrichment at lower MAP values where previous circuits have not.

With reference now to FIGS. 13a–h, the acceleration enrichment circuitry will now be more fully described. The acceleration enrichment circuit receives AE pulses AE1, AE2 from the throttle switch 41 via terminals 400, 402 respectively. The AE pulses AE1, AE2 are generated alternately at the rate of change of the angle of the throttle plate of the engine. The signals AE1, AE2 illustrated in FIGS. 13b, 13c respectively show an acceleration where the pulses are being produced at an increasing rate. The alternate pulses forming signals AE1, AE2 are transmitted to the set and reset terminals, respectively, of a bistable comprising cross coupled NOR gates 404, 406. The cross coupling provides feedback from the output of one gate to the input of the other gate as is conventional.

Signal AE1 is transmitted to the set input or terminal 403 via the junction of a low pass filter comprising a resistor 412 and a capacitor C401 connected between the terminal 400 and ground. The capacitor C401 attenuates high frequency noise and voltage spikes from the incoming AE1 signal line. A resistor R411 is provided between the terminal 400 and ground to keep the set input 403 from floating during the absence of signals. Similarly, the reset input or terminal 405 is provided with the signal AE2 via the junction of a low pass filter comprising a resistor 413 and a capacitor C402 connected between the input terminal 402 and ground. The reset input 402 is also kept from floating during no signal periods by a path to ground comprising the serial combination of a resistor R414, a resistor R426, and a resistor R427.

As the AE signals are received by the inputs 403, 405, the bistable is alternately set and reset to provide a square wave and its inverse at the output of gate 404 and output of gate 406 respectively. The output of gate 406 is the acceleration enrichment bistable signal AEB and is illustrated in FIG. 13d. The positive going edge of the square wave from the output of gate 404 is fed into a capacitor C403 connected through a resistor R415 to ground. The capacitor and resistor combination form a differentiator which produces a positive going spike at their junction which is transmitted to the input of a NOR inverter gate 408 for every positive edge transition of the square wave. Likewise, the positive edges of the inverse of the square wave output from the NOR gate 406 is passed through a differentiator comprising a capacitor C404 connected through a resistor R416 to ground. The resulting positive spike at their junction is transmitted to the other input of NOR gate 408. Each positive going spike causes the output of the NOR gate 408 to transition to a low state and thereby discharge a capacitor C400 connected thereto. The positive spikes to the NOR gate 408 cause a monostable amplifier 410 to output a pulse for every AE1, AE2 signal as illustrated in FIG. 13e. The pulses comprise the acceleration enrichment signal AEP.

The amplifier 410 is generally biased in an off condition by having a threshold current provided at its inverting input which is greater than that supplied to the noninverting input. The threshold current is formed at the junction of a divider resistor R404 and divider resistor R408 connected between the source of positive voltage +A and one input terminal to a capacitor C405. The other terminal of capacitor C405 is connected to ground and a parallel combination of a diode C401 and a resistor R410 is connected between the output of the amplifier 410 and the junction of the resistor R408 and the capacitor C405. When the output of the amplifier 410 is off, the capacitor C410 is at substantially ground potential as it is discharged through the resistor R410 and the diode CR401 by the amplifier. A latching resistor R406 is additionally connected between the noninverting input and the output of the amplifier.

When a positive trigger potential is supplied to the noninverting input of the amplifier 410 by the NOR gate 408 ending its low transition because of the spikes, the output state of the amplifier will switch to a high state and start charging the capacitor C405 through the resistor R410. The change of the output amplifier 410 from the ground level to a high level is the leading edge of one AE pulse of signal AEP. The length of the pulse is determined by the amount of time that the capacitor C405 must charge to produce a current on the inverting higher than the current input on the noninverting input. This occurrence will end the pulse and discharge the capacitor to wait for the next trigger pulse from the NOR gate 408. The signal AEP is output from the amplifier 410 to terminal 422 via the resistor R425.

The length of time that the charging of capacitor C405 takes to overcome the current to the noninverting input is directly proportional to the current supplied by a current source Q400. The source Q400 is shown as a PNP transistor having its base connected to the WTS signal via terminal 412 and its emitter connected to the junction of a voltage divider via a load resistor R403. The voltage divider is formed by connecting a divider resistor R402 and a divider resistor R401 between the source of positive voltage +A and ground.

Thus, the WTS signal will provide a control signal to the current source Q400 that will vary the amount of current supplied to the noninverting input of amplifier 410 directly with temperature. At the coldest engine temperature, the current will be the greatest and hence provide the longest pulses. The WTS signal will cause the source Q400 to deliver less current as the temperature increases. At the breakpoint of the current source defined by the resistors R401 and R402, the WTS signal will overcome the divider voltage and shut the current source off providing the shortest pulse width for the AE pulse signal AEP. This pulse width determination will provide more AE enrichment during cold temperature and then will lean out the pulses as the engine warms to operating temperatures. One AEP pulse is illustrated in FIG. 13g and has a minimum duration at temperatures $T_4$ and a maximum duration at temperature $T_1$ where $T_4$ is greater than $T_1$.

The start signal SRT is input to the inverting input of amplifier 410 via terminal 407, a resistor R409, and a diode CR402. When the start signal SRT is present (a high level) the amplifier 410 will be inhibited from providing the AEP signal because of the increased threshold current at its inverting input. A resistor R436 is connected to the junction of the diode CR402 and resistor R409 at one lead and to terminal 407 at the other. The resistor R436 transmits the start signal to this terminal to inhibit the CEP pulses during its presence.

A pulse for the closed throttle signal CTS that is input via the terminal 407 is generated in a similar manner by an amplifier 416 configured as a monostable with a threshold current provided at its inverting input. The threshold current is provided at the junction of a divider resistor R418 and a divider resistor R430 connected between a source of positive voltage +A and one terminal of a capacitor C410. The other terminal of the capacitor C410 is connected to ground and a timing resistor R431 is connected between the output of the amplifier 416 and the capacitor C410. The amplifier 416 additionally has a latching resistor R432 connected between its output terminal and noninverting input.

A temperature dependent current source Q402 supplies a variable amount of current to the noninverting input of the amplifier 416. As was the case for source Q400, the current source Q402 is controlled by the temperature dependent signal WTS connected to its base. The emitter of the current source Q402 is connected to the junction of a voltage divider through load resistor R420. The voltage divider is formed by a divider resistor R419 and a divider resistor R417 connected between a source of positive voltage +A and ground. The divider voltage of the current source Q402 provides a set point or breakpoint at which the minimum pulse width of the monostable will be developed.

The monostable is triggered into conduction by the output of a NOR gate 414 going low and grounding one terminal of a capacitor C409 connected to a resistor R429 which has its other terminal connected to the noninverting input of the amplifier. When NOR gate 414 goes high after going low, the amplifier 416 will be triggered to transition to a high state or unstable state. This will be the leading edge of the off closed throttle pulse CEP and start the charging capacitor C410. The temperature dependent CEP pulse is shown in FIG. 13h. Once the capacitor C410 applies current to the inverting input of the amplifier greater than at the noninverting input of the amplifier the output will again become ground level. The signal CEP is output from amplifier 416 to the terminal 422 via a resistor R424.

The resistor R428 and a capacitor C407 form a low pass filter which attenuates high frequencies and spikes on the inputs of NOR gate 414. The other input of the gate 414 is connected to ground via a diode CR400 and the resistor R427 to keep the input from floating and giving a false indication of a signal. The CTS signal is high when the throttle is in a closed position. This high level charges the capacitor C407 and resets the bistable gates 404, 406 to a state ready to receive and register the first AE1 pulse. When the throttle moves off its closed position the capacitor C407 will discharge through the diode CR400 and produce the off closed throttle pulse CEP.

Because the AEP and CEP pulses are ORed with the main fuel pulses they will overlap and be lost if they occur at the same time. Since this is not desirable, an acceleration enrichment priority circuit is included in the system. The priority circuit includes a transistor Q401 having a collector terminal connected to a terminal 420 via a load resistor R423 and having an emitter terminal connected to ground. The base terminal of the transistor Q401 is connected to the junction of a serial combination of a resistor R422 and a resistor R421. The other terminal of the resistor R422 is fed from the output of the amplifier 410 and the other terminal of the resistor R421 is fed from the output terminal of the amplifier 416.

In operation, the priority circuit provides a priority signal PAE to the correction current combination circuit to terminate the generation of the main pulse until after an AEP or CEP pulse has been output on the IDS signal line. This is accomplished by grounding the charging current signal CCC of the main fuel pulse timing capacitor through the transistor Q402 during the PAE signal.

With reference to FIGS. 13e and 13f the result will be an addition of the non-synchronous pulse widths. PWS1-PWS3 illustrate the PSW signal on the IDS signal line. AEP1-AEP8 illustrate AEP pulses occurring during this time which will be ORed if not simultaneous AE1-Ae5 or will be added if simultaneous AE6, AE7, AE8.

A priority AE pulse circuit of this type is more fully desired in an application Ser. No. 789,382 filed on Mar. 20, 1977, in the name of R. L. Stauffer which is commonly assigned with the present application. The disclosure of Stauffer is hereby expressly incorporated by reference herein.

Figure 14:
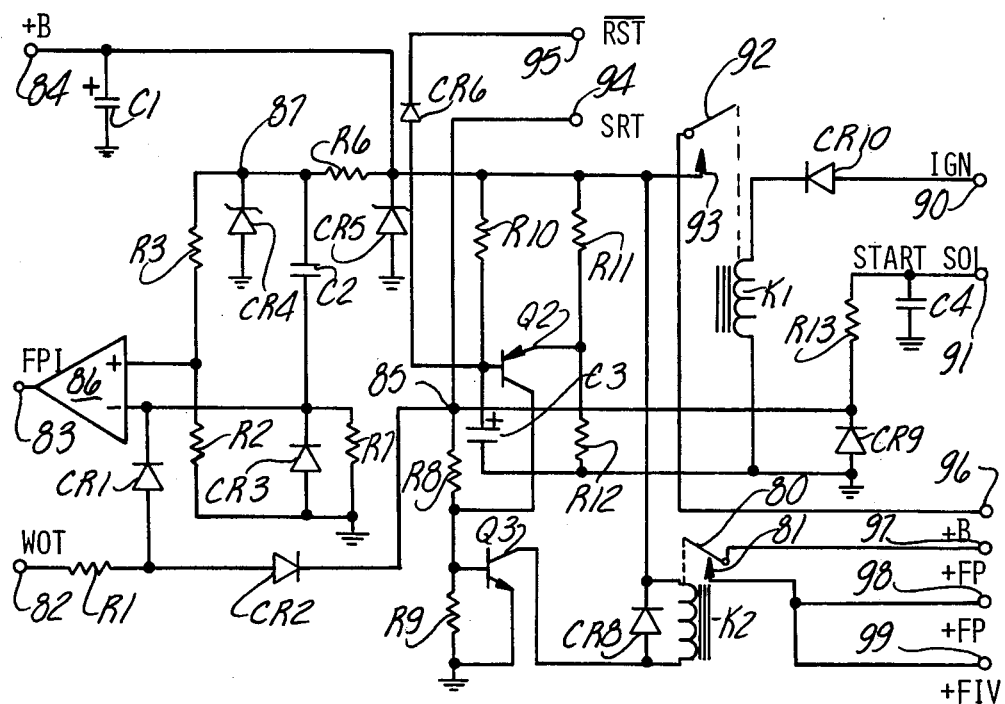
FIG. 14 is a detailed schematic diagram of the fuel pump and safety circuit illustrated in FIG. 2.

The fuel pump and safety circuit for the system are illustrated in FIG. 14. The ignition signal IGN via terminal 90 is input through a diode CR10 and energizes the coil of relay K1 to begin the start up process of the ECU 13. The energization of the coil K1 closes contacts 92 and 93 thereby applying +B via terminal 96 to the system from terminal 84. A capacitor C1 is connected between the terminal 84 and ground to provide filtering and a Zener diode CR5 is provided in shunt to the terminal for clamping high voltage transients.

Concurrently with cranking in the starting process, the start solenoid will generate a high signal which is delivered to the ECU via a terminal 91. The start solenoid signal is transmitted via resistor R13 to node 85 and thereon to terminal 94 to become the start SRT signal for the rest of system. A diode CR9 is provided between the node 85 and ground to provide a discharge path of the solenoid.

The SRT signal further energizes a transistor Q3 via its base connection to the junction of a pair of divider resistors R8 and R9 connected in series between the node 85 and ground. The transistor Q3 has its collector connected to one terminal of the coil of a relay K2 and its emitter connected to ground. The other terminal of the coil of the K2 relay is connected to the source of positive supply +B through the relay contacts 92 and 93 when they are closed. The ignition signal IGN and start signal SRT are usually energized together, as would be the case in a common starting sequence, and thus the K2 relay will close connecting contacts 80 and 81 together. This will energize the fuel pump with the +FP signal via terinals 97 and 98. Further, the fast idle valve via terminal 99 is energized at this time by the signal +FIV.

A safety circuit is built into the system whereby after the start signal goes low, current will be supplied to the base of transistor Q3 to keep the contacts of the relay K2 closed by a current source transistor Q2 being energized. The source of current for holding the K2 relay is provided from the emitter of Q2 being connected to the junction of a pair of divider resistors, a resistor R11 and a resistor R12, connected between the supply +B and ground. Control of the conductance of transistor Q2 is developed by the inverse reset signal $\overline{RST}$ applied through the diode CR6 to the base of the transistor from terminal 95. The base of transistor Q2 is also connected to the junction of the resistor R10 and a timing capacitor C3 connected between the source of positive supply +B and ground.

During cranking, the $\overline{RST}$ signal has grounded the base of the transistor Q2 and discharged capacitor C3. Afterwards, in between timing pulses of the $\overline{RST}$ signal, the capacitor C3 will attempt to charge to the supply voltage through the resistor R10. If the $\overline{RST}$ pulses do not come at a rapid enough interval or do not come at all, as for example when the engine stalls, the capacitor will charge to a voltage where the base of Q2 is turned off. This will turn transistor Q3 off and open the contacts to the relay K2 to shut the fule pump off. This action is imperative in instances where a car stalls for some reason. The engine will have stopped and it would be disadvantageous to continue to supply fuel to the injectors and risk the flooding of a hot engine.

Also included in the circuit is a first pulse inhibit circuit comprising an amplifier 86. The amplifier 86 is generally a switching amplifier having its noninverting terminal connected to the junction of a pair of divider resistors, a resistor R3 and R2 connected between a reference potential 87 and ground. The inverting input of amplifier 83 is connected to the junction of a capacitor C2 and a resistor R7 connected between node 87 and ground. The reference potential 87 is developed by a Zener diode CR4 being connected to the terminal of a load resistor R6 which has its other terminal connected to the source of positive voltage +B at node 85. The Zener diode CR5 further connected to the terminal R6 provides over-voltage protection to the entire system.

When the initial start up circuitry of the system powers on by the closing of the contacts 92 and 93, capacitor C7 transmits the supply reference voltage of node 87 to the inverting input of the amplifier 86. The timing capacitor C2 will begin to charge through the resistor R7 and gradually pull the inverting input of the amplifier 86 below the reference voltage of the divider R3 and R2. At that point, the amplifier will switch into an OFF state.

The FPI signal transmitted to the system via terminal 83 therefore grounds the IDS signal until the timing capacitor has switched the amplifier off. This allows the engine to be cranked for a short time before actual fuel is delivered to the injectors.

An anti-flood capability during starts where the car is at wide open throttle is provided by a terminal 82 delivering the WOT signal to the inverting input of the amplifier via a resistor R1 and a diode CR1. The wide open throttle signal WOT is further presented at the node 85 via the resistor R1 and a diode CR2. Applying a positive voltage such as the WOT signal to the inverting input of amplifier 86 will cause the amplifier to ground the fuel pulse line until start signal goes to a low value. This operation allows the engine to ingest enough air and keep it from flooding during starting sequence when the engine is warm and the throttle is wide open.

Figure 15:
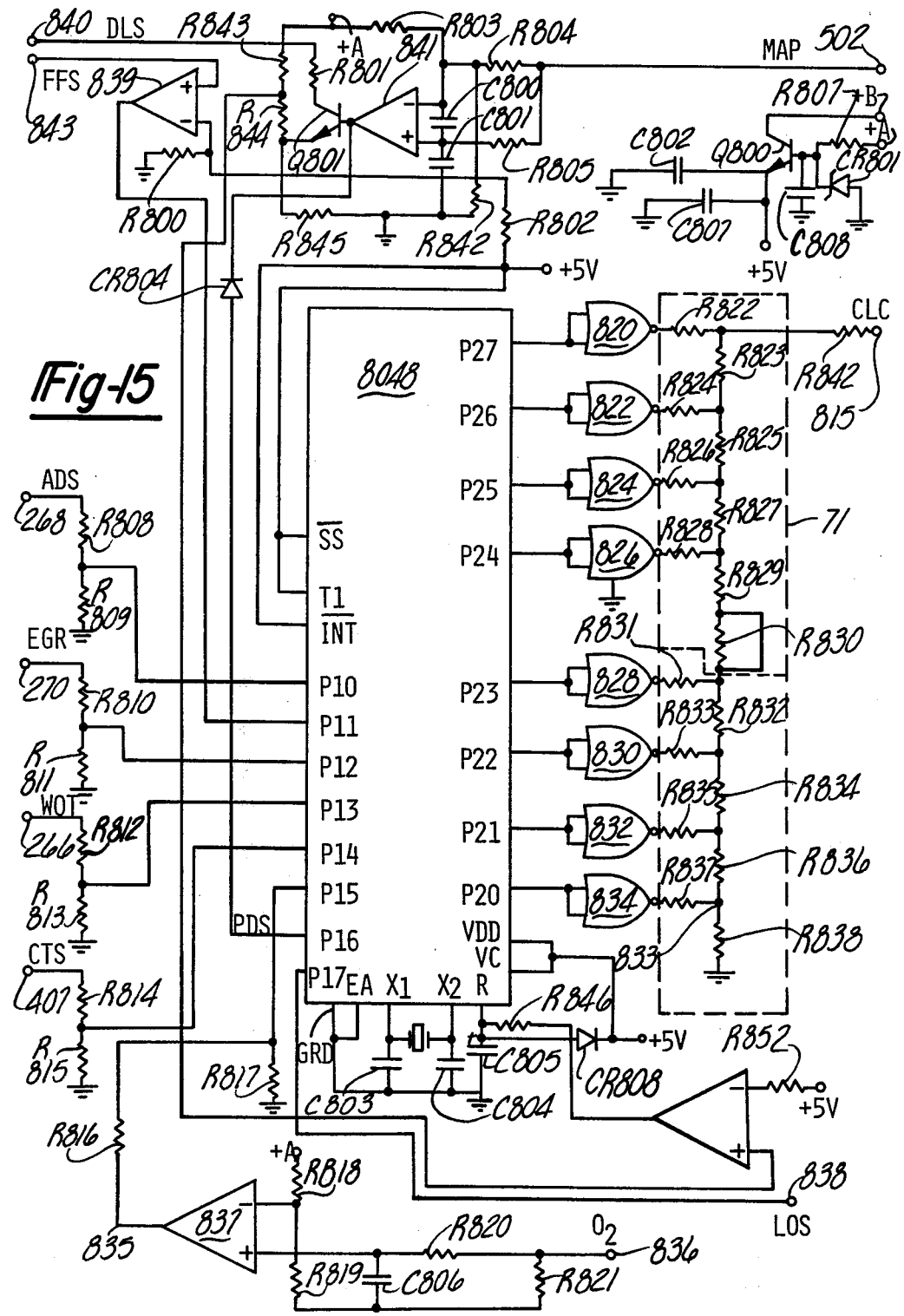
FIG. 15 is a detailed schematic circuit diagram of the closed loop control circuit illustrated in FIG. 2.

The preferred embodiment of the microprocessor function generator is shown implemented in FIG. 15 as a single chip comprising an Intel Corp. 8048 microprocessor. The operation, programming, and designation of control and data transfer of the microprocessor is more fully detailed in the MCS-48 Microcomputer Users Manual, Copyright 1976, available commercially from the Intel Corp. of Santa Clara, California, which disclosure is incorporated herein by reference. The present system operates from a program stored in the ROM of the Microprocessor and reads six digital signals and outputs three.

The various circuit connections of the miroprocessor and the analog function generator will now be more fully described. The port 1 pins of the microprocessor pins P10-P17 are used to input the six incoming informational signals to the microprocessor function generator namely signals ADS, EGR, WOT, CTS, $O_2$ and FFS.

The ADS signal is input to pin P10 via the junction of a pair of divider resistors R808 and R809 connected between terminal 268 and ground. The EGR signal is input to pin P12 via the junction of a pair of divider resistors R810 and R811 connected between the terminal 270 and ground. The WOT signal is input to pin P13 via the junction of a pair of divider resistors R812 and R813 connected between the terminal 266 and ground. The CTS signal is input to pin P14 via the junction of a pair of divider resistors R814 and R815 connected between the terminal 407 and ground.

The FFS signal is input to pin P11 via the output of a shaping amplifier 839. The amplifier 839 has a threshold voltage connected to its inverting input which is developed at the junction of a pair of divider resistors R802 and R800 connected between +5V and ground. The noninverting input of the amplifier 839 receives the FFS signal from terminal 843. The threshold to the inverting input provides a level which the FFS signal has to overcome before the amplifier 839 will switch into a high state and below which will cause the amplifier to switch to a low state. The edge of the FFS signal is therefore cleaned up of any delay or noise that may have occurred after its generation and prior to its input at the terminal 843. This is necessary because the processor reads this line every 1.2 milliseconds and a slow edge may create an extraneous reading.

The $O_2$ signal is input to pin P15 via the juncion of a pair of divider resistors R816 and R817 connected between an output 835 of a shaping amplifier 837 and ground. Amplifier 837 is a conventional thresholding amplifier which has at its inverting input a threshold voltage developed at the junction of a pair of divider resistors R818 and R819 connected between the source of positive voltage +A and ground. The noninverting input of the amplifier 837 receives the $O_2$ signal via the output of a low pass filter consisting of a resistor R820 and a capacitor C806 connected between the $O_2$ input terminal 836 and ground. A load resistor R821 is connected between the terminal 836 and ground to provide an impedance for the $O_2$ sensor to work into. This high working impedance inhibits the $O_2$ sensor signal until the interal impedance of the $O_2$ sensor is decreased by warming to operating temperature.

The $O_2$ sensor provides a changing bi-level signal $O_2$ which is a high voltage when the sensor detects a relative absence of oxygen in the exhaust gases of the manifold. Conversely, the $O_2$ sensor will provide a low level output when there is a relative presence of oxygen in the exhaust gases in the manifold. This level switching signal is filtered by the low pass filter and thresholded by the amplifier to provide a signal at the output 835 which is an indication of an air/fuel ratio which is substantially stoichiometric. The threshold is set such that as the Zirconia sensor waveform ages, the switching point or air/fuel ratio detected at the threshold will not substantially change as taught in a U.S. Pat. No. 3,815,561 issued to W. Seitz and assigned commonly with the present application. The disclosure of Seitz is hereby incorporated by reference herein. The pin assignments and signals input to Part 1 of the microprocessor and output from are more fully illustrated in FIG. 17a.

The LOS signal is output from the microprocessor Pin P17 to terminal 838 to provide a failure indication of the $O_2$ sensor and the closed loop. The PDS signal is output via pin P16 through a diode CR804 to provide positive pull up for a switching amplifier 841. When the bit on pin P16 is high, the amplifier 841 will be able to turn on a transistor Q801 connected to the amplifier output by its base and when the bit on Pin P10 is low, the lack of pull up voltage will inhibit the conductance of the transistor Q801.

The amplifier 841 is configured as a deceleration detector which has a threshold voltage applied to its inverting input via the junction of a pair of divider resistors R803 and R842 connected between the source of positive voltage +A and ground. The noninverting input of the amplifier 841 is connected to the inverting input via a capacitor C800 and is connected further to ground via a capacitor C801. The MAP signal is input to the inverting and noninverting input of the amplifier 841 through an input resistor R804 and an input resistor R805, respectively, which are commonly connected together at node 803.

For a relatively unchanging MAP signal, the noninverting input will be at a higher voltage (MAP signal plus the threshold value) than the noninverting input and thus, amplifier 841 will be grounding the base of transistor Q81 turning it off. When the MAP voltage begins to fall as would occur during a deceleration, capacitor C801 will hold the noninverting voltage with one decay time constant and capacitor C800 will hold the MAP voltage plus the threshold voltage at the inverting input of the amplifier 841 with a different decay constant.

The decay constant for the capacitor C800 is much less than that of the capacitor C801 and thus the voltage at the inverting input will fall more rapidly than at the noninverting input. Once the difference becomes greater than the threshold value, the amplifier 841 will become nonconducting thereby allowing the PDS signal (if the bit is high) to turn on the transistor Q801. Turning on the transistor Q801 will provide a current sink to the terminal 840 which becomes the signal DLS to provide a lean out during decelerations while the EGR valve is active.

Port 2 which is represented by pins P20–P27 is connected to inverting NOR gates 820–834 respectively and outputs a digital representation of the CLC signal. The outputs of the inverting NOR gates 820–834 are respectively input to the D/A converter 71 and are decoded for output from the converter via a resistor R842 through a terminal 845 to become the analog representation of that digital word. The pin and bit assignments for outputs from Part 2 of the microprocessor are more fully illustrated in FIG. 17a.

The D/A converter comprises a R-2R D/A converter including resistors R822–R839. For example, a high output from Pin 27 will be inverted in NOR gate 820 to pull current through the resistor R822. Since R822 is twice the resistance of R823 and likewise for similarly connected resistors, the D/A converter will divide the current in powers of two for every bit or pin set. The output port 2 is capable of transmitting these values to the correction current combination circuit.

If port 2 is outputting all zeroes, the NOR gates will all be presenting logical ones to the D/A converter 71 and thus the least amount of current will be pulled through the resistor R842. As was noted before, this will cause the shortest pulse width and the leanest air/fuel ratio for the CLC signal. If, however, port 2 pins P20-P27 are all ones, the NOR gates 820–834 will all sink current through their respectively connected resistors and thus the greatest amount of current will be pulled through the resistor R842. This will provide the slowest ramp rate for the charging capacitor C308 and thus the longest fuel pulse and richest air/fuel ratio. Preferably, the CLC signal is set at a count of 127 which is half or midway between the 0 and 255 count to provide a middle reference which the air/fuel ratio can be varied above and below by integral control as will be more fully described hereinafter.

As is conventional, microprocessor pins $V_{DD}$, $V_C$ are connected to a source of +5V as are terminal pins $\overline{SS}$, T1, $\overline{INT}$. Further, pin designations EA, GRD are connected to ground and clock terminals X1, X2 are connected to a crystal providing the frequency of oscillation necessary for the operation of the microprocessor. Capacitor C803, and capacitor 804 are additionally connected between clock terminals X1, X2 respectively and ground. These non data pin connections are commonly understood to be necessary for the operation of the microprocessor but are not functionally important to the invention and will therefore not be further discussed.

The supply +5V is generated from a series voltage regulator comprising a NPN transistor Q800 having its collector connected to the battery voltage +B and its emitter to a +5V supply terminal. Capacitors C802, C807 are connected between the emitter of transistor Q800 to provide filtering. Regulation of the conductance of transistor Q800 is provided by a fixed reference voltage connected its base. The fixed reference voltage is developed at the junction voltage of the connection of a resistor R807 and a Zener diode CR801 connected between the positive supply +A and ground.

A low voltage reset for the microprocessor is provided by a comparator 860 which inputs a reset signal to the pin R of the 8048. This causes the microprocessor to reinitialize and start the program over after conditions where the operation of the program is in doubt. The +A voltage provides an input to the noninverting terminal of the amplifier 860 via the junction of a divider comprising a resistor R843, and a resistor R844. The other input to the amplifier 860 at its inverting terminal is the supply voltage +5V via a resistor R852. If the junction voltage of the divider falls below +5V, the microprocessor will be reset by a low output of the amplifier to the reset terminal R through a low pass filter comprising a resistor R846 and a capacitor C805. The junction voltage is chosen such that if it falls below +5V, the regulator is in imminent danger of losing regulation. If this condition occurs, the microprocessor may generate spurious control signals and must be reset.

For noise and high frequency conditions which cause momentary loss of supply voltage, a diode CR808 is connected between the supply voltage +5V and R terminal. Any time the supply falls, the diode will discharge the capacitor C805 and provide a reset to the microprocessor.

The program of the microprocessor function generator which accomplishes three main functions will now be more fully explained. The first function is to provide the closed loop current signal CLC from a time and RPM based integration of the $O_2$ signal. The second is to control the opening and closing of the integral control loop which generates the CLS signal and provide a failure indication signal LOS for the loop to the failure indication circuit. The final function of the program is to generate the PDS signal to lean out the air/fuel ratio during decelerations to account for EGR time lag.

The first function of generating the CLS signal is based upon the formation of two integral control sums that are combined together to produce an eight bit digital control word of 256 values that is output via Port 2 to the D/A converter. After conversion the analog representation of the control word is input to the correction current combination circuit via terminal 182 FIG. 7a to change the pulse width of the injector signal as described previously.

The first of the control sums which is represented by a digital word stored in a random access location of the microprocessor is termed the primary integrator. The primary integrator has a nominal value of between 0–25 with an intitial condition (PIC) of 15. A minimum count will provide no air/fuel ratio enrichment while a maximum count will provide the greatest enrichment.

The primary integrator count is recalculated on every pass through the program loop by testing the condition of the $O_2$ sensor. If the sensor is producing a rich indication, the storage location representing the primary integrator sum is cleared or set to zero. This action is equivalent to producing the maximum step in the lean direction that the primary integrator can accomplish. If the sensor is producing a lean indication, the integrator will count in positive steps of five every time there is a change in the FFS signal which indicates an RPM pulse.

The asymmetric waveform PI, of the primary integrator is illustrated in FIG. 17c where is seen that the positive slope of the ramp of RPM dependent and the lean step occurs at the transition of the $O_2$ sensor in FIG. 17d from a lean to rich air/fuel ratio. As pictured, the primary integrator is biased to operate at a lean air/fuel ratio slightly in excess of stoichiometric. The effect of the secondary integrator is not shown on the waveform in FIG. 17c because of the small effect it has on the waveform.

The second control sum which is termed the secondary integrator is also stored in two random access memory locations. The secondary integrator value is recalculated on every pass through the program and can be of a value from 0 to 230 with an initial setting (SIC) of 113. The second control sum is formed by decrementing the secondary integrator locations if the primary integrator sum is less than its initial condition of 15 and incrementing the secondary integrator locations if the primary integrator sum is greater than or equal to its initial condition value of 15. The secondary integrator sum is therefore always attempting to center the primary integrator for long term changes in air/fuel ratio due to calibration inaccuracies, aging components of the system, and out of range changes that may happen.

These two control sums when added together will provide a digital count from the output port 2 of the microprocessor to the D/A converter. The primary integrator has an authority of 5% which is halved during closed throttle conditions while the secondary integrator has an authority of 45% with a time constant of 38 sec between the 0 count and 230 count.

The effect of the secondary integrator and an approximation of the CLC signal waveform is illustrated in FIG. 17e. Reference level A illustrates the midpoint of the primary integrator waveform at some air/fuel ratio that is set by the asymmetry of the up and down ramps. As long as the open loop schedule provides a air/fuel ratio within the authority level of the primary integrator, the waveform will limit cycle about this reference level. If, however, altitude effects, aging, tolerancing errors or scheduling errors occur to shift the air/fuel ratio out of this band, the secondary integrator will cause a ramping to a new reference level at either waveform B or waveform C to return the air/fuel ratio within the authority band of the primary integrator. Portion D, and Portion E of the waveform is the primary integrator waveform superimposed on the secondary integrator ramps. Portion F shows the reduction of the authority level of the primary integrator at closed throttle positions to prevent air/fuel ratio induced torque roll at these low speeds while retaining closed loop control.

The failure signal and loop clamping of the microprocessor programs begin by sensing either the ADS, the EGR, or WOT signal input to the separate lines of port 1 for the microprocessor. During the time these bits are high the loop will remain inactive and both primary and secondary integrators will be clamped at their initial conditions.

The absence of these bits is an indication that the engine has started and a time equal to the time dependent holding level of the warm up system has elapsed, the temperature of the engine has increased to the EGR enabling temperature, and the system is not operating under wide open throttle. It is at this point the loop will close and control the system with the closed loop signal CLC.

To determine if there has been a failure of the $O_2$ sensor the system maintains a 19 sec activity timer which is reset when the $O_2$ sensor outputs a high signal during a rich transition of the air/fuel ratio. The 19 sec timer is enough time for the full excursion of the secondary integrator to either of its maximum authority levels. If the sensor has not changed levels within this time period either the $O_2$ sensor has failed or there is another part of the system that has failed and the loop should be broken to permit open loop control. Thus, both integrators are set to their initial conditions if the activity time times out. This activity timer prevents the closed loop from locking up at a lean maximum authority correction when a portion of the system fails. Also, by checking for a rich transition by the sensor a positive failure mode of a common Zirconia sensor can be established as these sensors may fail with a high or low impedance but will never fail generating a high voltage.

An RPM counter is provided to count 4096 transitions of the FFS signal or the same number of revolutions of the crankshaft of the engine. This RPM counter is reset during warm up conditions by either the EGR bit being high, indicating the engine is below operating temperature; or the WOT bit being high, indicating a special condition of the engine during warm up; or the ADS bit being high, indicating that the engine is still operating at the holding level of the A curve warm up schedule.

During these indications the $O_2$ sensor may still not be up to temperature and a failure mode count should not occur yet. After these conditions are accounted for the RPM counter will begin to wait for a high output from the $O_2$ sensor. If this occurs before the counter reaches its maximum count of RPM pulses, the counter will be reset. An absence of a high output from the $O_2$ sensor will cause the counter to reach its maximum count and generate the lamp on signal LOS indicating a sensor failure.

The counting of RPM pulses to indicate an $O_2$ sensor failure has a number of advantages. Initially, it sets a warm up time for the sensor based on an operating parameter of the engine. An engine operating at high speeds will heat an $O_2$ sensor to its operating temperature faster than one at idle.

Secondly, it takes into account those operations where the engine is already warm but the sensor is cold because of the difference in rates at which the two lose heat. For example, turning the engine off after highway driving and then restarting within 20-30 minutes will cause the $O_2$ sensor to be near ambient temperature while the engine will still be near operating temperature.

Also, in conjunction with the activity timer and a rich burst generator the RPM counter permits the system to fail soft without a failure indication being given to the operator. The rich burst generator will attempt to obtain a high sensor output every 30 sec and a WOT signal in combination with the activity timer will reset the integrators to their initial conditions. If, however, either of these perturbations to the system causes it to become operative once more and the failure condition has cleared itself before the 4096 RPM counts then this situation will not be registered as a failure. The system will then return to normal operation. Even if a failure is registered, the system may return to closed loop control if the sensor returns to operability.

The final function of the program is to generate the PDS signal indicating when a lean out for decelerations should occur. The PDS signal or bit is high when the function should be operative and when reset low acts to inhibit the function.

The function should only be operative when the EGR bits is cleared and thus indicative of the operation of the EGR valve. However, in the instant microprocessor implementation, the lean out function provides a fixed 6% increase in air/fuel ratio and the EGR signal inhibited is unnecessary with this small change. An RPM timer which counts a time representative of speeds slower than a fast idle (850 RPM) is used to clear the PDS bit if the RPM's of the engine go below this point. The RPM timer is reset at the edges of FFS signal and will not time out if the engine remains above the fast idle speed.

With reference now to the detailed flow chart shown in FIGS. 19a-k, the program for the microprocessor function generator controlling the electronic control unit in a closed loop manner will be more fully explained. The blocks in the program indicate functional steps of the program and have addresses in the left-hand corners corresponding to the same address in the assembly language program listing which follows. Also, in FIG. 18 a functional hardware implementation of the program is illustrated as a digital system controlled by similar signals which correspond to signals used in the decision blocks of the program.

Figure 19A:
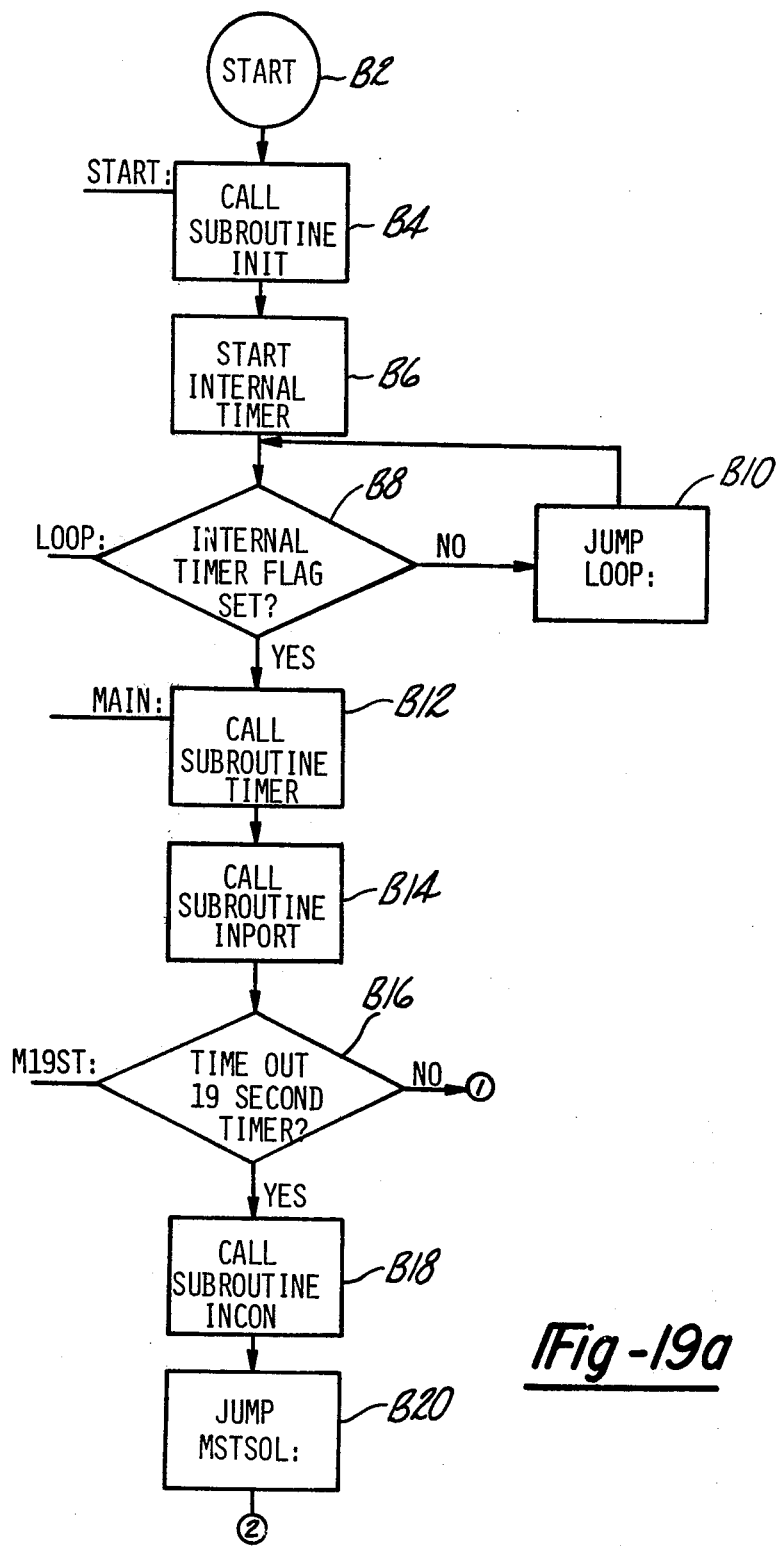
FIGS. 19a through 19k is an illustrative flow chart of the program stored in the read only memory in the microprocessor illustrated in FIG. 15.
Figure 19B:
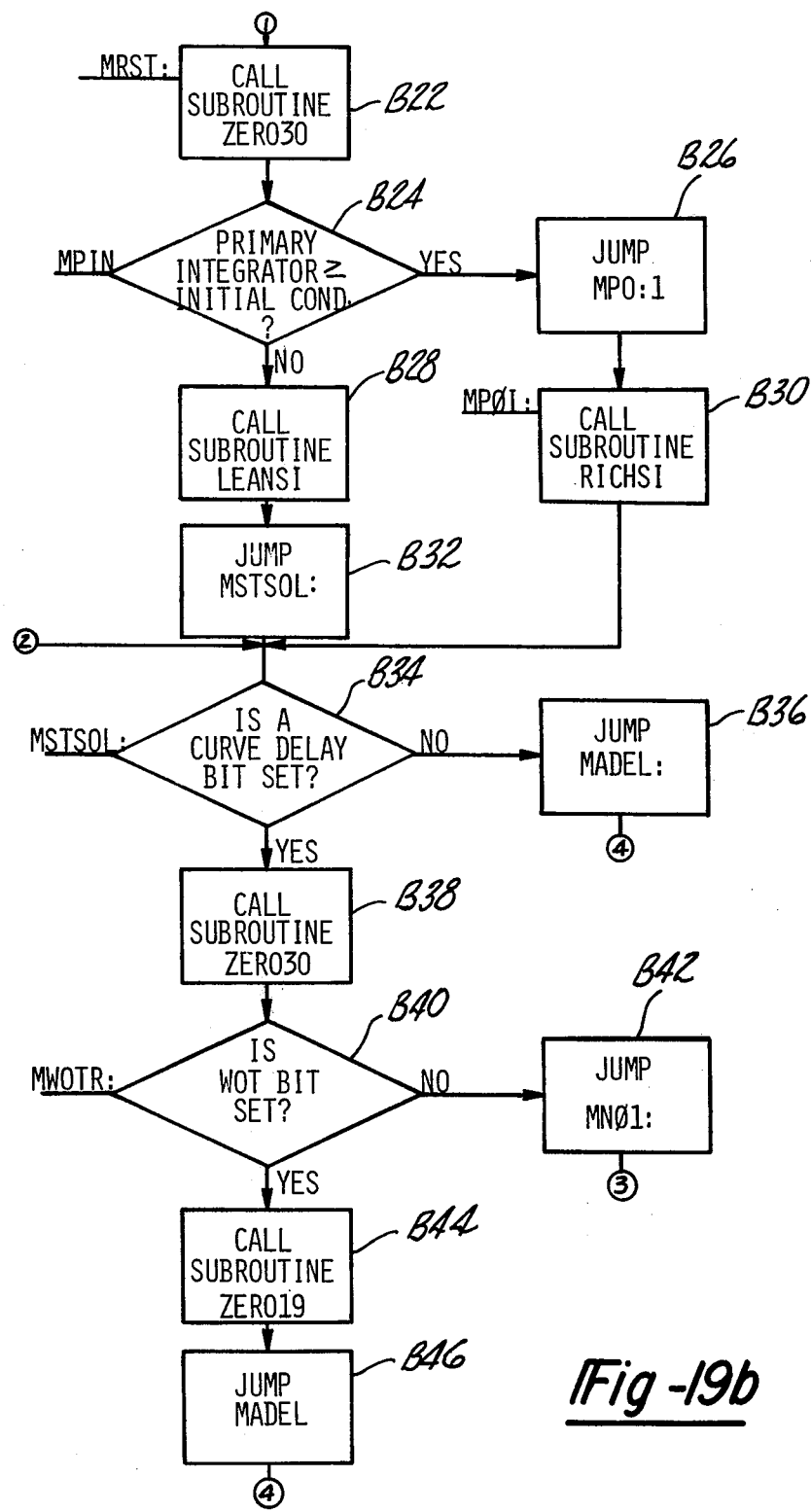
Figure 19C:
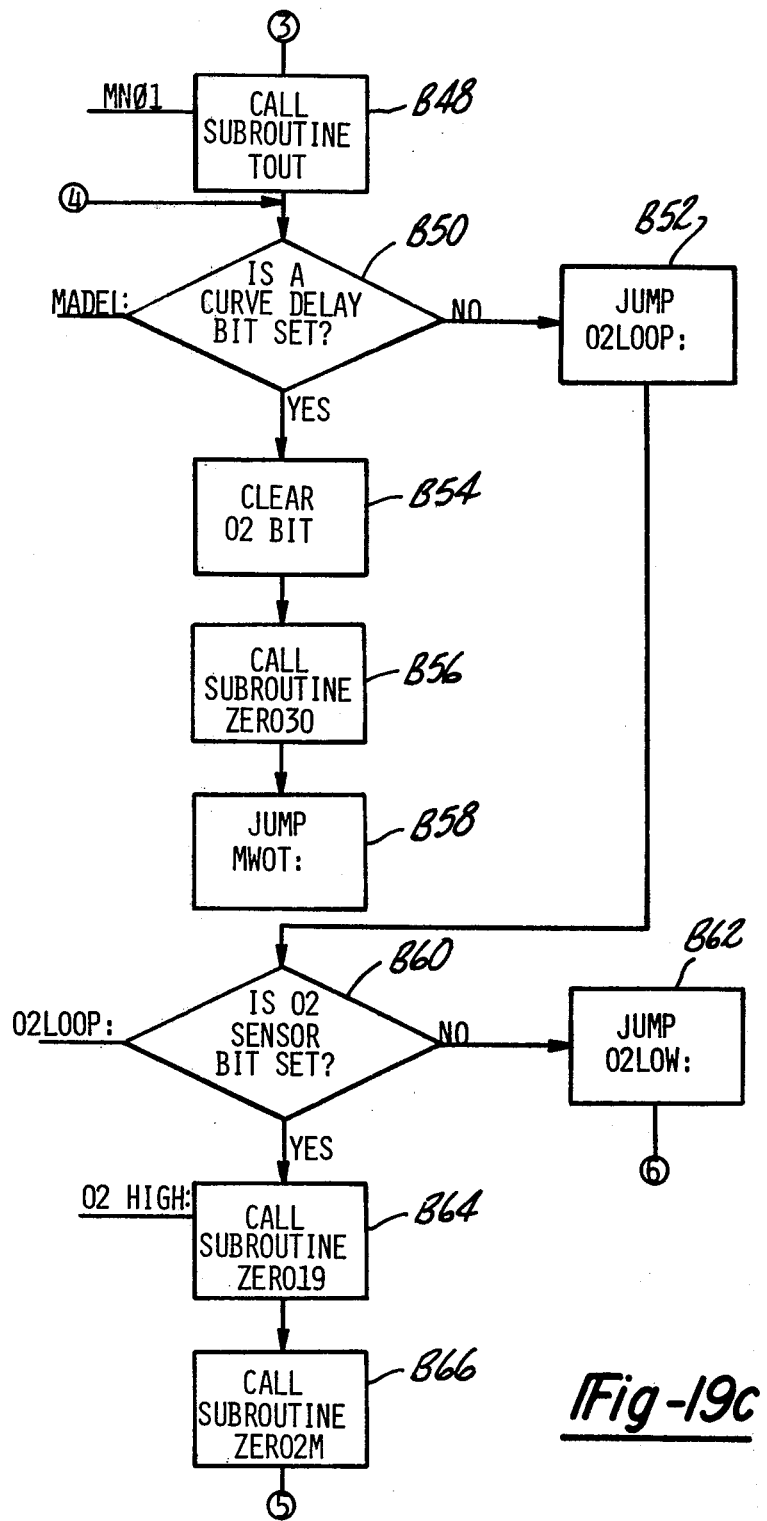
Figure 19D:
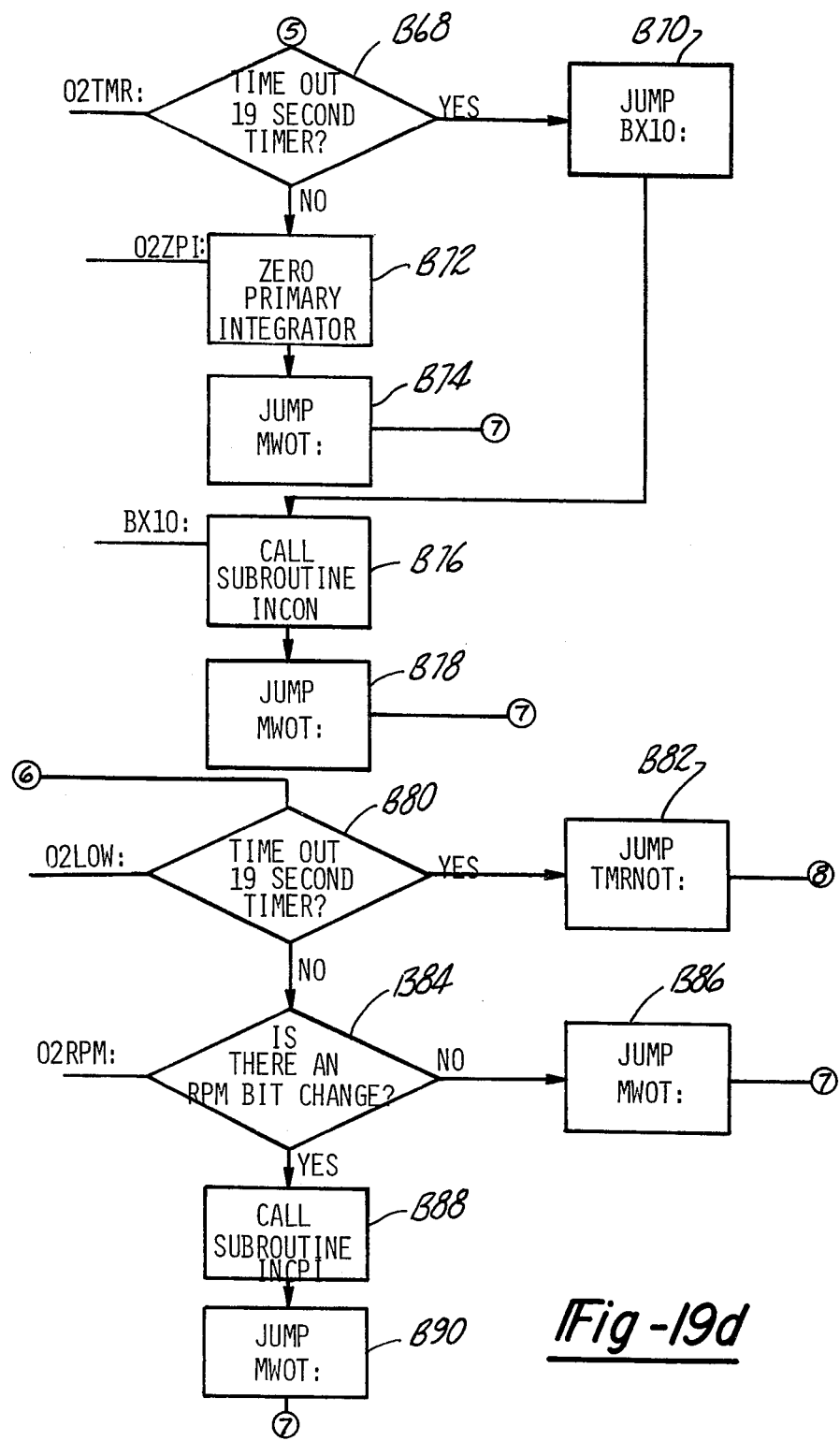
Figure 19E:
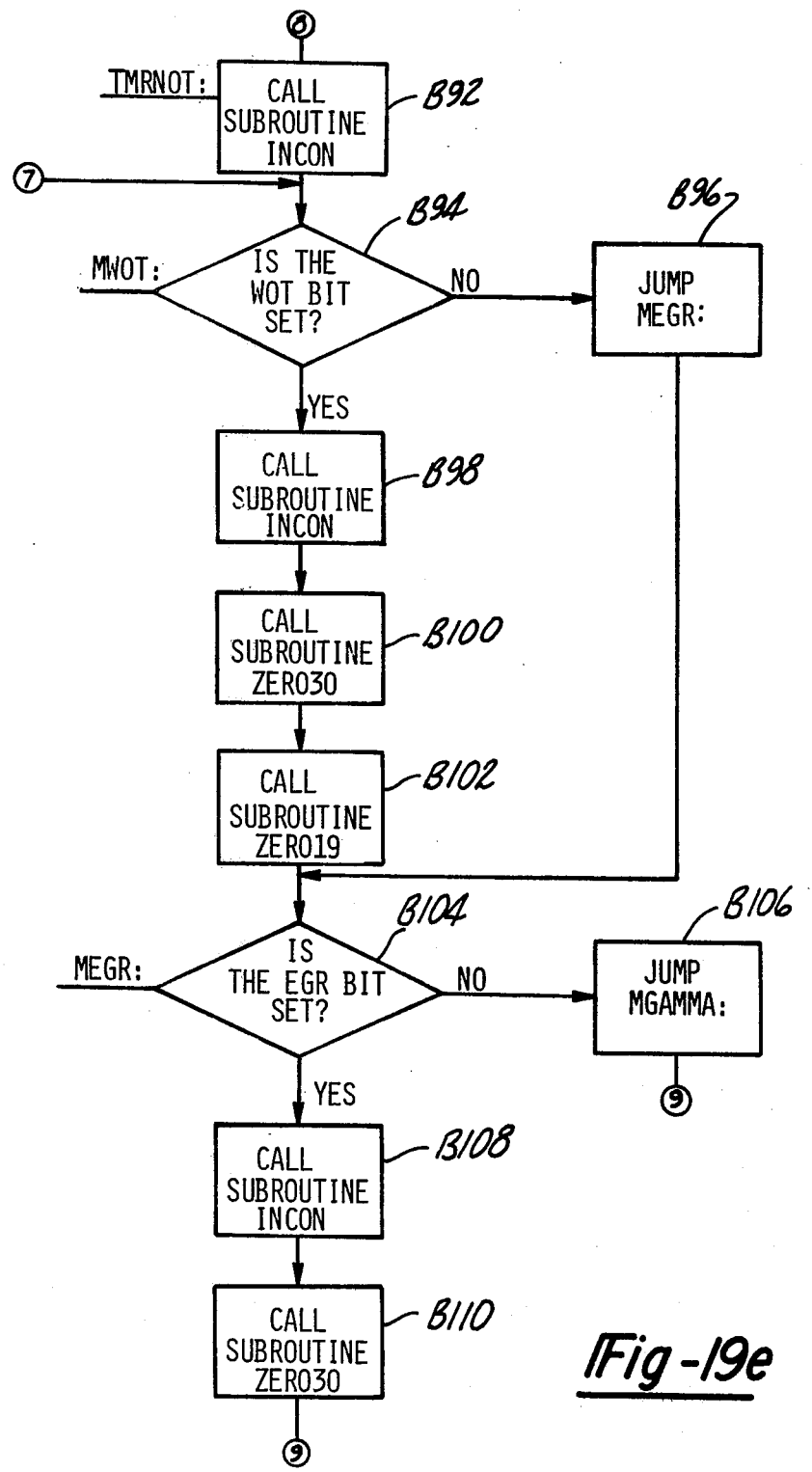
Figure 19F:
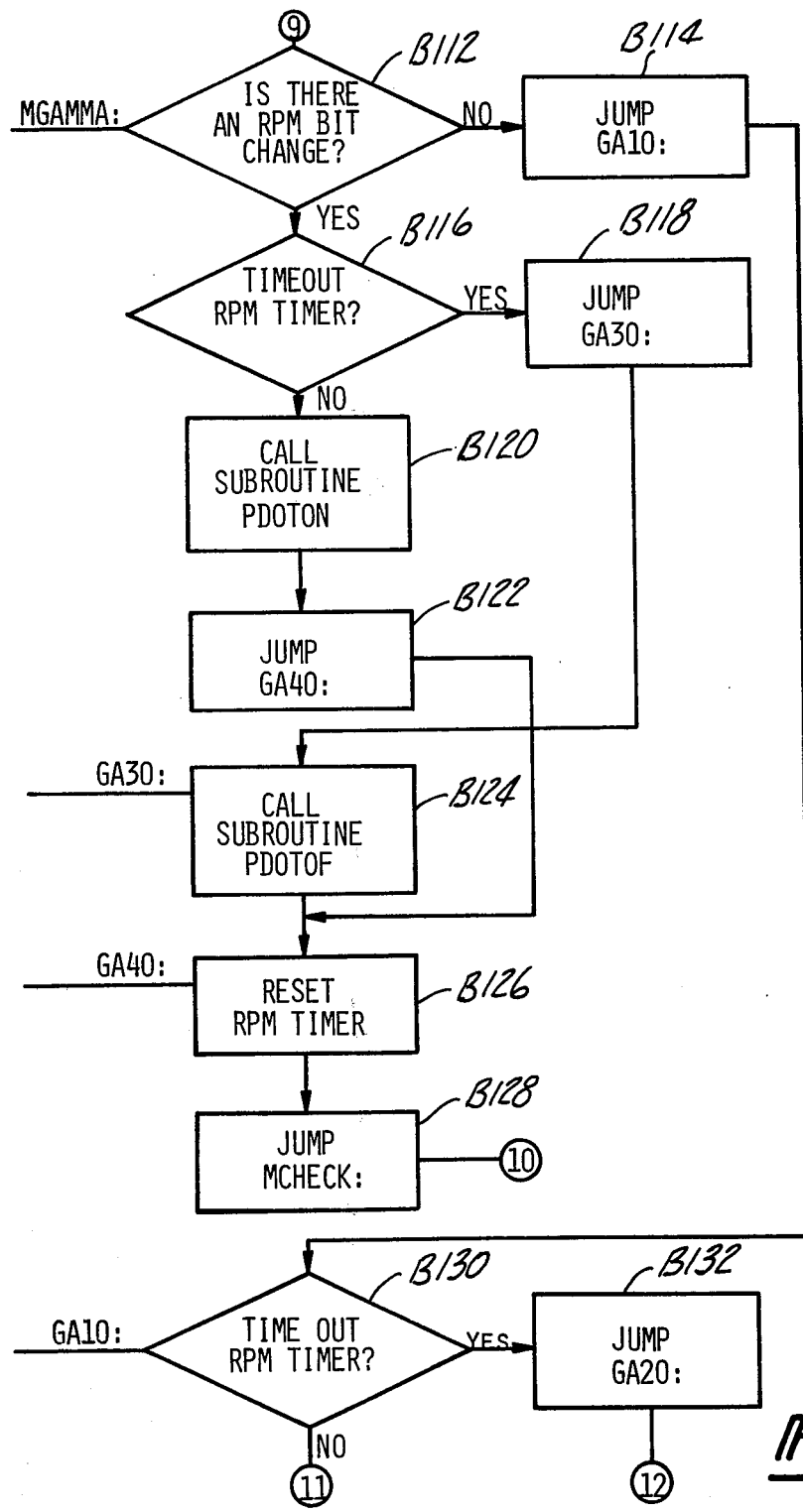
Figure 19G:
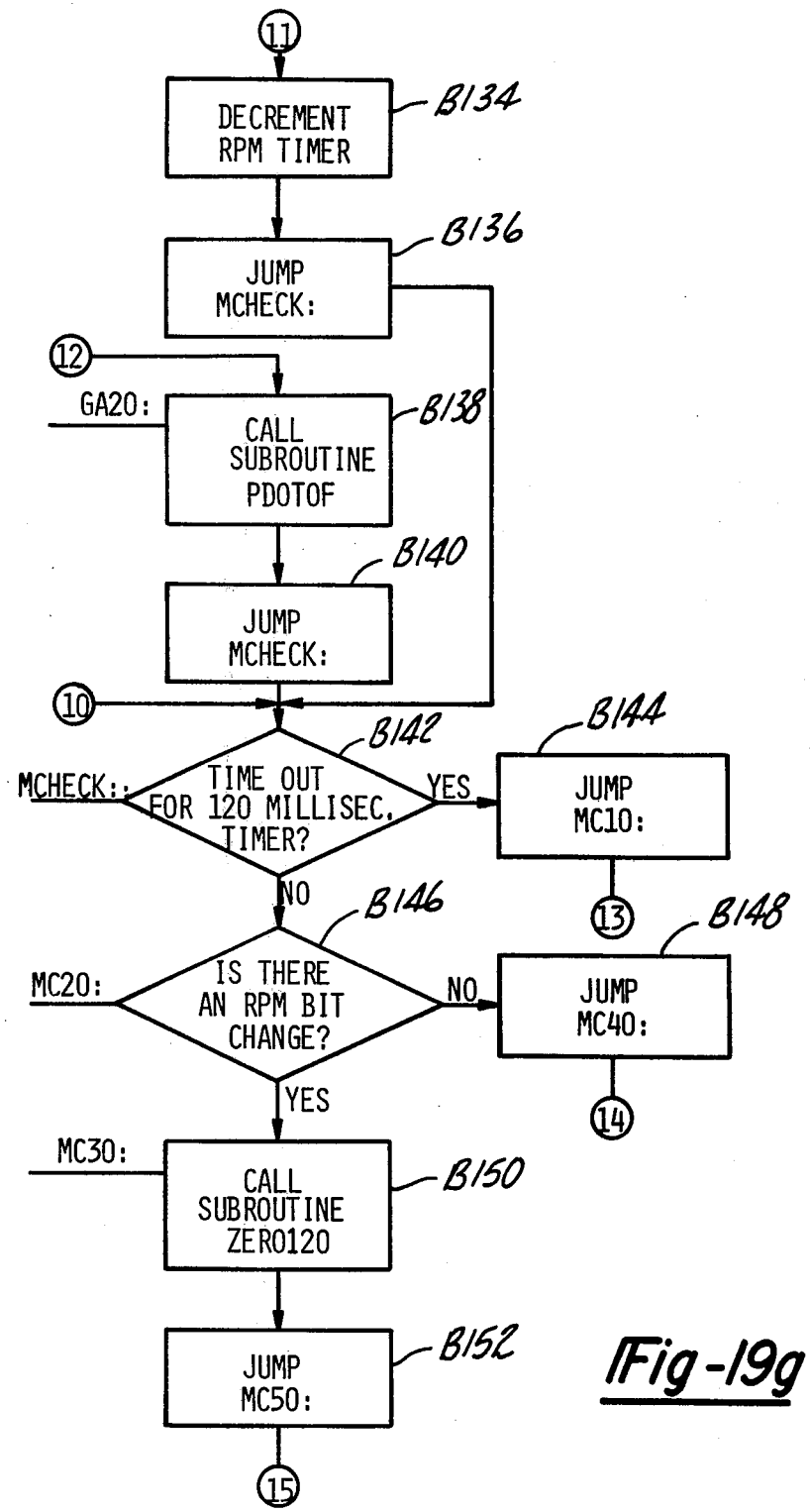
Figure 19H:
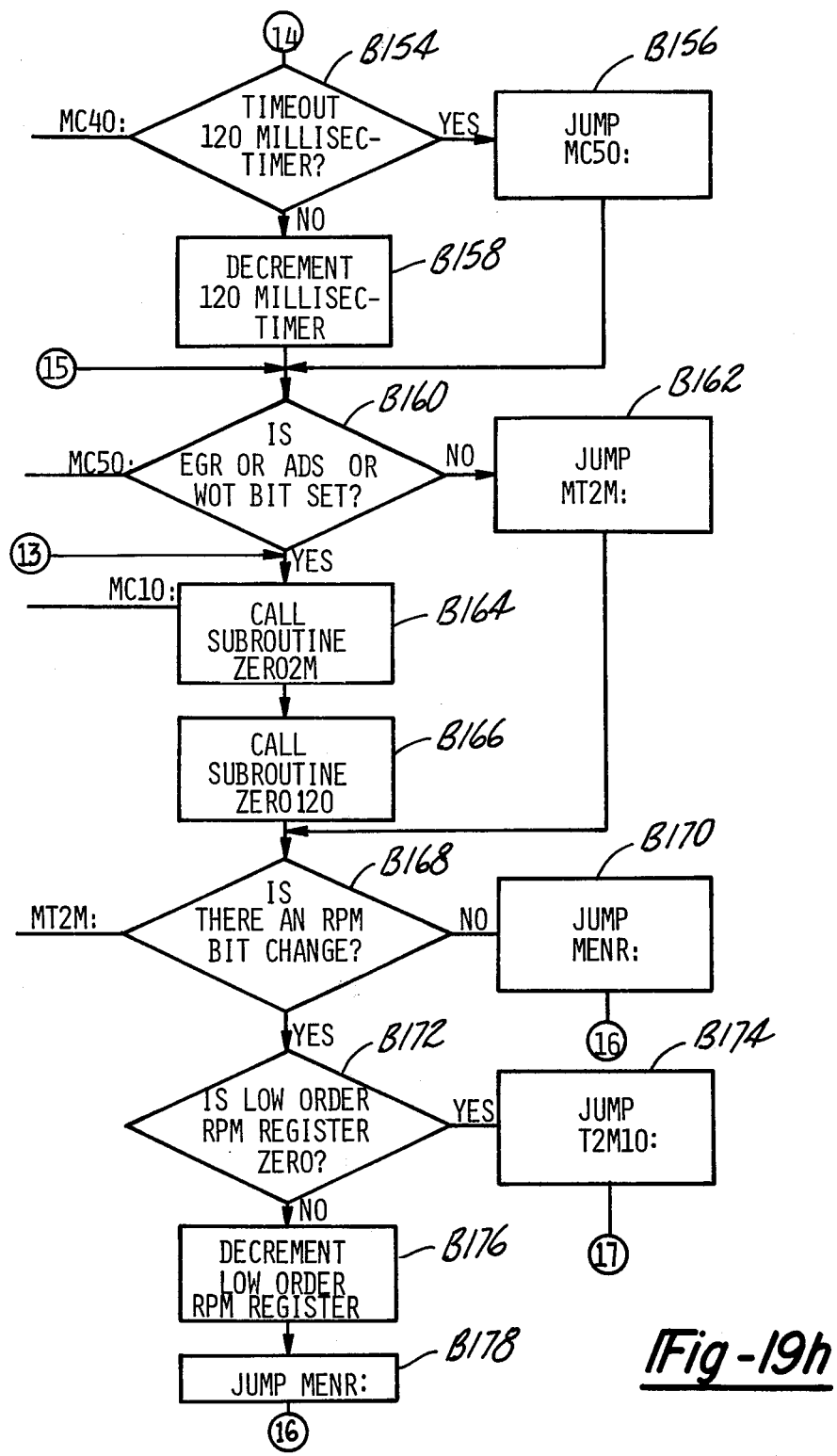
Figure 19I:
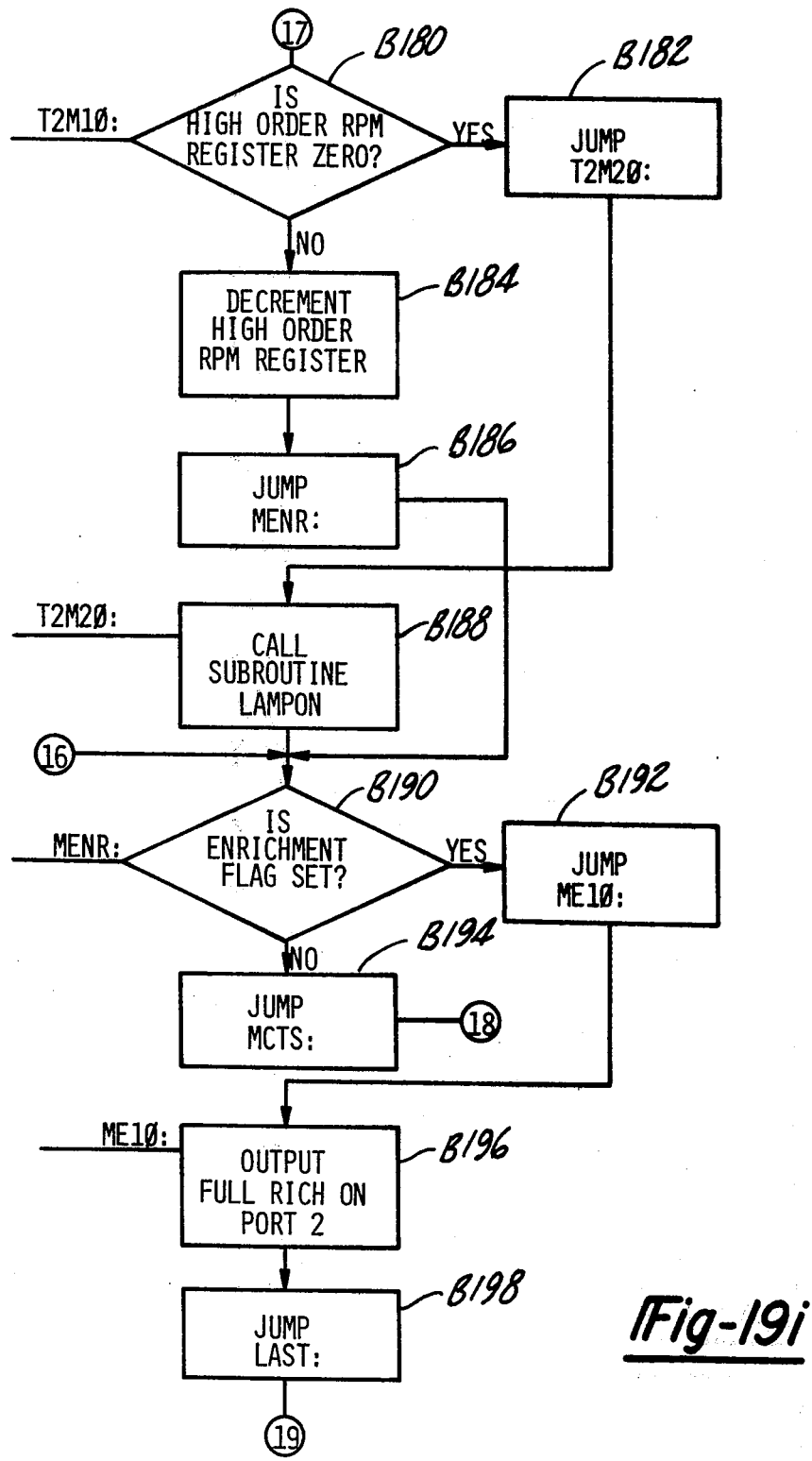
Figure 19J:
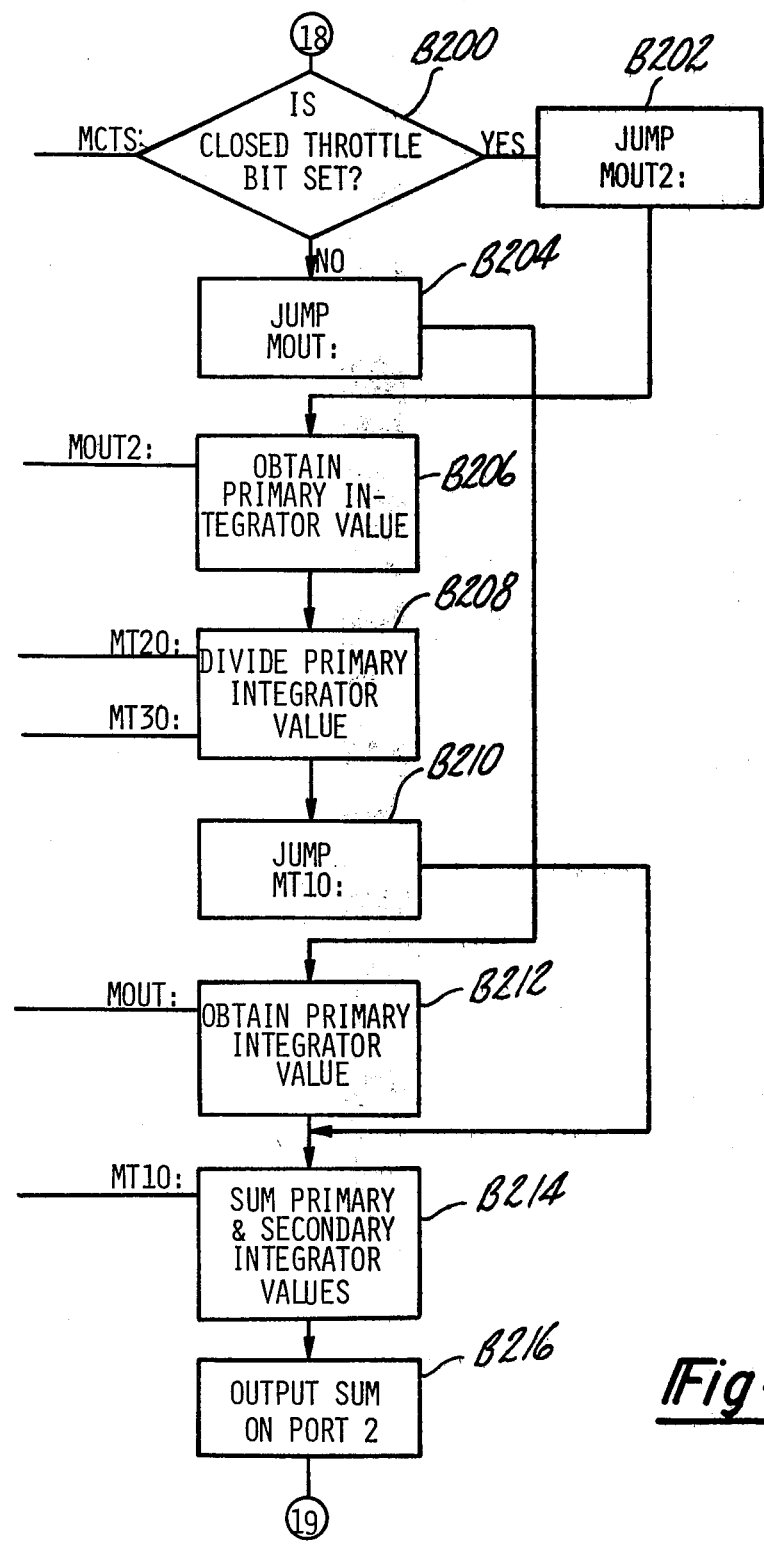
Figure 19K:
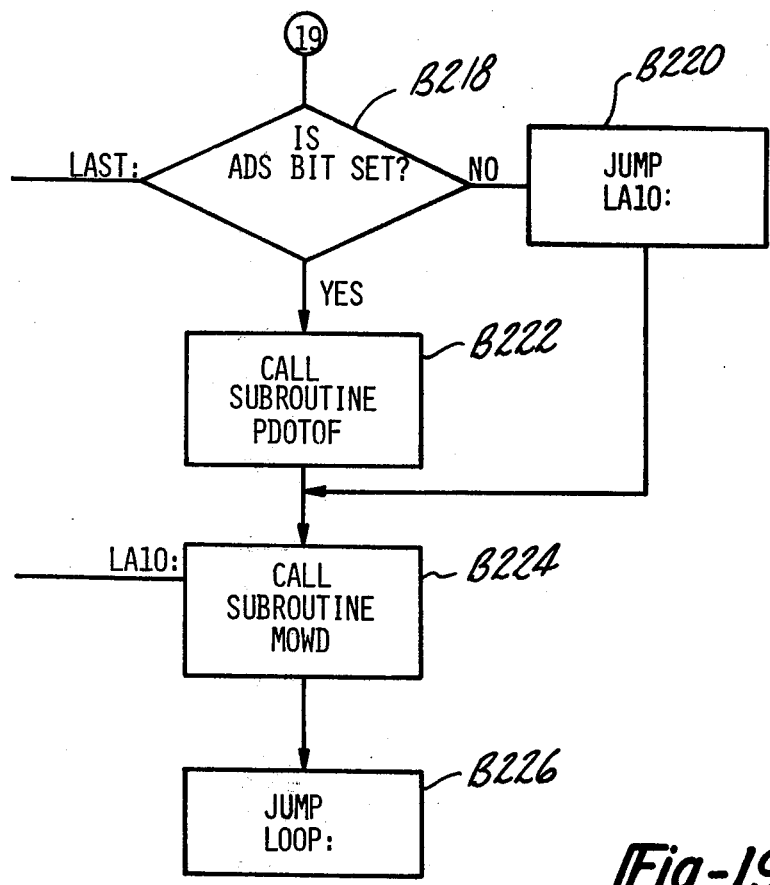

Beginning with FIG. 19a and the address START: at block B4, the program calls a subroutine INIT that initializes the counters and intializes program constants. The program then starts the internal timer of the microprocessor at block B6. The internal timer flag is tested at block B8 and cycles through block B10 until the flag is set. This causes the program to loop at this point until the internal timer flag is set after each execution of the program. As each execution pass may be a different number of instructions long because of the conditions and branches that the program takes, there is necessitated a means for equalizing the execution times for each pass. The internal timer adds a variable delay to the program execution time that allows the entire pass through the program to occur once every set increment of time. The time set for the program execution in the present embodiment is 1.2 msec. per pass.

In the hardware implementation, state generator 900 will count down a clock signal CLK until it is reset at the 1.2 millsec mark via a reset line 902. Sequential states SO-SN can be decoded as the incrementally increasing counts before the state generator is reset.

Once the timer flag becomes set, a new 1.2 msec period begins and the subroutine TIMER at block B12 is called to clear the timer flag and reset the initial count of the timer to begin the count once more. Once the timer has been reset and various other timers have been set to their initial conditions, the program then calls for input data by calling the subroutine INPORT at block B14. This reads the six bits of data in from port 1 into a memory location where the bits corresponding to WOT, EGR, $O_2$, ADS, FFS and CTS signals can be tested to determine if their particular bit is set.

The subroutine INPORT includes a digital filter for eliminating noise for the six signals input to the microprocessor. It is important that noise does not cause the microprocessor to see a momentary change in signal level as a change in bit status. The resulting logical conditions performed on an incorrect data bit would affect the precise ECU control if this were allowed to happen. In an automotive environment, the digital filter can be used for ignition spikes and other noise filtering from the data lines. The microprocessor therefore reads the input data line three times, pausing for a set period between each data read by executing a fixed number of no operation instructions. The three data samples are then stored and thereafter exclusive ORed with each other. If any bit among the three samples has changed during this imput, the bit position of this error will be marked by a logical 1. If all three samples are the same, the result should be all zeroes for the exclusive OR comparison.

Any error in the input data is corrected in the subroutine by ORing together all the results of the exclusive OR comparisons to form one result word where the high bits indicate the position of an error. The result word and its complement are then ANDed with the old data sample, and the new data sample, respectively. The result word with high bits retains only those bits from the previous data sample which are now in error and the complement of the result word with zero bits clears are the same bits of the new data sample found to be in error. An addition of the new and old data sample will replace those error bits with those of the previously read sample.

After the data is read into memory the program will perform a test to determine whether the 19 second activity timer has indicated a time out at block B16. Generally, if the $O_2$ loop is running correctly, the answer will be NO and the program will move to FIG. 19b and block B22. The thirty second counter is then reset by calling the subroutine ZERO 30. If the loop is operating correctly as indicated by the running activity counter, there is no reason to perturb the operation with a rich burst and thus the thirty second counter will be reset on every execution of this path.

At this point, a test is initiated at block B24 to determine the value of the primary integrator. If the primary integrator is greater than or equal to its initial condition or midpoint, then the secondary integrator should be enriched or incremented one step. This is accomplished by following the program path "YES" to block B26 which sequences the program to the address MPO1: at block 30. Block 30 calls the subroutine RICHSI which increments the secondary integrator. If upon incrementation, the secondary integrator is at a maximum value of 230 then it will be held at that level.

If, however, the other condition at block B24 exists, that of the primary integrator being less than its initial condition or midpoint, the program will call the subroutine LEANSI: at block B28 and start to lean out the closed loop signal by one increment. This is accomplished by decrementing the secondary integrator memory location. If the secondary integrator is zero or at its lowest count, the subroutine LEANSI: will hold it at that level.

The program now comes to the address MSTSOL: at block B34 and at this point should normally find that no A curve delay bit is set. The program will, therefore, jump from Block B36 to the address MADEL: at block B50 in FIG. 19c. Since the A curve delay bit will still not be set at the address MADEL:, the program will now jump from Block B52 to the address $O_2$ LOOP: at block B60 and test the $O_2$ sensor activity and conditions for clocking the primary integrator. Assuming that the sensor bit is set indicating the $O_2$ sensor is sensing a rich condition in the air/fuel ratio of the exhaust gas, the program will now reset the 19 second activity counter by calling the subroutine ZERO 19 at block B64 and reset the RPM counter by calling the subroutine ZERO 2M at block B66.

From this point, the program will again test the 19 second timer for a time out at block B68 and if the loop is proceeding without incident, the answer will be no and the primary integrator location will be cleared to zero at block B72. The path to this point has indicated that the sensor is working and the air/fuel ratio is rich. Therefore, the primary integrator takes a full step in the lean direction and thereafter the program takes a direct jump from block B74 to the address MWOT: at block B94 in FIG. 19e.

If, however, the $O_2$ sensor is indicating an air/fuel ratio of the engine that is oxygen abundant or lean, the program execution branches from block B60 to block B80 through the execution of the jump instruction at block B62.

After checking for an activity time out at block B80, the sequence tests whether an RPM bit change has taken place at block B84. If there has been an RPM change, the primary integrator is incremented five counts at block B88 and the program then jumps to the address MWOT: at block B94 in FIG. 19e. If there is no RPM bit change, then the program will jump directly to MWOT:.

At this address, the program checks for the WOT bit and if the system is operating in a steady-state the no branch will be executed. The program then checks for the EGR bit and if the bit is low, the branch at block B106 is to the address MGAMMA: at block B112 of FIG. 19f.

Since the primary and secondary integrators have now been operated on and the system is operating properly, the lean out function for decelerations will now be accomplished at blocks B112–B140. The system checks for the change of the RPM bit meaning that the flip-flop signal FFS has changed during the last time it was checked, and thereafter will test for the time out of the RPM timer. If the timer has not timed out, the subroutine PDOTON is called and then the program jumps to address GA40: at block B126 and the RPM timer is reset.

This block of instructions allows the program to make sure that the engine is operating above a certain RPM and enables the deceleration lean out circuit by providing the PDS signal. If the RPM timer has timed out, indicated by the "YES" branch at block B116, the PDS bit is cleared by executing the subroutine PDOTOF at block B124. Thus, the PDS signal will be inhibited for RPM's below a value where a lean out could cause an engine stall or roughness.

At the next address MCHECK: at block B142, the 120 millisec timer is tested for a time out. The 120 millisec timer provides a low RPM reset for the RPM counter. If the test indicates that the 120 millisec timer is still running, the system will at block B146 then check for an RPM bit change. Finding a negative answer will cause the program to jump to address MC40: At block B154, the 120 millisec timer will again be tested and since the answer was initially no, the second test will again provide a negative answer. At block B154, the 120 millisec timer is decremented. Since the loop time for the entire program is 1.2 milliseconds, ten passes through the loop will allow the 120 millisec timer to time out. This portion of the program is then clocking the 120 millisec counter when it finds the timer running and no RPM pulse. On the other hand, if the timer is running at block B142 and there is an RPM pulse, the timer will be reset by the call of subroutine ZER12$\phi$ at block B150.

The program then will test whether any of the EGR, ADS or WOT bits are set. In standard operation, none of these bits will be set and therefore the program will jump to address MT2M: at block B168. At this point the program will initiate a routine to test the number of RPM bit changes from the FFS signal that have occurred since the previous reset of the RPM counter.

First an RPM bit change is tested for at block B168 and if there is none, the incrementing of the RPM counter is bypassed by jumping to the address MENR: at B190. However, if there is a bit change, the lower order register of the RPM counter is tested for a zero condition which indicates that it has counted down to zero. If the zero condition is found, the system will initiate a jump to address T2M10: at block B180 and test the high order RPM register for its contents. If both of these registers are found to be zero, it indicates a special condition of 4096 counts and a jump to T2M20: at block B188 will energize a visual indicator by calling the subroutine LAMPON. The subroutine LAMPON will set the LOS bit to signal the failure indicator circuit of the condition.

Returning to block B172 where the low order RPM register is tested for zero. If the answer there is, however, NO the low order RPM register is decremented and the program passes to the address MENR: at block B190. Another possibility is that the low order register is zero and the high order RPM register is not zero. If this condition is present, then the high order register is decremented at block B184 and the program will jump to the address MENR: bypassing the special instruction calling the LAMPON subroutine.

The address MENR: at block B190 begins the output of the integrator sums to the D/A converter by first testing whether the enrichment flag is set. If the enrichment flag is set, the system is looping in a full rich mode to provide a rich burst during the energization time of the 150 millisec timer and will jump to address ME10: at block B196 thereby outputting a full rich signal on port 2 and thereafter jump to the address LAST:.

That address at block B218, the ADS bit is again checked. If the answer to the test should be no, the subroutine then jumps to the address LA10: at block B224 and outputs the LOS and PDS signal by calling the subroutine MOWD and then begins the program cycle once more by jumping to the address LOOP:.

Returning to the address MENR: at block B190, if the enrichment flag is not set which is the normal loop operation, the system jumps to the address MCTS: at block B200 and checks for the closed throttle bit from signal CTS. If there is no closed throttle bit, the program will then cycle to the address MOUT: at block B212 and obtain the primary integrator value. The primary and secondary integrator values are summed together at block B214 and output on port 2 at block B216. At this point, the ADS bit is checked as previously described. If the ADS bit is set, the PDS will be turned off by call subroutine POTOF at block 222.

Address MCTS: senses at block B200 if the closed throttle bit is set and the program will jump out of sequence to the address MOUT2: at block B206 and obtain the primary integrator value if it is set. The program will divide the primary integrator value by half before it jumps to the address MT10: at block B214 where the primary and secondary integrator values are added together. The path is then the same as was explained before where the program will cycle through to the address LOOP:.

The previous description of the program is illustrative of the system operating in a normal closed loop mode. The following description will now disclose the special loop clamping instructions and resets for the program. In FIG. 19a, at block B16, when the activitiy timer indicates a time out by sequencing to block B18, the primary and secondary integrators are clamped to their initial or midpoint values by calling the subroutine INCON. Likewise, at blocks B68, B80 when the activity timer registers a time out, the subroutine INCON is called at blocks B76, B92, respectively to clamp the integrators.

During warm up conditions when the ADS signal bit is high, which is detected by a "yes" answer to the decisional blocks B34, B50, the 30 sec timer should be reset. This reset is accomplished by calling the subroutine ZERO30 at blocks B38, B56, respectively. In addition, the O2 signal bit is cleared at block B54 to prevent a transition of the O2 sensor from operating the loop during warm up conditions.

If the WOT bit is set, which is detected at decisional blocks B40, B94 the 19 sec activity timer is reset at blocks B44, B102 respectively by calling subroutine ZERO19. Additionally, the integrators are clamped to their midpoint values by the calling subroutine INCON at block B98 and the 30 sec time is reset by calling subroutine ZERO30 at block B100 in response to this condition.

If the EGR bit is set, as detected by a "YES" at decisional block B104, the integrators are clamped to their initial midpoint values and the 30 sec timer is reset by calling subroutines INCON, ZERO30 at blocks B108, B110 respectively.

Still further, if any of the bits representing the EGR, WOT, or ADS signals are set, the decision block B160 will sequence the program to blocks B164, B166 where the RPM counter is reset by calling subroutine ZERO2M and the 120 msec counter is reset by calling subroutine ZERO120.

Another implementation for the closed loop control circuit will be further described with respect to FIG. 18. The circuit shown is a digital implementation of the microprocessor program and uses similar input signals to produce the results described for that section. The resulting output waveforms are identical with those described previously and comprising the CLD, LOS, and PDS signals.

The primary integrator in this implementation forms a three bit binary counter 900 which has outputs $2^0$, $2^1$, $2^2$, that connect to a D/A converter 904 for conversion into an analog signal. The counter 900 has a DC reset input, RST, which receives the O2 signal from the terminal 960. The high level of the O2 signal will cause the counter to be reset and provide a O count output to the D/A converter. This action produces the full lean step of the primary integrator for a rich sensor signal as was described before.

A high O2 signal will hold the Counter 900 reset until the exhaust gas sensor detects a lean air/fuel ratio and provides a low level O2 signal. The counter 900 will subsequently count in steps to its highest count of 111 (binary) or 7 (decimal) upon each pulse from the reset signal RST being transmitted to the CL input of the counter 900 via and AND gate 920. An eight step primary integrator is utilized in the implementation instead of a five step counter to use all states of the three bits. The RST signal, indicative of each engine revolution, is used instead of a change in the FFS signal as the condition detected is identical.

A count decoder 910 is connected to the three output bits of the counter 900, and decodes the highest count to produce an inhibit signal to the AND gate 920 to prevent the counter from counting once it reaches a maximum level. A full count on the counter 900 is representative of the primary integrator reaching the upper extent of its authority level and it will be held there unless reset.

The counter 900 further has present inputs $2^0$, $2^1$, $2^2$. A high level of the enable input E of the counter 900 will cause the preset bits at these inputs to be transferred to the output bits. This feature is used to set the primary integrator to its initial condition, or half-way between the zero level and maximum count. For a counter with a maximum count of 7 (decimal) the $2^0$, $2^1$ bits will be set for intitial conditions.

The preset inputs $2^0$, $2^1$ and enable input E are commonly connected together to the output of an OR gate 924. Any one of the four inputs to the OR gate 924 will cause a count of 3 decimal to be preset on the outputs of the primary integrator. This output of the OR gate 924 is used to clamp the primary integrator to its initial conditions. When the integrators are clamped, the ECO system will be running in an open loop mode of operation.

The four inputs of OR gate 924 which cause the reference level or initial condition to be preset on the primary integrator are the WOT signal via a terminal 962, a high signal from the output 0 of a 19 second activity timer 928, the output of a monostable multivibrator 938, and the EGR signal via a terminal 966.

A secondary integrator is similarly comprised of a counter 902 having output bits $2^0$–$2^7$. The secondary integrator counts on a time base provided by a clock via the AND gate 922. The initial time base preferably is produced by a 1.2 millisecond clock from a terminal 970. The clock signal is at a rate such that the 38 second time constant for the secondary integrator is maintained after division into a slower signal. The secondary integrator counter 902 will count up or count down at the time base depending upon the signal level input to a U/D input. A logic signal to the U/D input is provided from the most significant bit of the primary integrator counter 900. The most significant bit of the primary integrator will identify whether the counter 900 is above or below the reference value or initial condition and will cause the secondary integrator to count up if above the value and to count down if below the value.

The output bits of the secondary integrator are transmitted to a D/A convertor 906 which generates an analog signal indicative of the output count. The output counts are further decoded by a decoder 908 which has an output that is fed back to the AND gate 922 to inhibit the 1.2 millisecond clock to the CL input of the secondary integrator if a maximum or minimum count is detected.

The secondary integrator counter 902 further has preset input bits $2^0$ through $2^6$ and an enable input E commonly connected with the output of the OR gate 924 to provide a preset function identical to that described for the primary integrator. That is, when the output of the OR gate 924 goes high, a midpoint count of 127 is preset into the output of the secondary integrator 902.

The outputs of the D/A convertors 904, 906 are combined through scaling resistors R916, R918, and R920 to produce the CLC signal at a terminal 976. The relationship of the respective authority levels between the primary and secondary integrator are set by the ratios of these resistances. The output signal CLC may be an analog voltage or could also be a change in conductance providing current sinking capabilities as was described for the D/A convertor with respect to the microprocessor implementation. The midpoint value of the CLC signal is a reference signal condition which the integrators will vary above and below in normal operation.

The scaling resistance for the D/A convertor 904 is changed by a bidirectional switch R914 which is controlled by the output of an inverter 912. The inverter is connected to a signal input terminal 956 which receives the closed throttle signal CTS to indicate whether this condition is present. When this condition is present or a high level, the inverter will turn off the bidirectional switch R914 and increase the value of the scaling resistance to the series combination of resistor R916 and resistor R916. This will divide the authority of the primary integrator 900 by a factor of two, or by another factor large enough to reduce torque roll at closed throttle conditions without the loss of closed loop control. When the CTS signal is absent, resistor R916 will be shunted by the conductance of the switch R914.

The 19 second activity timer 928 is a counter which is clocked from the output of a divider 940 which divides the 1.2 millisecond clock signal into slower pulse intervals. A high level signal is generated from its output terminal 0 if the counter is not reset within the 19 seconds. Further, when the output level of the activity timer becomes high, it is fed back to a clock inhibit input CLI to hold the timer in a high state until a reset is provided. Two signals reset the 19 second activity timer 928 via the output of an OR gate 926. The first of these is the O₂ signal via a terminal 960 which indicates that the O₂ sensor has made transition from a low to a high level and is therefore operative. The second signal which resets the 19 second activity timer 928 is the wide open throttle signal WOT via the terminal 962 which provides a perturbation to the system for the fail-soft capability as discussed earlier.

The 19 second activity timer additionally receives the ADS signal from a terminal 964 to a set input and automatically provide a high level on the output O of the timer 923. This condition is used to set the primary and secondary integrators to their midpoint conditions during the presence of ADS signal. The activity timer 928 will therefore clamp the integrators if over 19 sec. elapses between O₂ sensor transitions. The loop will thereafter remain clamped until a sensor transition or a wide open throttle signal resets the timer.

The 30 second counter 936 is implemented as a counter that is clocked by the output of the divider 940 and will produce a high level output from an output O if not reset within the 30 second cycle of the timer. The warm up condition signal ADS, the engine temperature signal EGR, and the wide open throttle signal WOT via OR gate 934 and OR gate 932 each provide a reset to the 30 second counter 936. If the 19 second activity timer output is low, this condition will provide another reset via an inverter 930 and the OR gate 932.

If the 30 second counter 936 does time out to provide a high level output at output O, this signal will enable a 150 millisecond monostable 938 via its enable input E. The monostable 938 is the enrichment burst generator which will produce a high level to the OR gate 924 for 150 milliseconds. In addition, it presets the most significant bits $2^2$, $2^7$ of the primary and secondary integator respectively to set the count to the highest level in combination with the other preset inputs. The rich burnt generator will thus provide a full rich CLC signal for 150 millisecs. The next clock pulse will produce a roll over or reset of the 30 second timer. If there is still no sensor activity from the system after the rich burst, the 30 sec. timer will begin a new cycle and generate the rich burst every 30 seconds.

The RPM timer 942 times the incoming pulses of the reset signal RST from terminal 974 to an input I and compares the interval between pulses to the 1.2 millisecond clock input to their CL terminal. If they are slower than a certain interval or number of clock pulses, the output O of the timer 942 will go high. The output of the RPM timer 942 remains high until the RST signal delivers pulses at a rate faster than the time interval.

The output O from the RPM timer 942 is transmitted to the reset R of a flip-flop 948 via an OR gate 944. The Q output of the flip-flop 948 is the PDS signal transmitted to other circuitry via terminal 978. The flip-flop 948 is further reset by the ADS signal input via terminal 986 and the OR gate 944. The EGR signal at terminal 982 is inverted via an inverter 946 is input to the set input of the flip-flop 948. Thus, the PDS signal is high during the absence of the EGR signal and low during the ADS signal or a low RPM.

A 120 millisecond timer similar to the RPM timer will compare the 1.2 millisecond clock input at its CL terminal with the RST signal pulses input to the terminal I of the timer 950. A high level output on the 120 millisecond timer output O indicates that the RST pulses are slower than the timer interval (120 ms) and will remain high until they occur at a faster rate. The output of the 120 millisecond timer 950 is used to reset the RPM counter 954 via OR gate 952.

A further input to the OR gate 952 is from the OR gate 934 which combines the ADS signal, EGR signal, and WOT signal via terminals 964, 966 and 968 respectively. A third input to the OR gate 952 is via a terminal 972 which provides the $O_2$ signal. If any of these signals are present, the output of the OR gate 952 will go high and hold the reset input RST of the RPM counter 954 in a high condition and prevent the lamp on signal LOS from being generated.

The RPM counter 952 as previously described is a 4,096 with respect to the microprocessor implementation state counter which is clocked by the RST signal pulses via its CL input. If 4,096 counts or engine revolutions accumulate before one of the reset signals to the counter 954 are present, the LOS signal will be generated to the terminal 980. If, on the other hand, the $O_2$ signal is present indicating that the sensor is operatively working, the EGR signal is present, indicating the engine is not up to operating temperature; the ADS signal is present, indicating warm up enrichment; or the WOT signal is present, indicating wide open throttle operations; then the LOS signal will not be generated.

Figures 4A, 16:
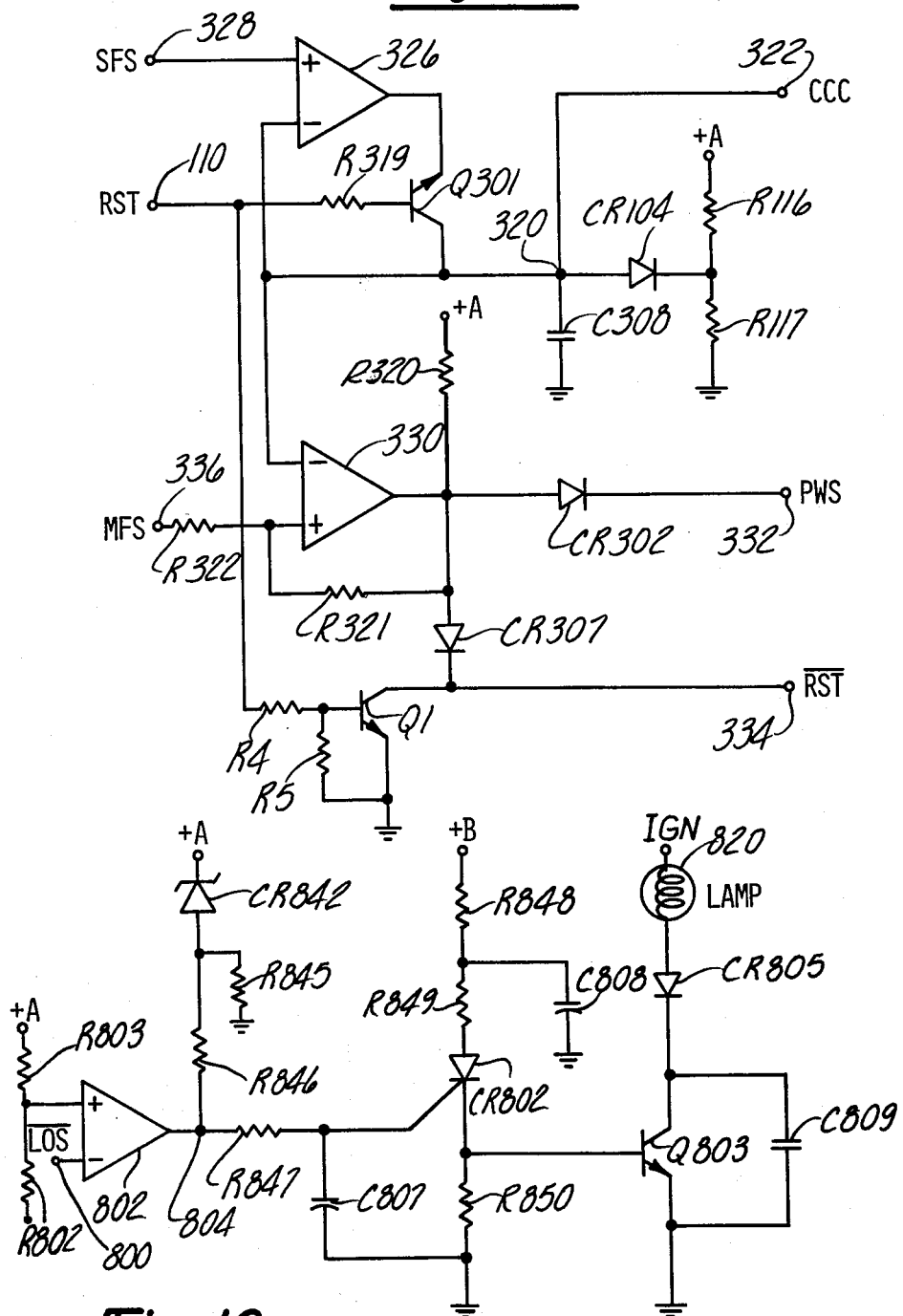
FIG. 4a is a detailed schematic diagram of circuitry for the pulse width generation circuit illustrated in FIG. 2.
FIG. 16 is a detailed schematic diagram of the failure detect circuit illustrated in FIG. 2.

The latched failure indication circuit will now be fully described with reference to the circuitry of FIG. 16. The indication circuit shown in the figure receives the lamp on signal LOS and energizes a visual indicator such as lamp 820 to indicate that the LOS signal has been present and the $O_2$ sensor has failed. If this happens, the lamp will remain on until power is disconnected from the circuit and can be only reset by removing the +B lead from the battery. Thus, if a restart is attempted without correcting the condition that caused the failure of the $O_2$ sensor, the lamp 820 will remain lit because it is latched.

The LOS signal is connected via a terminal 800 to the inverting input of an amplifier 802 which has its output connected to node 804. The noninverting input of the amplifier is connected to the junction voltage of a divider comprising a resistor R803 and a resistor R804 connected between a positive supply +A and ground. Positive voltage is supplied to the gate terminal of an SCR Q802 via the junction of a pair of series resistors R846 and R847 and a capacitor 807 connected between the source of positive supply +A and ground. The positive voltage will turn the SCR Q802 on. Further connected to the resistor R846 at an anode terminal is a Zener diode CR 842 which has its cathode connected to the positive voltage +A. A serial pair of current limiting resistors R848 and R849 are connected between the anode of the SCR Q802 and the battery voltage +V while the cathode of SCR Q802 is connected to ground through a voltage resistor R850. A timing capacitor C808 is connected to the junction of the resistors R848 and R849 and ground. Connected to the junction of the cathode of the SCR Q802 and the resistor R850 is the base of the drive transistor Q803. The drive transistor Q803 has its collector connected to the source the ignition signal IGN through the lamp coil inductance 820 and a series diode CR805. The drive transistor emitter is connected to ground. The drive transistor Q803 further has a by-pass capacitor C809 connected between its collector and emitter.

In operation when the lamp on signal is high, node 804 will be grounded through the output of the amplifier 802 to keep the SCR Q802 out of conduction. When the LOS signal goes slow indicating a failure has taken place, the positive voltage via the resistors R846, R847 will turn on the SCR Q802 and cause it to latch. Conduction of the SCR Q802 will cause current to flow through the path from the battery +B to the resistors R848, R849, the SCR, and the resistor R850 to ground. Current flowing through resistor R850 will develop a voltage which will cause the transistor Q803 to conduct and light the lamp 820. The capacitor C807 slows down the rise of the positive voltage so voltage spikes from a noisy environment such as an automobile will not cause the light to trigger falsely. Likewise, for protecting the circuit from triggering falsely, the Zener diode CR842 regulates the +A voltage down to about 4.7 volts and then shuts off. When the microprocessor beings to lose voltage and can no longer control its output signals, all signal lines from the device go high but will thereafter go low if the microprocessor supply continues to drop below about 4.0 volts. This false indication of a failure condition for the sensor will not trigger the SCR CR802 as the Zener CR842 will also be off during this condition.

Additional filtering for the battery voltage +B is accomplished by the capacitor C808, and the resistor R848. A rapid change in +B during cranking or other conditions could cause the SCR to falsely trigger if the filter were not to smooth it out there. Filtering of the IG signal is accomplished by the diode CR805, and capacitor C809. The diode CR805 blocks negative DC voltages and the capacitor C809 shunts AC component noise to ground. Without such filtering, the noise commonly found on the IGN signal could cause triggering of the circuit.

While a preferred embodiment of the invention has been illustrated, it will be obvious to those skilled in the art that various modifications and changes may be made thereto without departing from the spirit and scope of the invention as defined in the appended claims.

| LOC | OBJ | SEQ | SOURCE STATEMENT | |
|---|---|---|---|---|
| 0020 |  | 1 | ORG | 32 |
| 0001 |  | 2 | PI: | DS 1 |
| 0001 |  | 3 | SIP: | DS 1 |
| 0001 |  | 4 | SI: | DS 1 |
| 0001 |  | 5 | T19FLG: | DS 1 |
| 0001 |  | 6 | T19SP: | DS 1 |
| 0001 |  | 7 | T19S: | DS 1 |
| 0001 |  | 8 | T30S: | DS 1 |
| 0001 |  | 9 | T30SP: | DS 1 |
| 0001 |  | 10 | T150: | DS 1 |
| 0001 |  | 11 | T120: | DS 1 |
| 0001 |  | 12 | T2MS: | DS 1 |
| 0001 |  | 13 | T2MSP: | DS 1 |

```
0001              14        ENFLG:  DS    1
0001              15        OLDWD:  DS    1
0001              16        NEWWD:  DS    1
0001              17        OUT1WD: DS    1
0001              18        POUTWD: DS    1
0001              19        RPTMR:  DS    1
0001              20        STMSK   EQU   00000001B
0008              21        WOTMSK  EQU   00001000B
0001              22        ADMSK   EQU   00000001B
0004              23        EGRMSK  EQU   00000100B
0020              24        O2MSK   EQU   00100000B
0010              25        CTSMSK  EQU   00010000B
0002              26        RPMSK   EQU   00000010B
000D              27        MSK1    EQU   STMSK OR
000F              28        ICPI    EQU   15
0071              29        ICSI    EQU   113
00FF              30        ENOUT   EQU   255
003F              31        PMSK1   EQU   00111111B
0062              32        ICT30S  EQU   98
00FF              33        ICT19   EQU   255
003E              34        ICT19S  EQU   62
007D              35        ICT150  EQU   125
00FF              36        ICT30   EQU   255
0045              37        ICSIP   EQU   69
005B              38        ICT120  EQU   91
000F              39        ICT2M   EQU   15
00FF              40        ICT2MS  EQU   255
00F6              41        TIMCNT  EQU   246
003C              42        RPCNT   EQU   60
00E6              43        MAXSI   EQU   230
008A              44        MAXSIP  EQU   138
0000              45        MINSI   EQU   0
0019              46        MAXPI   EQU   25
0000              47                ORG   0
0000 5469         48 START: CALL    INIT
0002 55           49         STRT   T
0003 1607         50 LOOP:   JTF    MAIN
0005 0403         51         JMP    LOOP
0007 5400         52 MAIN:   CALL   TIMER
0009 3496         53         CALL   INPORT
000B B823         54 M19ST:  MOV    R0,#T19FLG
000D F0           55         MOV    A,@R0
000E 9614         56         JNZ    MRST
0010 342E         57         CALL   INCON
0012 0424         58         JMP    MSTSOL
0014 3448         59 MRST:   CALL   ZERO30
0016 B820         60 MPIN    MOV    R0,#PI
0018 F0           61         MOV    A,@R0
0019 97           62         CLR    C
001A 03F1         63         ADD    A,#0FFH-ICPI+1
001C F622         64         JC     MP01
001E 3467         65         CALL   LEANSI
0020 0424         66         JMP    MSTSOL
0022 3479         67 MP01:   CALL   RICHSI
0024 2301         68 MSTSOL: MOV    A,#ADMSK
0026 51           69         ANL    A,@R1
0027 C636         70         JZ     MADEL
0029 3448         71         CALL   ZERO30
002B 2308         72 MWOTR:  MOV    A,#WOTMSK
```

```
002D 51            73             ANL     A, @R1
002E C634          74             JZ      MW01
0030 343B          75             CALL    ZERO19
0032 0436          76             JMP     MADEL
0034 3491          77  MW01:      CALL    TOUT19
0036 2301          78  MADEL:     MOV     A, #ADMSK
0038 51            79             ANL     A, @R1
0039 C643          80             JZ      O2LOOP
003B 23DF          81             MOV     A, #NOT O2MSK
003D 51            82             ANL     A, @R1
003E 21            83             XCH     A, @R1
003F 3448          84             CALL    ZERO30
0041 046E          85             JMP     MWOT
0043 2320          86  O2LOOP:    MOV     A, #O2MSK
0045 51            87             ANL     A, @R1
0046 C65B          88             JZ      O2LOW
0048 343B          89  O2HIGH:    CALL    ZERO19
004A 3459          90             CALL    ZERO2M
004C B823          91  O2TMR:     MOV     R0, #T19FLG
004E F0            92             MOV     A, @R0
004F C657          93             JZ      BX10
0051 B820          94  O2ZPI:     MOV     R0, #PI
0053 B000          95             MOV     @R0, #0
0055 046E          96             JMP     MWOT
0057 342E          97  BX10:      CALL    INCON
0059 046E          98             JMP     MWOT
005B B823          99  O2LOW:     MOV     R0, #T19FLG
005D F0            100            MOV     A, @R0
005E C66C          101            JZ      TMRNOT
0060 B82D          102 O2RPM:     MOV     R0, #OLDWD
0062 F0            103            MOV     A, @R0
0063 D1            104            XRL     A, @R1
0064 5302          105            ANL     A, #RPMSK
0066 C66E          106            JZ      MWOT
0068 341C          107            CALL    INCPI
006A 046E          108            JMP     MWOT
006C 342E          109 TMRNOT:    CALL    INCON
006E 2308          110 MWOT:      MOV     A, #WOTMSK
0070 51            111            ANL     A, @R1
0071 C679          112            JZ      MEGR
0073 342E          113            CALL    INCON
0075 3448          114            CALL    ZERO30
0077 343B          115            CALL    ZERO19
0079 2304          116 MEGR:      MOV     A, #EGRMSK
007B 51            117            ANL     A, @R1
007C C682          118            JZ      MGAMMA
007E 342E          119            CALL    INCON
0080 3448          120            CALL    ZERO30
0082 B82D          121 MGAMMA:    MOV     R0, #OLDWD
0084 F0            122            MOV     A, @R0
0085 D1            123            XRL     A, @R1
0086 5302          124            ANL     A, #RPMSK
0088 C69B          125            JZ      GA10
008A B831          126            MOV     R0, #RPTMR
008C F0            127            MOV     A, @R0
008D C693          128            JZ      GA30
008F 34CB          129            CALL    PDOTON
0091 0495          130            JMP     GA40
0093 34D2          131 GA30:      CALL    PDOTOF
```

```
0095 B831    132 GA40:    MOV     R0, #RPTMR
0097 B03C    133          MOV     @R0, #RPCNT
0099 04A8    134          JMP     MCHECK
009B B831    135 GA10:    MOV     R0, #RPTMR
009D F0      136          MOV     A, @R0
009E C6A4    137          JZ      GA20
00A0 07      138          DEC     A
00A1 A0      139          MOV     @R0, A
00A2 04A8    140          JMP     MCHECK
00A4 34D2    141 GA20:    CALL    PDOTOF
00A6 04A8    142          JMP     MCHECK
00A8 B829    143 MCHECK:  MOV     R0, #T120
00AA F0      144          MOV     A, @R0
00AB C6C5    145          JZ      MC10
00AD B82D    146 MC20:    MOV     R0, #OLDWD
00AF F0      147          MOV     A, @R0
00B0 D1      148          XRL     A, @R1
00B1 5302    149          ANL     A, #RPMSK
00B3 C6B9    150          JZ      MC40
00B5 3462    151 MC30:    CALL    ZER120
00B7 04C0    152          JMP     MC50
00B9 B829    153 MC40:    MOV     R0, #T120
00BB F0      154          MOV     A, @R0
00BC C6C0    155          JZ      MC50
00BE 07      156          DEC     A
00BF A0      157          MOV     @R0, A
00C0 F1      158 MC50:    MOV     A, @R1
00C1 530D    159          ANL     A, #MSK1
00C3 C6C9    160          JZ      MT2M
00C5 3459    161 MC10:    CALL    ZERO2M
00C7 3462    162          CALL    ZER120
00C9 B82D    163 MT2M:    MOV     R0, #OLDWD
00CB F0      164          MOV     A, @R0
00CC D1      165          XRL     A, @R1
00CD 5302    166          ANL     A, #RPMSK
00CF C6E7    167          JZ      MENR
00D1 B82B    168          MOV     R0, #T2MSP
00D3 F0      169          MOV     A, @R0
00D4 C6DA    170          JZ      T2M10
00D6 07      171          DEC     A
00D7 A0      172          MOV     @R0, A
00D8 04E7    173          JMP     MENR
00DA B0FF    174 T2M10:   MOV     @R0, #ICT2MS
00DC B82A    175          MOV     R0, #T2MS
00DE F0      176          MOV     A, @R0
00DF C6E5    177          JZ      T2M20
00E1 07      178          DEC     A
00E2 A0      179          MOV     @R0, A
00E3 04E7    180          JMP     MENR
00E5 34C4    181 T2M20:   CALL    LAMPON
00E7 B82C    182 MENR:    MOV     R0, #ENFLG
00E9 F0      183          MOV     A, @R0
00EA 96EE    184          JNZ     ME10
00EC 04F3    185          JMP     MCTS
00EE 23FF    186 ME10:    MOV     A, #ENOUT
00F0 3A      187          OUTL    P2, A
00F1 2411    188          JMP     LAST
00F3 2310    189 MCTS:    MOV     A, #CTSMSK
00F5 51      190          ANL     A, @R1
```

```
00F6 96FA      191           JNZ     MOUT2
00F8 240A      192           JMP     MOUT
00FA B820      193 MOUT2:    MOV     R0,#PI
00FC F0        194           MOV     A,@R0
00FD 03F1      195           ADD     A,#0FFH-ICPI+1
00FF 97        196           CLR     C
0100 F204      197           JB7     MT20
0102 2405      198           JMP     MT30
0104 A7        199 MT20:     CPL     C
0105 67        200 MT30:     RRC     A
0106 030F      201           ADD     A,#ICPI
0108 240D      202           JMP     MT10
010A B820      203 MOUT:     MOV     R0,#PI
010C F0        204           MOV     A,@R0
010D B822      205 MT10:     MOV     R0,#SI
010F 60        206           ADD     A,@R0
0110 3A        207           OUTL    P2,A
0111 2301      208 LAST:     MOV     A,#ADMSK
0113 51        209           ANL     A,@R1
0114 C618      210           JZ      LA10
0116 34D2      211           CALL    PDOTOF
0118 34D9      212 LA10:     CALL    MOWD
011A 0403      213           JMP     LOOP
011C B820      214 INCPI:    MOV     R0,#PI
011E F0        215           MOV     A,@R0
011F 0305      216           ADD     A,#5
0121 97        217           CLR     C
0122 03E7      218           ADD     A,#0FFH-MAXPI+1
0124 F62B      219           JC      PI10
0126 F0        220 PI50:     MOV     A,@R0
0127 0305      221           ADD     A,#5
0129 A0        222           MOV     @R0,A
012A 83        223           RET
012B B019      224 PI10:     MOV     @R0,#MAXPI
012D 83        225           RET
012E B820      226 INCON:    MOV     R0,#PI
0130 B00F      227           MOV     @R0,#ICPI
0132 B822      228           MOV     R0,#SI
0134 B071      229           MOV     @R0,#ICSI
0136 B821      230           MOV     R0,#SIP
0138 B045      231           MOV     @R0,#ICSIP
013A 83        232           RET
013B B823      233 ZERO19:   MOV     R0,#T19FLG
013D B001      234           MOV     @R0,#1
013F B825      235           MOV     R0,#T19S
0141 B03E      236           MOV     @R0,#ICT19S
0143 B824      237           MOV     R0,#T19SP
0145 B0FF      238           MOV     @R0,#ICT19
0147 83        239           RET
0148 B826      240 ZERO30:   MOV     R0,#T30S
014A B062      241           MOV     @R0,#ICT30S
014C B827      242           MOV     R0,#T30SP
014E B0FF      243           MOV     @R0,#ICT30
0150 B82C      244           MOV     R0,#ENFLG
0152 B000      245           MOV     @R0,#0
0154 B828      246           MOV     R0,#T150
0156 B07D      247           MOV     @R0,#ICT150
0158 83        248           RET
0159 B82A      249 ZERO2M:   MOV     R0,#T2MS
```

```
015B B00F      250           MOV    @R0,#ICT2M
015D B82B      251           MOV    R0,#T2MSP
015F B0FF      252           MOV    @R0,#ICT2MS
0161 83        253           RET
0162 B829      254  ZER120:  MOV    R0,#T120
0164 B05B      255           MOV    @R0,#ICT120
0166 83        256           RET
0167 B821      257  LEANSI:  MOV    R0,#SIP
0169 F0        258           MOV    A,@R0
016A C66F      259           JZ     LN10
016C 07        260           DEC    A
016D A0        261           MOV    @R0,A
016E 83        262           RET
016F B08A      263  LN10:    MOV    @R0,#MAXSIP
0171 B822      264           MOV    R0,#SI
0173 F0        265           MOV    A,@R0
0174 C678      266           JZ     LN20
0176 07        267           DEC    A
0177 A0        268           MOV    @R0,A
0178 83        269  LN20:    RET
0179 B821      270  RICHSI:  MOV    R0,#SIP
017B F0        271           MOV    A,@R0
017C 0376      272           ADD    A,#0FFH-MAXSIP+1
017E C684      273           JZ     RH10
0180 F0        274           MOV    A,@R0
0181 17        275           INC    A
0182 A0        276           MOV    @R0,A
0183 83        277           RET
0184 B000      278  RH10:    MOV    @R0,#0
0186 B822      279           MOV    R0,#SI
0188 F0        280           MOV    A,@R0
0189 031A      281           ADD    A,#0FFH-MAXSI+1
018B C690      282           JZ     RH20
018D F0        283           MOV    A,@R0
018E 17        284           INC    A
018F A0        285           MOV    @R0,A
0190 83        286  RH20:    RET
0191 B823      287  TOUT19:  MOV    R0,#T19FLG
0193 B000      288           MOV    @R0,#0
0195 83        289           RET
0196 B92E      290  INPORT:  MOV    R1,#NEWWD
0198 B82D      291           MOV    R0,#OLDWD
019A F1        292           MOV    A,@R1
019B A0        293           MOV    @R0,A
019C 09        294           IN     A,P1
019D 00        295           NOP
019E 00        296           NOP
019F 00        297           NOP
01A0 AA        298           MOV    R2,A
01A1 09        299           IN     A,P1
01A2 00        300           NOP
01A3 00        301           NOP
01A4 00        302           NOP
01A5 AB        303           MOV    R3,A
01A6 09        304           IN     A,P1
01A7 AC        305           MOV    R4,A
01A8 AD        306           MOV    R5,A
01A9 FA        307           MOV    A,R2
01AA DB        308           XRL    A,R3
```

```
01AB  AA      309           MOV    R2,A
01AC  FB      310           MOV    A,R3
01AD  DC      311           XRL    A,R4
01AE  AB      312           MOV    R3,A
01AF  FC      313           MOV    A,R4
01B0  DD      314           XRL    A,R5
01B1  AC      315           MOV    R4,A
01B2  FA      316           MOV    A,R2
01B3  4B      317           ORL    A,R3
01B4  4C      318           ORL    A,R4
01B5  533F    319           ANL    A,#PMSK1
01B7  AA      320           MOV    R2,A
01B8  37      321           CPL    A
01B9  AB      322           MOV    R3,A
01BA  FD      323           MOV    A,R5
01BB  5B      324           ANL    A,R3
01BC  AB      325           MOV    R3,A
01BD  F0      326           MOV    A,@R0
01BE  5A      327           ANL    A,R2
01BF  6B      328           ADD    A,R3
01C0  533F    329           ANL    A,#PMSK1
01C2  A1      330           MOV    @R1,A
01C3  83      331           RET
01C4  B82F    332 LAMPON:   MOV    R0,#OUT1WD
01C6  F0      333           MOV    A,@R0
01C7  537F    334           ANL    A,#01111111B
01C9  A0      335           MOV    @R0,A
01CA  83      336           RET
01CB  B82F    337 PDOTON:   MOV    R0,#OUT1WD
01CD  F0      338           MOV    A,@R0
01CE  437F    339           ORL    A,#01111111B
01D0  A0      340           MOV    @R0,A
01D1  83      341           RET
01D2  B82F    342 PDOTOF:   MOV    R0,#OUT1WD
01D4  F0      343           MOV    A,@R0
01D5  53BF    344           ANL    A,#10111111B
01D7  A0      345           MOV    @R0,A
01D8  83      346           RET
01D9  2330    347 MOWD:     MOV    A,#POUTWD
01DB  A9      348           MOV    R1,A
01DC  232F    349           MOV    A,#OUT1WD
01DE  A8      350           MOV    R0,A
01DF  F0      351           MOV    A,@R0
01E0  D1      352           XRL    A,@R1
01E1  53C0    353           ANL    A,#11000000B
01E3  C6E8    354           JZ     MD10
01E5  F0      355           MOV    A,@R0
01E6  A1      356           MOV    @R1,A
01E7  39      357           OUTL   P1,A
01E8  83      358 MD10:     RET
0200          359           ORG    200H
0200  5465    360 TIMER:    CALL   STIME
0202  B82C    361           MOV    R0,#ENFLG
0204  F0      362           MOV    A,@R0
0205  C618    363           JZ     TT50
0207  B828    364           MOV    R0,#T150
0209  F0      365           MOV    A,@R0
020A  C610    366           JZ     TT40
020C  07      367 TT30:     DEC    A
```

```
020D A0         368           MOV    @R0,A
020E 4433       369           JMP    TR19S
0210 B07D       370 TT40:     MOV    @R0,#ICT150
0212 B82C       371           MOV    R0,#ENFLG
0214 B000       372           MOV    @R0,#0
0216 4433       373           JMP    TR19S
0218 B827       374 TT50:     MOV    R0,#T30SP
021A F0         375           MOV    A,@R0
021B C621       376           JZ     TT60
021D 07         377           DEC    A
021E A0         378           MOV    @R0,A
021F 4433       379           JMP    TR19S
0221 23FF       380 TT60:     MOV    A,#ICT30
0223 A0         381           MOV    @R0,A
0224 B826       382           MOV    R0,#T30S
0226 F0         383           MOV    A,@R0
0227 C62D       384           JZ     TT70
0229 07         385           DEC    A
022A A0         386           MOV    @R0,A
022B 4433       387           JMP    TR19S
022D B062       388 TT70:     MOV    @R0,#ICT30S
022F B82C       389           MOV    R0,#ENFLG
0231 B001       390           MOV    @R0,#1
0233 B823       391 TR19S:    MOV    R0,#T19FLG
0235 F0         392           MOV    A,@R0
0236 9639       393           JNZ    TR20
0238 83         394           RET
0239 B824       395 TR20:     MOV    R0,#T19SP
023B F0         396           MOV    A,@R0
023C C641       397           JZ     TR30
023E 07         398           DEC    A
023F A0         399           MOV    @R0,A
0240 83         400           RET
0241 B824       401 TR30:     MOV    R0,#T19SP
0243 B0FF       402           MOV    @R0,#ICT19
0245 B825       403           MOV    R0,#T19S
0247 F0         404           MOV    A,@R0
0248 C64D       405           JZ     TR40
024A 07         406           DEC    A
024B A0         407           MOV    @R0,A
024C 83         408           RET
024D B03E       409 TR40:     MOV    @R0,#ICT19S
024F B823       410           MOV    R0,#T19FLG
0251 B000       411           MOV    @R0,#0
0253 83         412           RET
0254 B82E       413 CLEAR:    MOV    R0,#NEWWD
0256 B000       414           MOV    @R0,#0
0258 B82F       415           MOV    R0,#OUT1WD
025A B0FF       416           MOV    @R0,#11111111B
025C B831       417           MOV    R0,#RPTMR
025E B03C       418           MOV    @R0,#RPCNT
0260 B829       419           MOV    R0,#T120
0262 B05B       420           MOV    @R0,#ICT120
0264 83         421           RET
0265 23F6       422 STIME:    MOV    A,#TIMCNT
0267 62         423           MOV    T,A
0268 83         424           RET
0269 342E       425 INIT:     CALL   INCON
```

```
026B 3448      426        CALL     ZERO30
026D 343B      427        CALL     ZERO19
026F 3459      428        CALL     ZERO2M
0271 3462      429        CALL     ZER120
0273 5454      430        CALL     CLEAR
0275 5465      431        CALL     STIME
0277 83        432        RET
0000           433        END      START
```

What is claimed is:

1. An electronic control unit for the management of the air/fuel ratio of an internal combustion engine with an exhaust gas recirculation (EGR) valve, said electronic control unit comprising:

base calibration means for regulating the air/fuel ratio of the engine in response to sensed engine operating parameters indicative of one of the mass air flow and mass fuel flow inducted into the engine, said base calibration means regulating the air/fuel ratio by sensing one of said mass air flow and said mass fuel flow and calculating the other from a predetermined schedule of desired air/fuel ratios; and lean out means for increasing the air/fuel ratio of said internal combustion engine during decelerations, said lean out means preventing increased emissions during decelerations because of EGR valve response delay; wherein said lean out means comprises means for sensing a deceleration and for generating a deceleration signal indicating that the engine is experiencing a deceleration greater than a predetermined amount indicative of EGR valve response delay; and means responsive to said deceleration signal for increasing said air/fuel ratio when the deceleration of the engine increases beyond said predetermined amount, said means for increasing said air/fuel ratio connected to said base calibration means and operable to change said scheduled air/fuel ratio.

2. An electronic control unit as defined in claim 1 wherein said means for sensing a deceleration include:

MAP sensor means for generating a MAP signal indicative of the absolute pressure variations within the intake manifold of the internal combustion engine; and differentiator means responsive to said MAP signal for detecting said decelerations as a negative derivative of the MAP signal which is greater than a said amount.

3. An electronic control unit as defined in claim 2 wherein said lean out means further includes:

lean out timer means for inhibiting said lean out means when the RMP of the engine drops below a predetermined RPM level.

4. An electronic control unit as defined in claim 3 wherein said lean out timer means includes:

a pulse generation means for generating an RST pulse signal comprising a plurality of fixed duration pulses whose frequency is dependent upon engine speed; and means for timing the interval between pulses of the RST signal pulses and generating a time out signal if the interval between the pulses is longer than a time duration corresponding to said predetermined RPM level.

5. An electronic control unit as defined in claim 4 wherein:

said predetermined RPM level is within the idle range of said internal combustion engine.

6. An electronic control unit as defined in claim 2 wherein said lean out means further include:

EGR means for inhibiting said lean out means when said exhaust gas recirculation is inhibited and for enabling said lean out means when said exhaust gas recirculation is enabled.

7. An electronic control unit as defined in claim 6 wherein:

said exhaust gas recirculation is inhibited by an EGR control means generating an EGR signal that inhibits said exhaust gas recirculation when the temperature of the internal combustion engine is below that at which NOx emissions form and enables said exhaust gas recirculation when the temperature of the internal combustion engine is above that at which NOx emissions form.

8. An electronic control unit as defined in claim 7 wherein:

said EGR means is responsive to said EGR signal for enabling and inhibiting said lean out means.

9. An electronic control unit as defined in claim 8 wherein:

said lean out causes an increase in air/fuel ratio of a fixed amount.

10. An electronic control unit as defined in claim 9 wherein;

said fixed amount of increase is six percent.

* * * * *